(12) United States Patent
Bell et al.

(10) Patent No.: US 12,138,804 B2
(45) Date of Patent: Nov. 12, 2024

(54) AUTOMATED HANDLING AND MANIPULATION OF PACKAGES AND PACKAGES SPECIALLY ADAPTED THEREFOR

(71) Applicant: United Parcel Service of America, Inc., Atlanta, GA (US)

(72) Inventors: Julian Leland Bell, Decatur, GA (US); Stephens B. Woodrough, Jr., Peachtree Corners, GA (US); Justin Ashtiani, Atlanta, GA (US)

(73) Assignee: UNITED PARCEL SERVICES OF AMERICA, INC., Atlanta, GA (US)

( * ) Notice: Subject to any disclaimer, the term of this patent is extended or adjusted under 35 U.S.C. 154(b) by 284 days.

(21) Appl. No.: 17/167,787

(22) Filed: Feb. 4, 2021

(65) Prior Publication Data

US 2022/0241971 A1    Aug. 4, 2022

(51) Int. Cl.
   *B65D 33/25*    (2006.01)
   *B25J 9/00*    (2006.01)
   (Continued)

(52) U.S. Cl.
   CPC .......... *B25J 9/1669* (2013.01); *B25J 9/0093* (2013.01); *B25J 9/1664* (2013.01); *B25J 9/1682* (2013.01);
   (Continued)

(58) Field of Classification Search
   CPC ............ B65B 43/28; B65D 33/25–259; B65D 33/007
   (Continued)

(56) References Cited

U.S. PATENT DOCUMENTS 8,096,022 B2 * 1/2012 Hui ...................... B65B 61/188
                                                24/30.5 R
10,836,525 B1    11/2020 Alspaugh
(Continued)

FOREIGN PATENT DOCUMENTS

EP            1683736 A2    7/2006
WO      2020/263149 A1    12/2020

OTHER PUBLICATIONS

Non-Final Office Action received for U.S. Appl. No. 17/167,680, mailed on Aug. 16, 2022, 9 pages.
(Continued)

*Primary Examiner* — Jes F Pascua
*Assistant Examiner* — Nina K Attel
(74) *Attorney, Agent, or Firm* — Shook, Hardy & Bacon L.L.P.

(57) ABSTRACT

Systems, methods, and apparatuses for handling and manipulating packages in automated or semi-automated fashion and packages adapted for the same. The systems may include package-holding devices, package-manipulating devices, and package-detection components for locating packages or portions thereof in a three-dimensional space. The packages may include features that enable automated or semi-automated handling and manipulation thereof, such as different types of opening/closing mechanisms with different geometric structures that allow for holding, shifting, and manipulating the packages and/or portions thereof with the package-manipulating devices. The packages additionally or alternatively may include mechanical fasteners, magnets, and/or spring-biased opening/closing mechanisms for keeping the packages closed prior to manipulation thereof. Such packages and systems may be used in a logistics network to the increase speed, accuracy, and efficiency of processing packages having, at least in part, a non-fixed geometry.

13 Claims, 32 Drawing Sheets

(51) Int. Cl.
*B25J 9/16* (2006.01)
*B25J 13/08* (2006.01)
*B65B 43/28* (2006.01)
*G05B 15/02* (2006.01)

(52) U.S. Cl.
CPC .............. *B25J 13/08* (2013.01); *B65B 43/28* (2013.01); *B65D 33/2508* (2013.01); *G05B 15/02* (2013.01)

(58) Field of Classification Search
USPC ............................................ 383/61.1, 63–65
See application file for complete search history.

(56) References Cited

U.S. PATENT DOCUMENTS

| | | |
|---|---|---|
| 2004/0123569 A1 | 7/2004 | Jacobsen et al. |
| 2008/0098697 A1 | 5/2008 | Murray |
| 2009/0158694 A1 | 6/2009 | Matheyka |
| 2012/0311960 A1 | 12/2012 | Ravizza |
| 2014/0020339 A1 | 1/2014 | Murray |
| 2014/0029875 A1 | 1/2014 | Mallett et al. |
| 2014/0360135 A1 | 12/2014 | Honegger |
| 2020/0055659 A1 | 2/2020 | Hochberg et al. |
| 2020/0115082 A1 | 4/2020 | Hess et al. |
| 2021/0101705 A1 | 4/2021 | Schaap et al. |
| 2021/0147102 A1 | 5/2021 | Dittrich et al. |
| 2021/0191507 A1 | 6/2021 | Lee |
| 2022/0242600 A1 | 8/2022 | Bell et al. |
| 2022/0242601 A1 | 8/2022 | Bell et al. |

OTHER PUBLICATIONS

Non-Final Office Action received for U.S. Appl. No. 17/167,814, mailed on Dec. 21, 2022, 10 pages.
Non-Final Office Action received for U.S. Appl. No. 17/167,680, mailed on Apr. 6, 2023, 9 pages.
Invitation to Pay Addition Fees received for PCT Patent Application No. PCT/US2021/060457, mailed on Mar. 7, 2022, 12 pages.
Final Office Action received for U.S. Appl. No. 17/167,814, mailed on May 31, 2023, 13 pages.
Non-Final Office Action received for U.S. Appl. No. 17/167,814, mailed on Oct. 3, 2023, 18 Pages.
International Preliminary Report on Patentability received for PCT Patent Application No. PCT/US2021/060457, mailed on Aug. 17, 2023, 13 pages.
International Search Report and Written Opinion received for PCT Patent Application No. PCT/US2021/060457, mailed on Apr. 29, 2022, 19 pages.
Notice of Allowance received for U.S. Appl. No. 17/167,680, mailed on Jan. 8, 2024, 8 pages.
Notice of Allowance received for U.S. Appl. No. 17/167,814, mailed on Mar. 6, 2024, 9 pages.

* cited by examiner

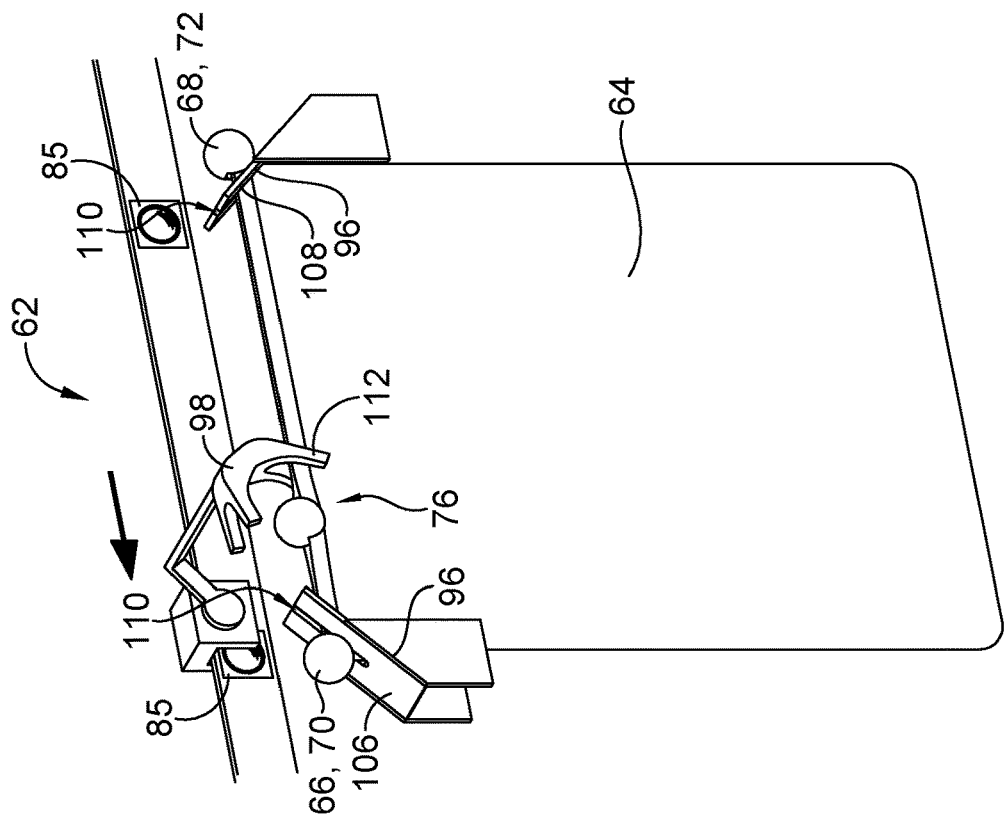
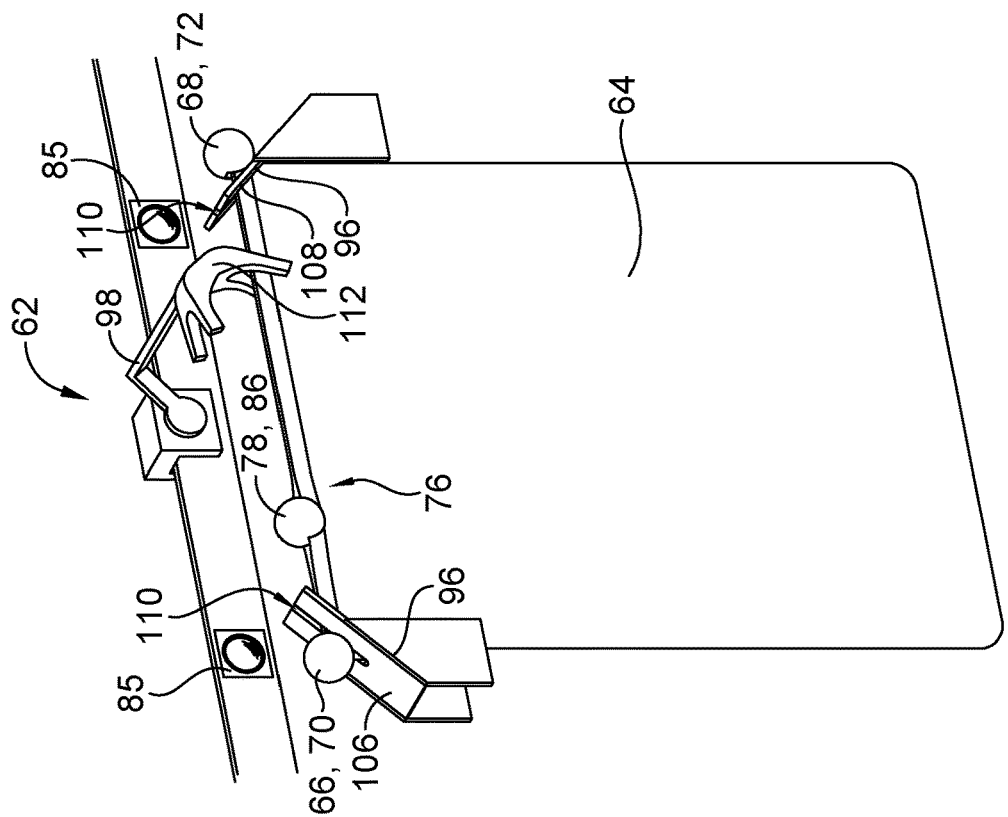

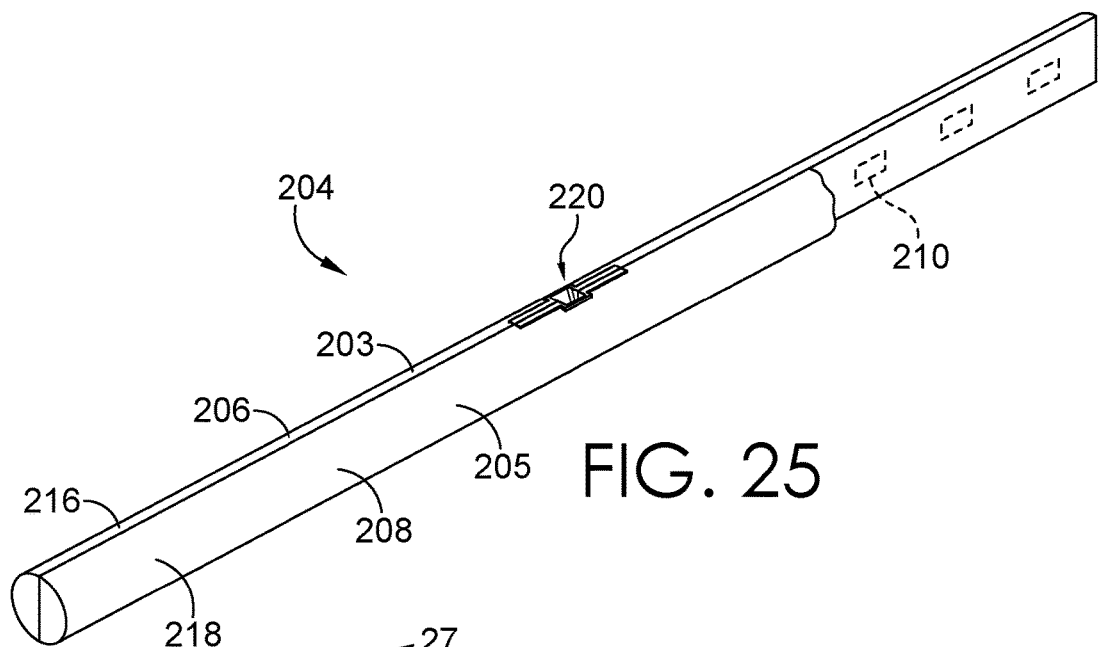
FIG. 25
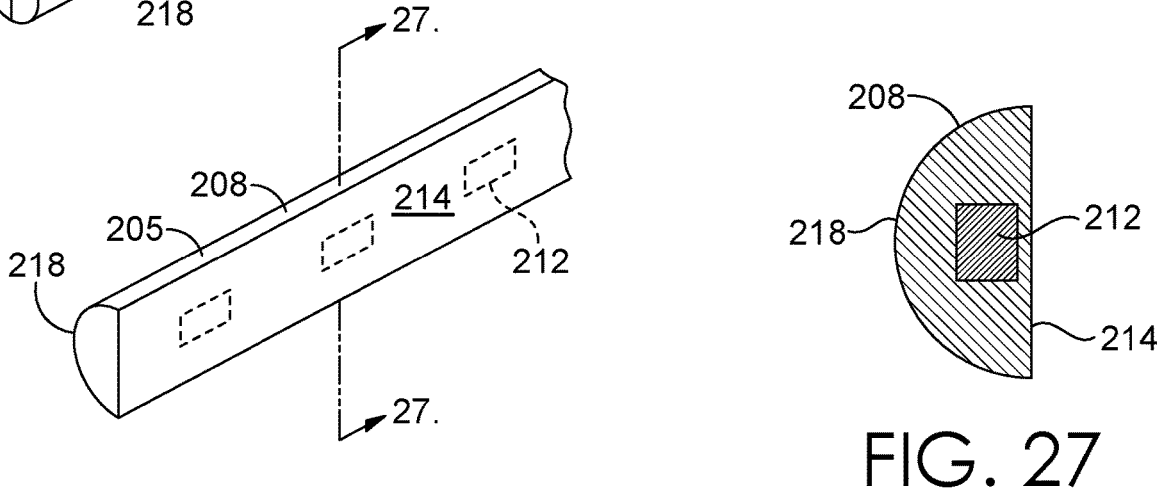
FIG. 26
FIG. 27
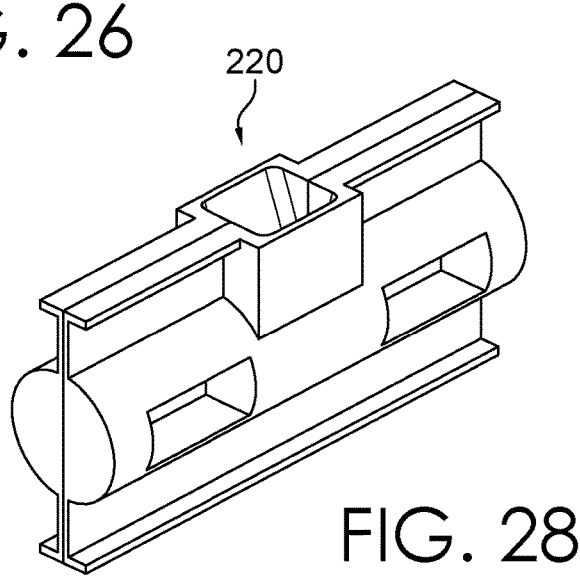
FIG. 28

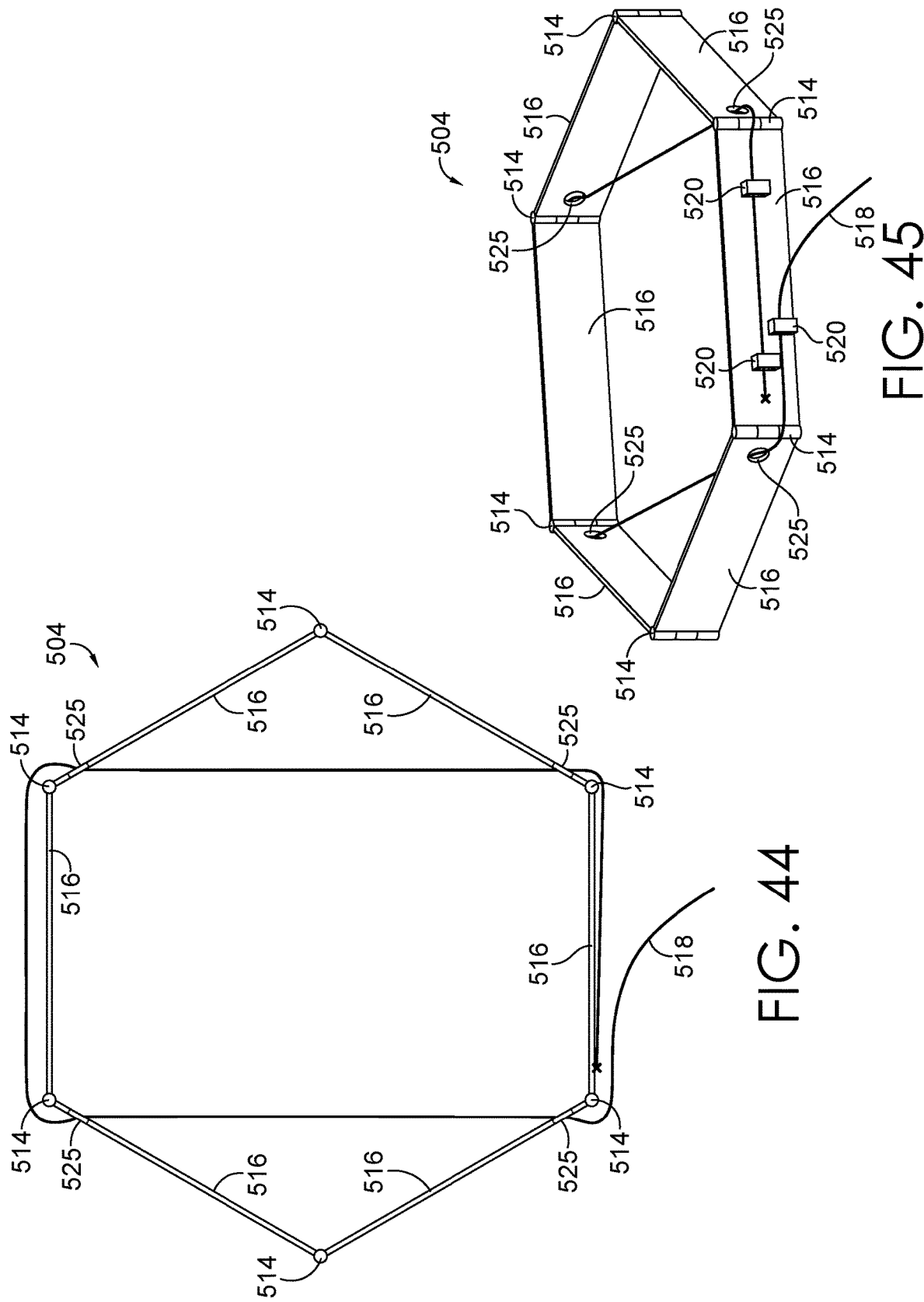

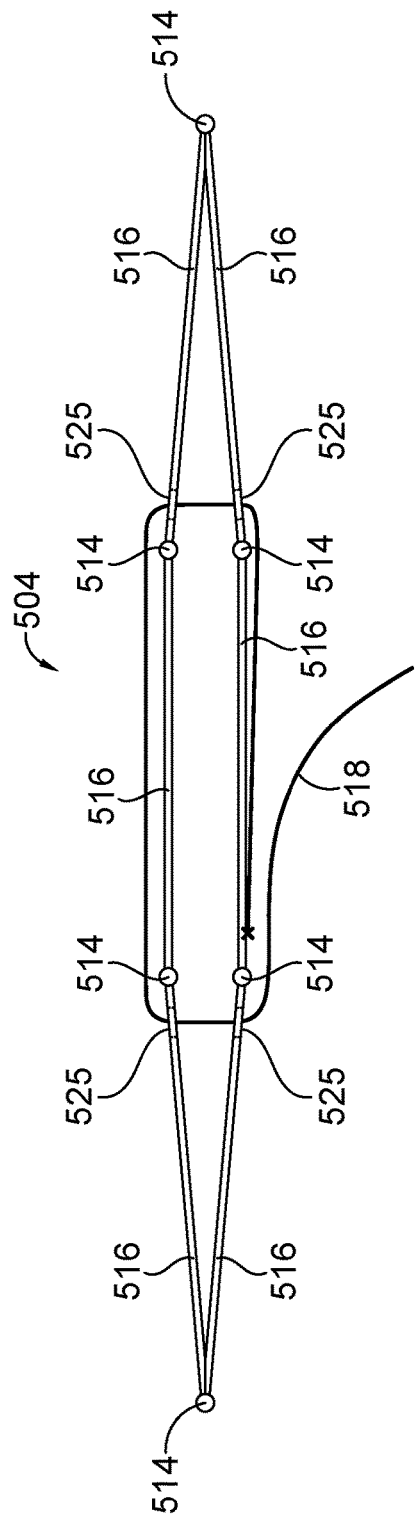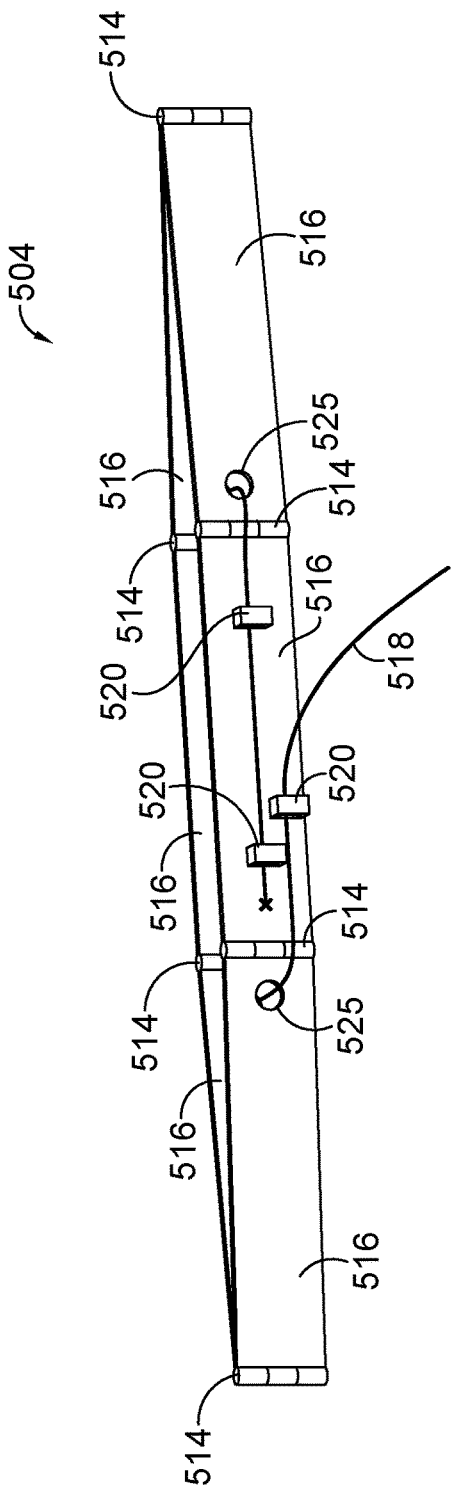

AUTOMATED HANDLING AND MANIPULATION OF PACKAGES AND PACKAGES SPECIALLY ADAPTED THEREFOR

CROSS-REFERENCE TO RELATED APPLICATIONS

This application is related by subject matter to U.S. patent Ser. No. 17/167,814, now issued as U.S. Pat. No. 12,037,152 and U.S. patent application Ser. No. 17/167,680, now issued as U.S. Pat. No. 11,975,878. Both of these listed applications were filed concurrently with the present application on Feb. 4, 2021, and both are assigned to the same entity as the present application, and both are incorporated herein by reference in the entirety.

TECHNICAL FIELD

The field relates to handling and manipulation of packages.

BACKGROUND

Handling packages, e.g., during transit in a logistics network, presents unique challenges. For example, some packages do not have a fixed geometry, i.e., are pliable or are partially pliable, making their handling more difficult. Traditionally, such packages are processed manually. However, this need for manual handling can limit the ability to process an ever increasing number of packages being transported. Therefore, improvements in the automated or semi-automated handling and manipulation of such packages are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, systems, methods, and apparatuses for handling and manipulating packages in automated or semi-automated fashion, as well as packages specially adapted for the same. The systems described herein may utilize, in different embodiments, package-holding devices, package-manipulating devices, package-detection components that detect, identify, and/or locate packages, or portions thereof, in a three-dimensional space, and/or other features that support automated or semi-automated handling and manipulation of packages. In addition, packages specially adapted for automated or semi-automated handling and manipulation are also disclosed herein. These packages may include features that enable or support automated or semi-automated handling and manipulation. For example, the packages described herein may include different types of opening/closing mechanisms, and/or may include different geometric structures that allow for holding, shifting, and/or manipulating the packages and/or portions thereof, and/or may include features that allow a system specially adapted for automated or semi-automated handling and manipulation of packages to detect, locate, and/or identify packages and/or contents thereof in a three-dimensional space. These systems, methods, apparatuses, and packages specially adapted for automated or semi-automated handling and manipulation may be utilized in a logistics network to the increase speed, accuracy, and efficiency of processing packages having, at least in part, a non-fixed geometry, as described above.

In one embodiment hereof, a system for opening and closing packages in automated or semi-automated fashion is provided. The system comprises a support frame; a package-holder coupled to the support frame, the package-holder comprising a first package-engaging structure, and a second package-engaging structure, the package-holder configured to engage a first contact point on a package using the first package-engaging structure and engage a second contact point on the package using the second package-engaging structure; and a package-manipulator coupled to the support frame and comprising a third package-engaging structure that is movable to different positions through operation of an actuator coupled thereto, wherein the third package-engaging structure is configured to engage an opening/closing mechanism on the package, and wherein the package-manipulator is configured to open or close the package by shifting the third package-engaging structure while it is engaged with the opening/closing mechanism of the package.

In another embodiment hereof, a method for opening and closing packages in automated or semi-automated fashion is provided. The method comprises positioning a package in a three-dimensional space in which a package-handling system operates, the package-handling system comprising a support frame; a package-holder coupled to the support frame, the package-holder comprising a first package-engaging structure, and a second package-engaging structure; and a package-manipulator coupled to the support frame, the package-manipulator comprising a third package-engaging structure that is movable to a plurality of different positions through operation of an actuator coupled thereto, wherein the package includes an opening/closing mechanism; engaging a first contact point on the package with the first package-engaging structure; engaging a second contact point on the package with the second package-engaging structure; engaging the opening/closing mechanism of the package with the third package-engaging structure; and shifting the third package-engaging structure to open or close the package while the first package-engaging structure is engaging the first contact point and the second package-engaging structure is engaging the second contact point.

In another embodiment hereof, a package adapted for automated or semi-automated opening and closing is provided. The package comprises a storage compartment formed at least partially of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism configured for manipulation by an automated package-handling system, wherein the first geometric structure comprises a first machine-identifiable and/or machine-locatable feature, wherein the second geometric structure comprises a second machine-identifiable and/or machine-locatable feature, and wherein the opening/closing mechanism comprises a third machine-identifiable and/or machine-locatable feature.

In another embodiment hereof, a system for opening and closing packages in automated or semi-automated fashion is provided. The system comprises a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first magnet, and a second side comprising a second magnet, wherein the first magnet and the second magnet are oriented to bias the first side and the second side towards each other when in magnetic proximity; and a package-manipulator coupled to the support frame and comprising a third package-engaging structure configured to engage the opening/closing mechanism, and subsequently, displace the first side and the second side apart against the bias of the first magnet and the second magnet to transition the opening/closing mechanism from a closed configuration to an open configuration.

In another embodiment hereof, a method for opening and closing packages in automated or semi-automated fashion is provided. The method comprises positioning a package at a location in a three-dimensional space in which a package-handling system operates, the package handling system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first magnet, and a second side comprising a second magnet, wherein the first magnet and the second magnet are oriented to bias the first side and the second side towards each other when in magnetic proximity; and a package-manipulator coupled to the support frame and comprising a third package-engaging structure; engaging the first contact point on the package with the first package-engaging structure; engaging the second contact point on the package with the second package-engaging structure; engaging the opening/closing mechanism of the package with the third package-engaging structure; and displacing, using the third package-engaging structure, the first side and the second side apart against the bias of the first magnet and the second magnet to transition the opening/closing mechanism from a closed configuration to an open configuration.

In another embodiment hereof, a package adapted for automated or semi-automated opening and closing is provided. The package comprises a storage compartment formed at least partially of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism that is coupled to the storage compartment and that is adapted for manipulation by an automated package-handling system, wherein the first geometric structure comprises a first machine-identifiable and/or machine-locatable feature, wherein the second geometric structure comprises a second machine-identifiable and/or machine-locatable feature, wherein the opening/closing mechanism includes a first side with a first magnet and a second side with a second magnet, and wherein the first magnet and the second magnet are oriented to bias the first side and the second side towards each other when in magnetic proximity.

In another embodiment hereof, a system for opening and closing packages in automated or semi-automated fashion is provided. The system comprises a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first securing element, and a second side comprising a second securing element, wherein the first securing element and the second securing element can be detachably coupled; and a package-manipulator coupled to the support frame and comprising a third package-engaging structure configured to engage the opening/closing mechanism, and subsequently, decouple the first securing element and the second securing element to displace the first side and the second side to thereby open the package.

In another embodiment hereof, a method for opening and closing packages in automated or semi-automated fashion is provided. The method comprises positioning a package at a location in a three-dimensional space in which a package-handling system operates, the package-handling system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first securing element, and a second side comprising a second securing element, wherein the first securing element and the second securing element can be detachably coupled; and a package-manipulator coupled to the support frame and comprising a third package-engaging structure; engaging the first contact point on the package with the first package-engaging structure; engaging the second contact point on the package with the second package-engaging structure; engaging the opening/closing mechanism of the package with the third package-engaging structure; decoupling the first securing element and the second securing element from each other; and displacing the first side and the second side to transition the opening/closing mechanism from a closed configuration to an open configuration.

In another embodiment hereof, a package adapted for automated or semi-automated opening and closing is provided. The package comprises a storage compartment formed at least partially of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism adapted to be opened and closed by an automated package-handling system, wherein the first geometric structure includes a machine-identifiable and/or machine-locatable feature, wherein the second geometric structure includes a machine-identifiable and/or machine-locatable feature, and wherein the opening/closing mechanism includes a machine-identifiable and/or machine-locatable feature, and wherein the first securing element and the second securing element are configured to be detachably coupled.

The term "package" as used herein should be interpreted broadly, to include any object, enclosure, and/or parcel, including one that can enclose or store other objects, and that can be transported from one location to another location, e.g., in a logistics network.

BRIEF DESCRIPTION OF THE DRAWINGS

The embodiments hereof used for automated or semi-automated handling and manipulation of packages are described with reference to the attached drawing figures, which illustrate non-limiting examples of the disclosed subject matter, in which like numerals represent like elements, wherein:

FIGS. 8-11 depict the system of FIG. 7 being used to engage and manipulate a package, in accordance with an embodiment hereof;

FIG. 25 depicts an example opening/closing mechanism of a package, in accordance with an embodiment hereof;

FIG. 26 depicts a portion of the opening/closing mechanism shown in FIG. 25, in accordance with an embodiment hereof;

FIG. 27 depicts a cross-section of the opening/closing mechanism shown in FIG. 25, in accordance with an embodiment hereof;

FIG. 28 depicts another part of the opening/closing mechanism shown in FIG. 25, in accordance with an embodiment hereof;

FIGS. 42-47 depict another example of an opening/closing mechanism configured for automated or semi-automated handling and manipulation, in accordance with an embodiment hereof;

DETAILED DESCRIPTION

Figure 1:
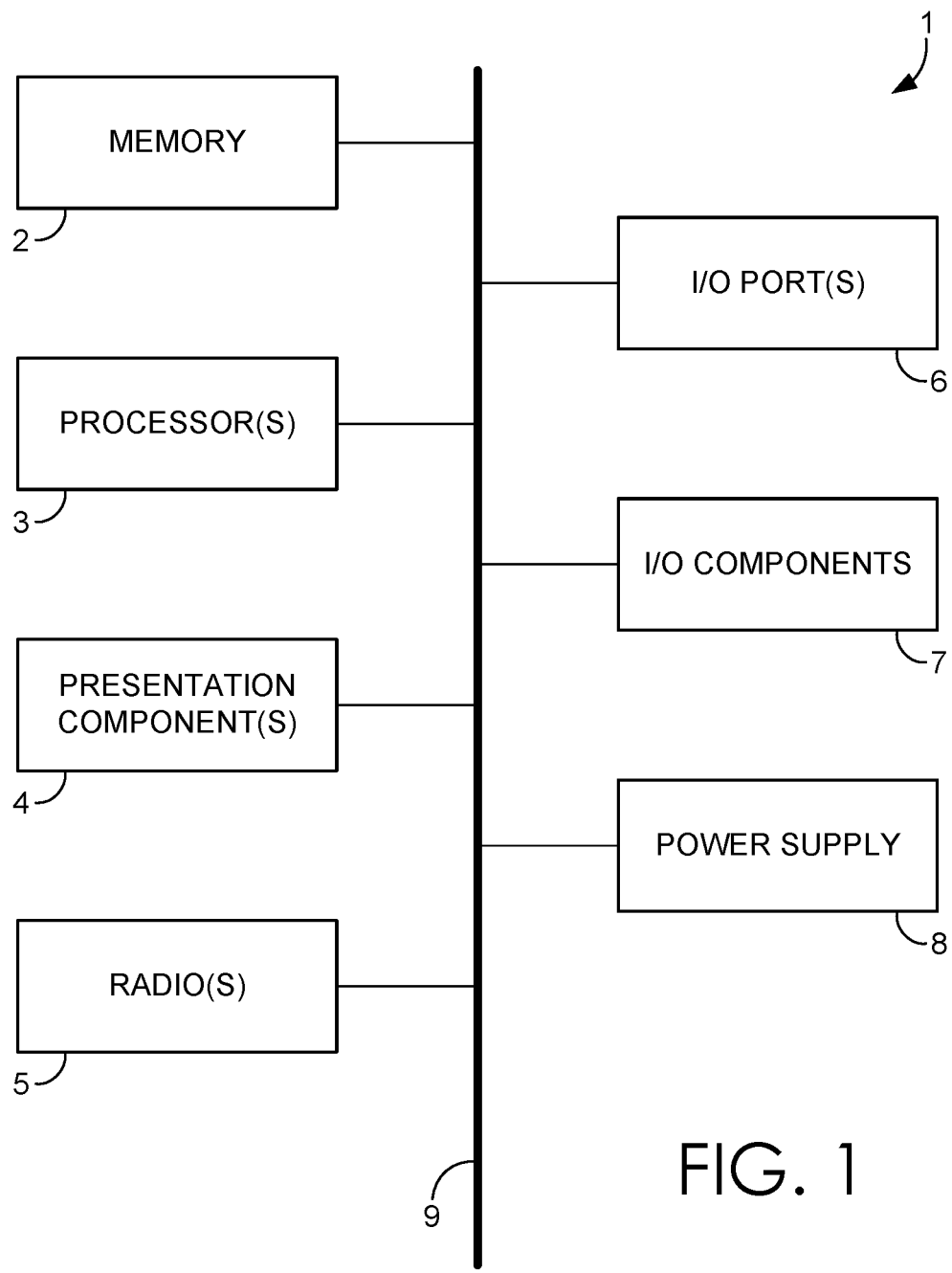
FIG. 1 depicts a block diagram of an example computing system suitable for supporting operation of different embodiments described herein.

The subject matter of this disclosure is described herein to meet statutory requirements. However, this description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described.

In general, and at a high level, this disclosure describes, among other things, embodiments that enable and/or support the automated or semi-automated handling and manipulation of packages, including those having a non-fixed, e.g., at least partially variable, geometry, and also describes packages specially adapted for automated or semi-automated handling and manipulation. For example, packages that are formed of pliable materials that are typically processed, at least in part, manually, may be processed in more automated fashion using the embodiments described herein. This provides greater efficiency, speed, and/or precision in the processing of such packages, e.g., in a logistics network operation, and with reduced reliance on manual handling. The specially adapted packages described herein may include features that enable or support automated or semi-automated handling and manipulation. For example, these features may include opening/closing mechanisms, geometric structures that can be engaged by different automated mechanisms, and/or identifying and/or locating features, among others. Additional detailed embodiments are described below with reference to FIGS. 1-51.

The subject matter described herein may be provided as, at least in part, a method, a system, and/or a computer-program product, among other things. Accordingly, certain aspects disclosed herein may take the form of hardware, or may be a combination of software and hardware. In addition, a computer-program that includes computer-useable instructions embodied on one or more computer-readable media may also be used. The subject matter hereof may further be implemented as hard-coded into the mechanical design of computing components and/or may be built into a system or apparatus that allows for automated or semi-automated handling of packages as described herein.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring now to FIG. 1, a block diagram of an example computing device 1 suitable for supporting the operation of embodiments described herein is provided, in accordance with an embodiment hereof. It should be noted that although some components depicted in FIG. 1 are shown in the singular, they may be plural, and the components may be connected in a different, including distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio(s) 5, input/output (I/O) port(s) 6, input/output (I/O) component(s) 7, and power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may facilitate communication with a network, and may additionally or alternatively facilitate other types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Exemplary I/O ports may include a USB jack, a stereo jack, an infrared port, a firewire port, and/or other proprietary communications ports. The input/output (I/O) components 7 may comprise one or more keyboards, microphones, speakers, touchscreens, and/or any other item useable to directly or indirectly input data into the computing device 1. The power supply 8 may comprise batteries, generators, fuel cells, and/or any other component that may act as a power source to supply power to computing device 1 and/or to any other components described herein.

Figure 2:
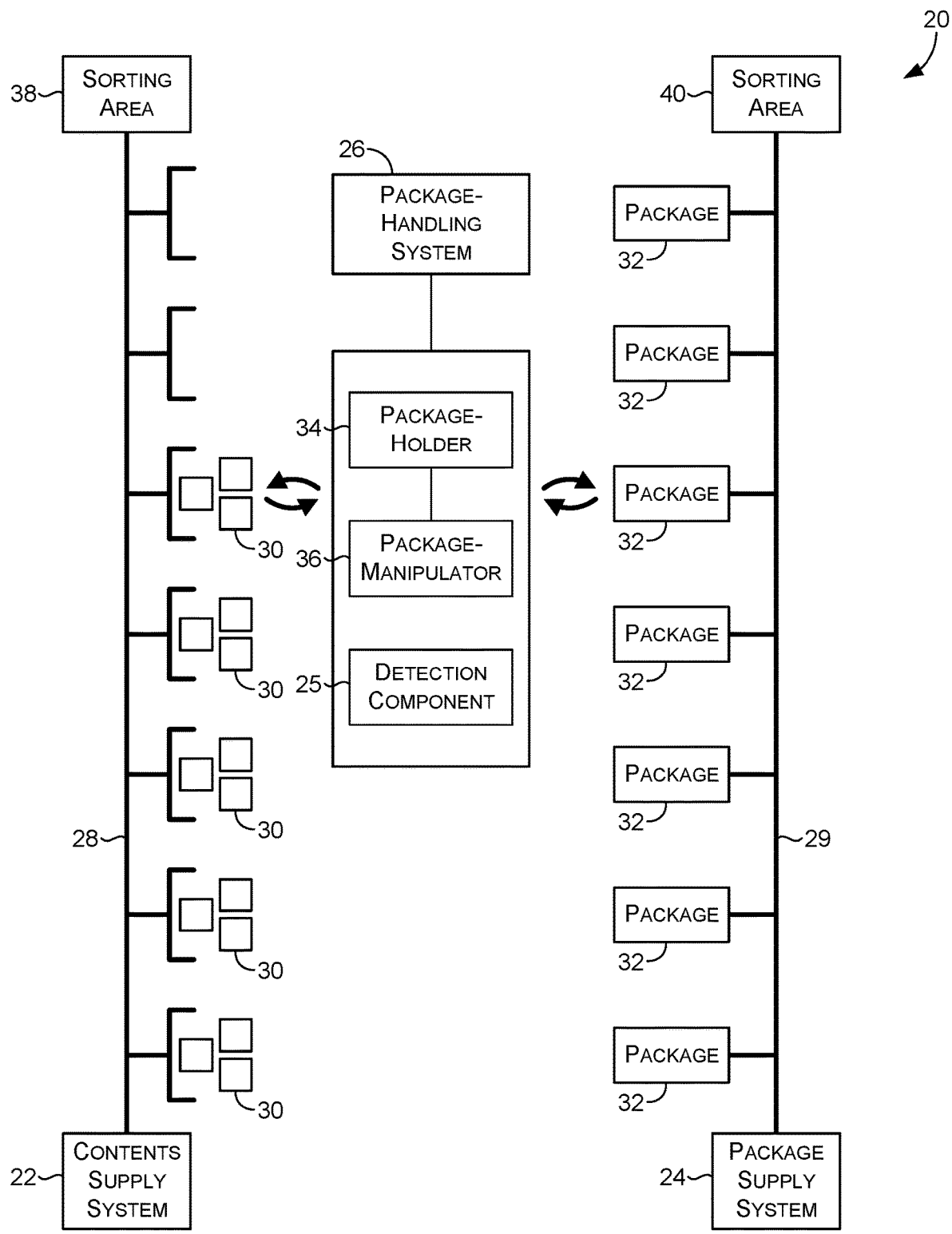
FIG. 2 depicts a generic representation of a system configured for automated or semi-automated handling and manipulation of packages, in accordance with an embodiment hereof.

Referring now to FIG. 2, an example system 20 that allows for automated and/or semi-automated handling and manipulation of packages is provided, in accordance with an embodiment hereof. The system 20 shown in FIG. 2 is represented generically for the purposes of clarity, explanation, and simplicity. However, in actual implementation, aspects, details, and features that support operation of the system 20 but that are omitted from FIG. 2 may also be included. For example, numerous mechanical, electrical, power, control, and/or computing components may be utilized with the system 20. The system 20 shown in FIG. 2 is intended to provide one example selection of components in one example configuration, and numerous others are contemplated herein.

The system 20 shown in FIG. 2 includes a contents-supply system 22, a package-supply system 24, and a package-handling system 26. In one embodiment, the systems 22, 24, 26 are configured to operate in coordination to enable automated or semi-automated handling and manipulation of contents 30 provided by the contents-supply system 22 and/or of packages 32 supplied by the package-supply system 24. The contents-supply system 22 includes a contents-supply apparatus 28. The contents-supply apparatus 28 may, for example, be a conveying mechanism or other apparatus that advances contents 30 for automated processing and handling. The package-supply system 24 includes a package-supply apparatus 29. The package-supply apparatus 29 may, for example, also be a conveying mechanism or other apparatus that shifts the packages 32 for automated processing and handling. The system 20 may be configured to, as shown in FIG. 2, transfer the contents 30 into the packages 32 in automated or semi-automated fashion, and/or may be configured to transfer contents 30 out of the packages 32 and to the contents-supply apparatus 28 in automated or semi-automated fashion, in different aspects. The system 20 may be utilized in a logistics network to route the packages 32 toward designated destinations, e.g., those associated with recipients. The packages 32 may be formed, at least in part, of pliable materials that have a non-fixed, or variable, geometry. For example, the packages 32 may be bag-like storage receptacles formed of pliable materials. These types of packages, traditionally processed manually, may be processed through coordinated operation of the systems 22, 24, 26 as described herein.

The package-handling system 26 shown in FIG. 2 includes a package-holder 34. The package-holder 34 may be configured to engage and support the packages 32, either individually, or multiple packages at a time. The package-handling system 26 may also include a package-manipulator 36. The package-manipulator 36 may be adapted to engage and manipulate the packages 32 supported by the package-holder 34. For example, this manipulation may include engaging, opening, closing, and/or loading contents into the packages 32, and/or unloading contents from the packages 32, depending on the configuration of the package-manipulator 36. In one embodiment, the package-holder 34 and the package-manipulator 36 may be separate, e.g., physically distinct, apparatuses that operate in coordination. In another embodiment, the package-holder 34 and the package-manipulator 36 may be integrated, at least partially, and operate in coordination.

The package-handling system 26 may, in some aspects, include one or more detection components 25. The detection components 25 may be used to detect, locate, and/or identify the packages 32 and/or contents 30 in a three-dimensional space in which the package-handling system 26 operates. The detection component(s) 25 may be located throughout the system 20, at any location. For example, the detection components 25 may be integrated with the package-holder 34, and/or may be integrated with the package-manipulator 36, or may be positioned at other locations in the system 20, e.g., adjacent the contents-supply apparatus 28 or the package-supply apparatus 29, in different aspects. The detection components 25 may utilize imaging components (e.g., cameras, image processors, etc.), sensors (e.g., LIDAR sensors), scanners (e.g., configured to detect and identify machine-readable indicia on packages), communication elements (e.g., suitable for wireless, near-field communication ("NFC"), radio-frequency identification ("RFID"), or other forms of communication) and/or computing components, among other features. These components may be used separately or in coordination for detecting, locating, and/or identifying the contents 30 and/or the packages 32 in the three-dimensional space in which the package-handling system 26 operates.

The package-handling system 26 may be configured to load the contents 30 into the packages 32. For example, this may include engaging and then shifting the contents 30 into the packages 32 using one or more movable elements. The package-handling system 26 may further be configured to unload the contents 30 from the packages 32. For example, this may include engaging and then shifting the contents 30 out of the packages 32 using one or more movable elements. The package-handling system 26 may include or utilize package-engaging structures, actuators, control systems, and/or computer-vision systems, among other features, to facilitate such operation. For example, the package-handling system 26 may include a plurality of package-engaging structures that are movable (e.g., shiftable, pivotable, extendable, retractable, etc.) thereby allowing them to contact, engage, open, and/or close the packages 32, and/or manipulate the contents 30 or the packages 32 in automated or semi-automated fashion.

FIG. 2 further depicts a sorting area 38 associated with a downstream location of the contents-supply system 22, and a sorting area 40 associated with a downstream location of the package-supply system 24. In different embodiments, depending on the configuration of the system 20, the packages 32 and/or the contents 30 may be further shifted, organized, and/or routed in these areas 38, 40 following transfer by the package-handling system 26. For example, the packages 32 or the contents 30 may be sorted and then loaded onto mobile transports (e.g., vehicles, ships, aircraft, railway transports, or the like, including those that are unmanned or autonomous) for routing to designated destinations, e.g., in a logistics network.

Figure 3:
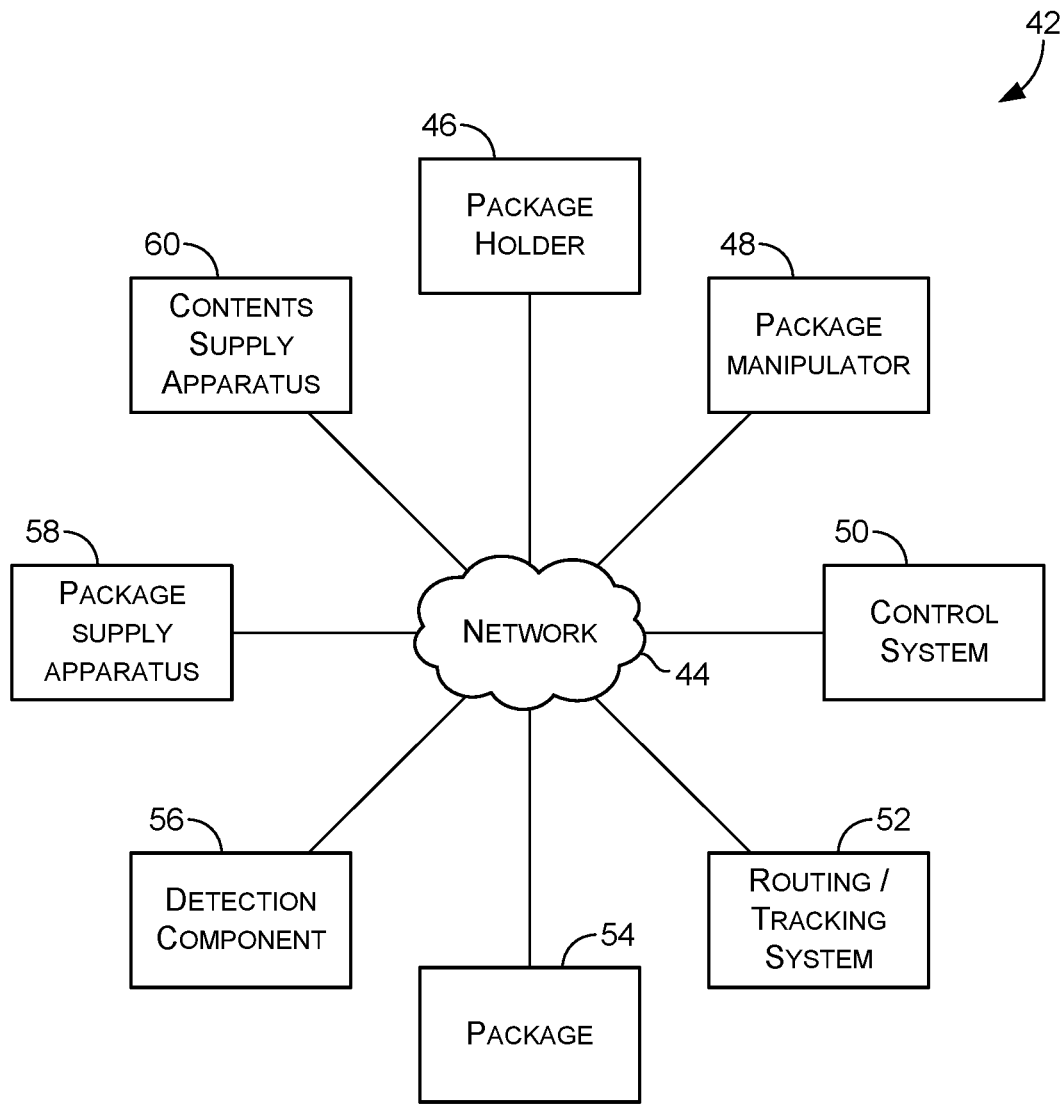
FIG. 3 depicts a network of components that may be used with a system configured for automated or semi-automated handling and manipulation of packages, in accordance with an embodiment hereof.

Referring now to FIG. 3, a system 42 with a selection of components suitable for supporting automated or semi-automated handling and manipulation of packages as described herein is provided, in accordance with an embodiment hereof. The components of the system 42 shown in FIG. 3 are connected over a network 44. The network 44 interconnects, directly or indirectly, a package-holder 46, a package-manipulator 48, a control system 50, a routing/tracking system 52, a package 54, a detection component 56, a package-supply apparatus 58, and a contents-supply apparatus 60. These elements, like those of the system 20 shown in FIG. 2, are represented generically in FIG. 3 for the purposes of clarity, simplicity, and explanation. In addition, each of the depicted elements may represent a plurality of such elements, in different aspects. For example, multiple package-manipulators 48 may be utilized and connected to the network 44 in one aspect.

The package-holder 46 may be configured to engage, support, and/or re-position packages in automated or semi-automated fashion. The package-holder 46 may form part of a package-handling system, such as the package-handling system 26, described with respect to FIG. 2. The package-holder 46 may include structures, mechanisms, actuators, control elements, and/or other components that allow it to engage, support, and/or re-position packages, allowing other elements of the system 42 to interact with the packages.

The package-manipulator 48 may be configured to engage and manipulate packages, e.g., those held or supported by the package-holder 46 described above. The package-manipulator 48 may form part of a package-handling system, such as the package-handling system 26, described with respect to FIG. 2. The package-manipulator 48 may include structures, mechanisms, actuators, control elements, and/or other components that allow it to engage and manipulate packages or portions thereof. For example, such features may allow the package-manipulator 48 to engage an opening/closing mechanism of a package, and then open and/or close the opening/closing mechanism located on the package, e.g., in automated or semi-automated fashion. The package-manipulator 48 may further be configured to manipulate contents of the packages, e.g., loading and unloading the contents, in different aspects.

The control system 50 may be configured to direct operation of the different elements of the system 42. The control system 50 may be configured to control each of the elements of the system 42 individually, and/or together, allowing them to operate in coordination. In other words, the control system 50 may enable different elements of the system 42 to work together (e.g., the package-holder 46 and the package-manipulator 48) to facilitate automated or semi-automated handling and manipulation of packages and/or contents thereof. The control system 50 may be local, remote, and/or distributed, in different aspects. The control system 50 may include one or more computer components, computer memories, and/or communication components, in different embodiments.

The routing/tracking system 52 may be configured to determine a location of packages, e.g., during routing to locations in a logistics network, and track the location of the packages during the routing process. The routing/tracking system 52, like the control system 50, may be connected to different components of the system 42, and may be local, distributed, and/or remote to the system 42. In one embodiment, during a process of routing packages in a logistics network, packages may be identified. For example, the packages may be identified using one or more detection components, and then data related to those packages may be communicated to, and stored by, the routing/tracking system 52, allowing a database of package locations and/or routing statuses to be generated and/or updated.

The package 54 represents a package specially adapted for automated or semi-automated handling and manipulation thereof. For example, the package 54 may be one that is formed, at least partially, of pliable materials that change geometry during handling. The package 54 may include structures or features that allow the package-holder 46 and/or the package-manipulator 48 to engage with, support, and/or manipulate the package 54. These structures or features may be rigid or semi-rigid, in different embodiments, allowing them to grasped, held, or braced by different mechanical components. In addition, the package 54 may include features that allow it to be detected, located, and/or identified in automated or semi-automated fashion using the detection components described herein. These features may include machine-readable or machine-identifiable indicia, wireless communication elements, and/or other unique identifiers.

The detection component 56 may be configured to detect, identify, and/or locate packages in a three-dimensional space in which automated or semi-automated handling and manipulation occurs. For example, the detection component 56, which may actually be multiple components and/or systems, local or distributed, may utilize imaging devices, sensors, communication components, computing components, and/or other components that operate to detect, locate, and/or identify packages or parts thereof. For example, in one aspect, the detection component 56 may be a computer-vision system that includes multiple cameras connected to a computing device. The cameras may capture images of packages, and the computing device may process the images, thereby allowing it to identify the packages based on detection of one or more unique identifiers, and/or locate the packages in a three-dimensional geometric coordinate system in which package handling and manipulation occurs.

The package-supply apparatus 58 may be configured to transfer a plurality of packages for automated or semi-automated handling and/or manipulation. For example, the package-supply apparatus 58 may utilize conveyors, robots, control systems, and/or other elements to shift a plurality of packages for processing in sequence. The package-supply apparatus 58, like the other components of the system 42, may communicate with and/or be directed by the control system 50.

The contents-supply apparatus 60 may be configured to transfer package contents, e.g., contents to be transferred to packages, such as the package 54, or contents transferred from packages, such as the package 54. The contents-supply apparatus 60 may utilize conveyors, robots, control systems, and/or other elements to shift a plurality of contents, e.g., for automated handling and/or manipulation in sequence. The contents-supply apparatus 60, like the other components of the system 42, may communicate with and/or be directed by the control system 50.

Package Handling System for Slidably-Openable Packages

Figure 4:
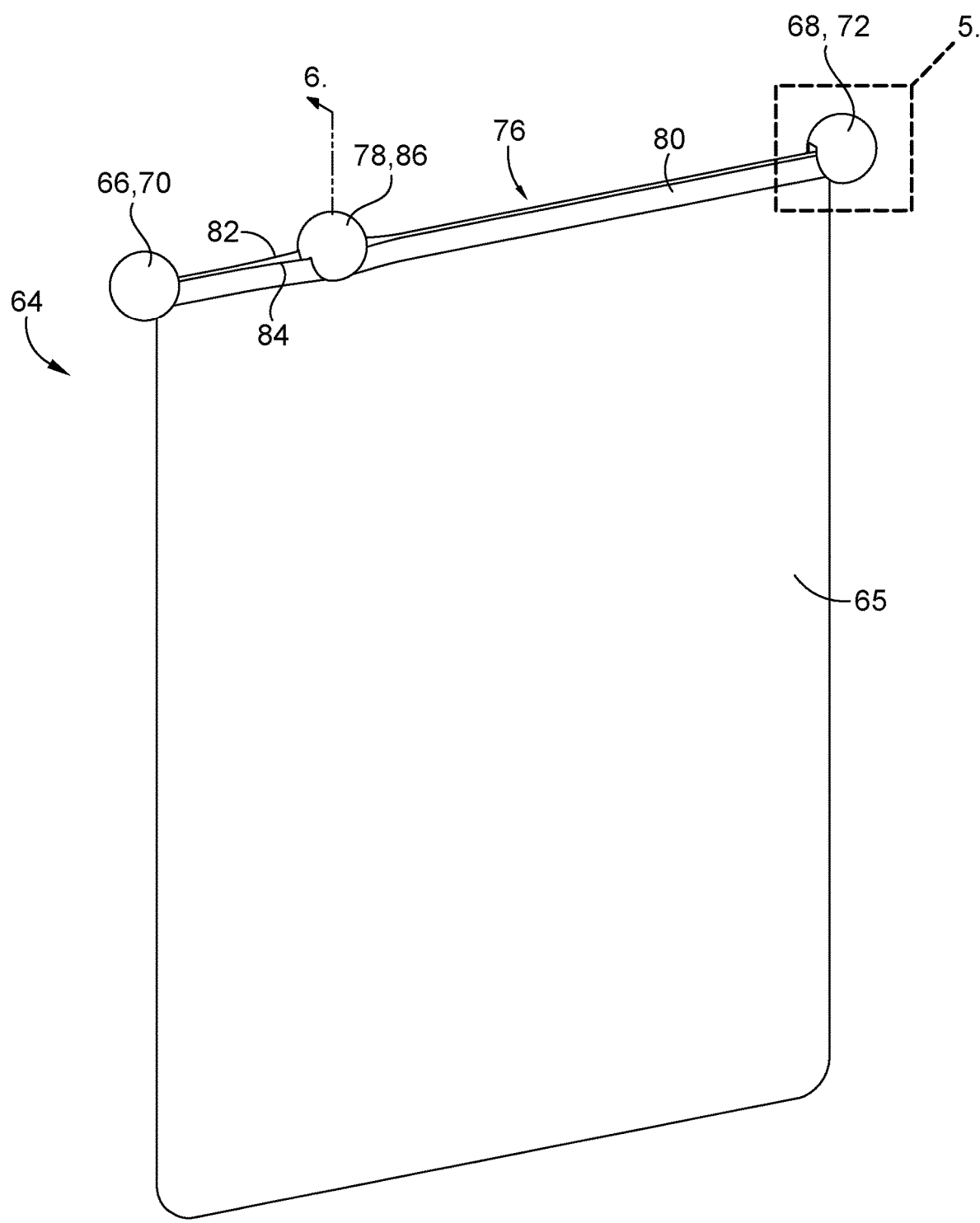
FIG. 4 depicts one example of a package configured for automated or semi-automated handling and manipulation, in accordance with an embodiment hereof.
Figure 5:
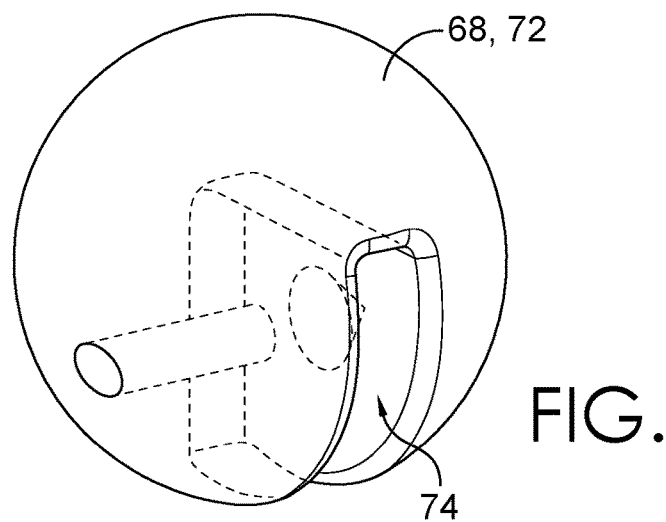
FIG. 5 depicts one example of a geometric structure used with a package configured for automated or semi-automated handling and manipulation, in accordance with an embodiment hereof.
Figure 6:
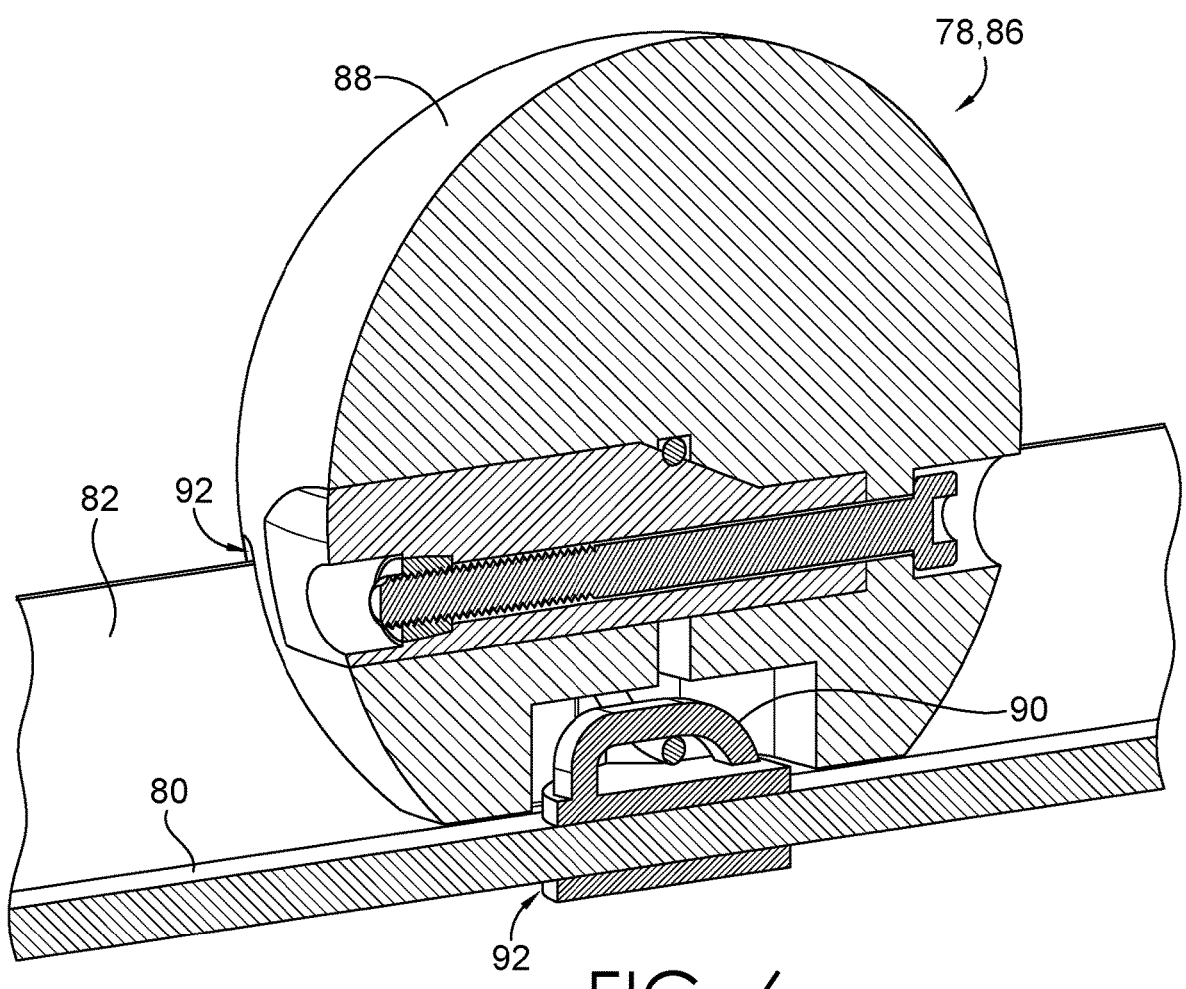
FIG. 6 depicts one example of a closure mechanism used with a package configured for automated or semi-automated handling and manipulation, in accordance with an embodiment hereof.

Referring now to FIGS. 4-6, a package 64 configured for automated or semi-automated handling and manipulation is provided, in accordance with an embodiment hereof. The package 64 represents one example of the packages described herein. The package 64 includes an enclosure 65 (e.g., a bag or a bag-like storage portion) formed at least partially of a pliable material, such that it does not have a fixed geometry, or rather, it can change shape. For example, the enclosure 65 may be formed of one or more sheets of fabric, plastic, netting, and/or any substantially malleable material. The package 64 further includes rigid or semi-rigid portions, which have a higher degree of rigidity than the material forming the enclosure 65, thereby allowing for grasping, holding, supporting, and/or shifting of these portions using components of a package-handling system, as described below.

In some embodiments, the package 64 may include a first pliable portion and a second pliable portion, with edges of the first pliable portion coupled, or connected to, edges of the second pliable portion, to form the enclosure 65. In other embodiments, the package 64 and/or the enclosure 65 thereof may be a continuously-formed structure, enclosure, or bag with separable edges at an opening thereof. In different embodiments, the package 64 and/or the enclosure 65 thereof may have any shape, such as square, round, rectangular, or another shape.

The package 64 shown in FIG. 4 has a contact point 66 at a first location on the package 64 and a contact point 68 at a second location on the package 64. During a process of manipulating the package 64 in automated or semi-automated fashion, the contact points 66, 68 may be located to enable elements of a package-handling system, such as the package-handling system 62 shown in FIG. 7, to engage, brace, support, and/or otherwise manipulate the package 64. In the embodiment shown in FIG. 4, the contact point 66 and the contact point 68 each have a respective geometric structure 70, 72 coupled thereto, or located thereon. The geometric structures 70, 72 have a higher degree of rigidity than the pliable material used to form the enclosure 65. For example, as illustrated in FIGS. 4-6, the geometric structures 70, 72 may be substantially spherical, and have a slot 74 formed therein. However, other three-dimensional structures may be used without departing from the scope hereof. In some embodiments, the geometric structures 70, 72 may include a ferromagnetic element, e.g., a tab, or the like. The slot 74 formed in the geometric structures 70, 72, as depicted in FIG. 5, may be sized and shaped to fit over, and be secured to, corners of the enclosure 65. The coupling, and attachment, of these components may be provided through a mechanical connection (e.g., screws, a male-female fastener, or the like), adhesives, or other attachment methods.

The package 64 shown in FIG. 4 further includes an opening/closing mechanism 76 that is suitable for automated or semi-automated handling and manipulation. In use, the opening/closing mechanism 76 may be adjustable between a closed configuration and an open configuration, and any configuration therebetween. The opening/closing mechanism 76 shown in FIG. 4 includes a slider 78 that operates along two interlocking members 80, which form a first side 82 with a first securing element, e.g., part of a zipper-closure, and a second side 84 with a second securing element, e.g., a corresponding part of a zipper closure. The interlocking members 80 are located at or proximate to the opening edge of the package 64. The first securing element and the second securing element are releasably attachable. In some embodiments, the interlocking members 80 are disposed or integrally formed along inner surfaces of the enclosure 65 and are operable to selectively interlock, interdigitate, or otherwise detachably couple to each other. For example, the interlocking members 80 may be provided as a zipper-closure. The zipper-closure may include zipper-teeth, zip-fastener teeth, clasp-locker teeth, press-seal-engaging components (e.g., interlocking flexible ledges), or other types of interlocking closures. These features may be formed of metal, nylon, plastic, or other materials, and may be engaged or disengaged by sliding the slider 78 from one contact point 66, 68 toward the other contact point 66, 68.

The slider 78 of the opening/closing mechanism 76 also includes a geometric structure 86 having a higher degree of rigidity than the pliable material used to form the enclosure 65. In some embodiments, and as depicted in FIG. 6, the geometric structure 86 may include a housing 88 that is attached to a zipper-slider 90 through a mechanical, adhesive, and/or other form of connection. The slider 78 or the housing 88 may be substantially spherical, as illustrated in FIG. 6. However, other geometric structures and shapes may be used without departing from the scope hereof. Furthermore, in some embodiments, the geometric structure 86 may include a ferromagnetic element, e.g., a tab, or the like. The geometric structure 86 of the slider 78 may have various channels 92 formed therein that allow edges of the interlocking members 80 to slide through as the slider 78 is moved between the contact points 66, 68. Furthermore, the geometric structure 86 of the slider 78 may be sized and shaped to allow for engagement by a package-handling system, e.g., the package-handling system 62 shown in FIG. 7, to allow for automated or semi-automated opening and closing of the package 64, as described later herein. In some embodiments, the elements 90, 92 of the slider 78 may form a Y-shaped channel, so that as the zipper-slider 90 slides along the interlocking members 80, the interlocking members 80 are either joined or separated.

In one embodiment, the geometric structure 86 may be designed so that it is a centroid, or otherwise such that some portion of the geometric structure is aligned, at least partially, with an axis along which a force is exerted to open or close the package, e.g., the axis of translation of the zipper-slider 90. In this configuration, a force used to open or close the package may be applied directly through the zipper-slider 90, limiting the application of a moment about the zipper-slider 90 which may potentially cause the zipper to jam or stick. In additional embodiments, the geometric structure 86 may be connected to the zipper-slider 90 through a zero-moment connection, so that when a force is applied to the geometric structure 86, it transmits a force to the zipper-slider 90 with a reduced or limited moment.

Figure 7:
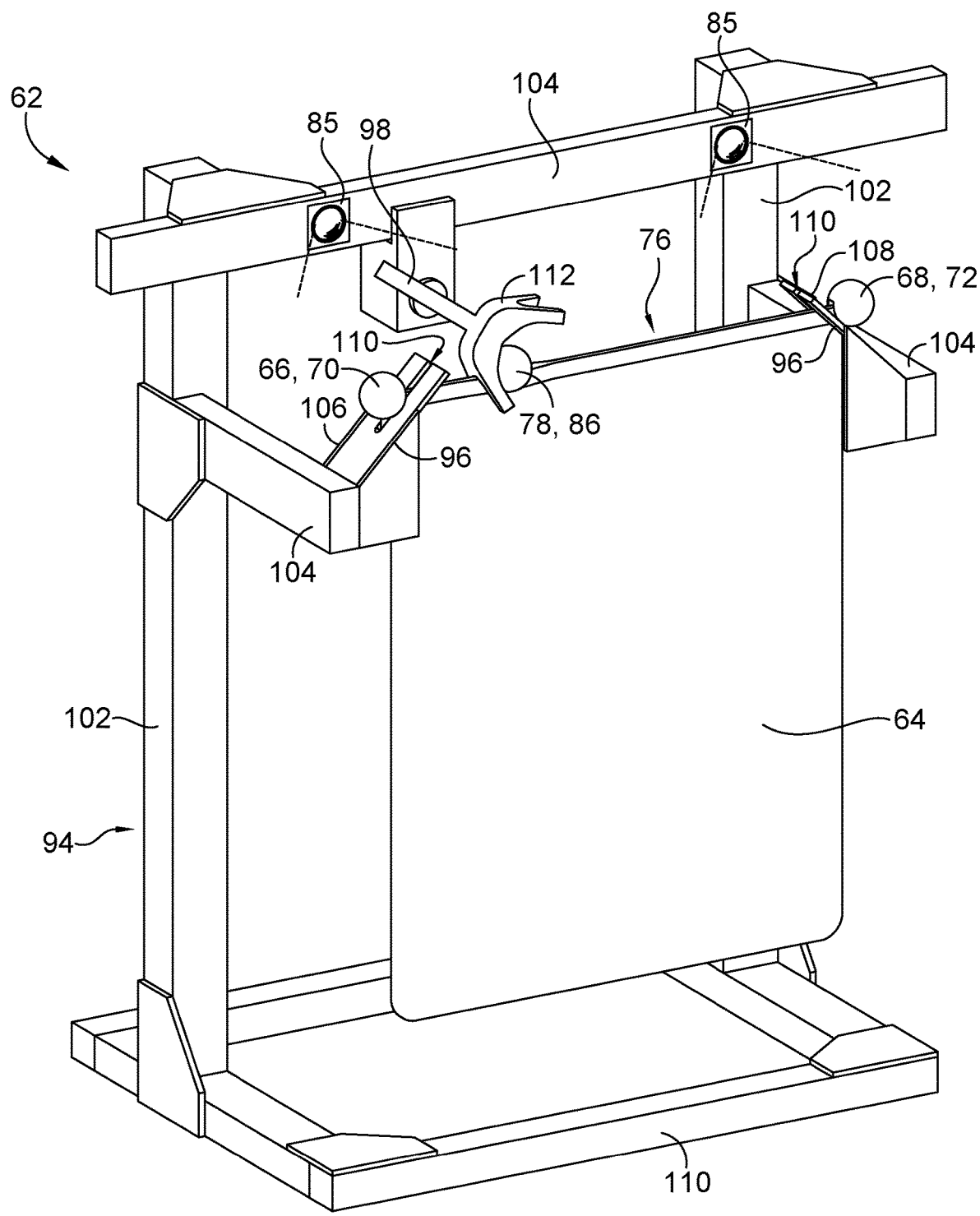
FIG. 7 depicts an example package-handling system, in accordance with an embodiment hereof.

Referring now to FIGS. 7-23, different package-handling systems 62, 71, 73, 75, 77, 79, 81 that can be used for holding, opening, closing, and/or loading or unloading packages, such as the package 64 shown in FIG. 4, in automated or semi-automated fashion, are provided, in accordance with embodiments hereof. The package-handling systems 62, 71, 73, 75, 77, 79, 81 depicted in FIGS. 7-23 have different configurations of package-holders, package-manipulators, package-supply apparatuses, and also show the interaction of these components with package 64, in accordance with embodiments hereof. Looking at FIG. 7, a package-handling system 62 is shown, in accordance with an embodiment hereof. The package-handling system 62 includes a support frame 94, a package-holder 96 coupled to the support frame 94, and a package-manipulator 98 coupled to the support frame 94. The support frame 94 may include, for example, rails, tracks, support structures, surfaces, and/or the like, to which the package-holder 96 and/or the package-manipulator 98 may be fixedly or movably coupled, in different aspects. For example, in some embodiments, the package-manipulator 98 may be slidably coupled to a portion of the support frame 94 and may slide thereon through operation of an actuator coupled thereto. In further embodiments, e.g., as depicted in FIG. 7, the support frame 94 may include a base 100, one or more vertical supports 102, and one or more horizontal supports 104 extending in one or more directions relative to the vertical supports 102. However, other support frame configurations are possible without departing from the scope hereof. In FIG. 7, the package-holder 96 is represented as fixed structures on the support frame 94 that are spaced apart, and positioned to engage, support, and brace, spaced apart points or structures on the package 64, and the package-manipulator 98 is represented as being movably coupled to the support frame 94, thereby allowing it to engage and shift the opening/closing mechanism 76 of the package 64 between a closed configuration and an open configuration.

Looking still at FIG. 7, the package-holder 96 includes a package-engaging structure 106 and a package-engaging structure 108 that are located in spaced relation. The package-holder 96 is configured to engage the contact point 66 on the package 64 using the package-engaging structure 106 and engage the contact point 68 on the package 64 using the package-engaging structure 108. This may occur through automated or semi-automated operation as described herein. For example, the package-engaging structures 106, 108 may be positioned by actuators directed by a computing device. The package-engaging structures 106, 108 shown in FIG. 7 include engagement slots 110 having a width sufficient for portions of the package 64 to slide into, and rest in, as depicted in FIGS. 7-11. The width of the engagement slots 110 may also be narrower than a maximum width of the contact points 66, 68 and/or the geometric structures 70, 72 thereof, such that the contact points 66, 68 and/or their geometric structures 70, 72 are supported or held by the package-engaging structures 106, 108 without falling through the engagement slots 110. In some embodiments, e.g., as depicted in FIGS. 7-11, the package-engaging structures 106, 108 are angled slightly toward each other to facilitating guiding the package 64 into place within the engagement slots 110.

In addition to the package-engaging structures 106, 108 depicted in FIG. 7, other packaging-engaging structures are contemplated herein for use in engaging, holding, and/or bracing a package, such as the package 64, during a process of manipulating the package in automated or semi-automated fashion. For example, the package-handling system 62 may use clips or other mechanical attachments to temporarily hold the package 64 in place, or the package-holder 96 may employ some other force (e.g., magnetic, vacuum, etc.) to hold the package 64 in place through contact with the package 64. In some embodiments, e.g., as depicted in FIGS. 16-23, the package-engaging structure 106 and/or the package-engaging structure 108 may utilize a multi-pronged cradle configuration which has a slight curvature sufficient for the contact points 66, 68 and/or their geometric structures 70, 72 to rest therein. The prongs of this multi-pronged cradle may be spaced such that at least a portion of the package proximate to the contact points 66, 68 may slide therebetween.

Figure 18:
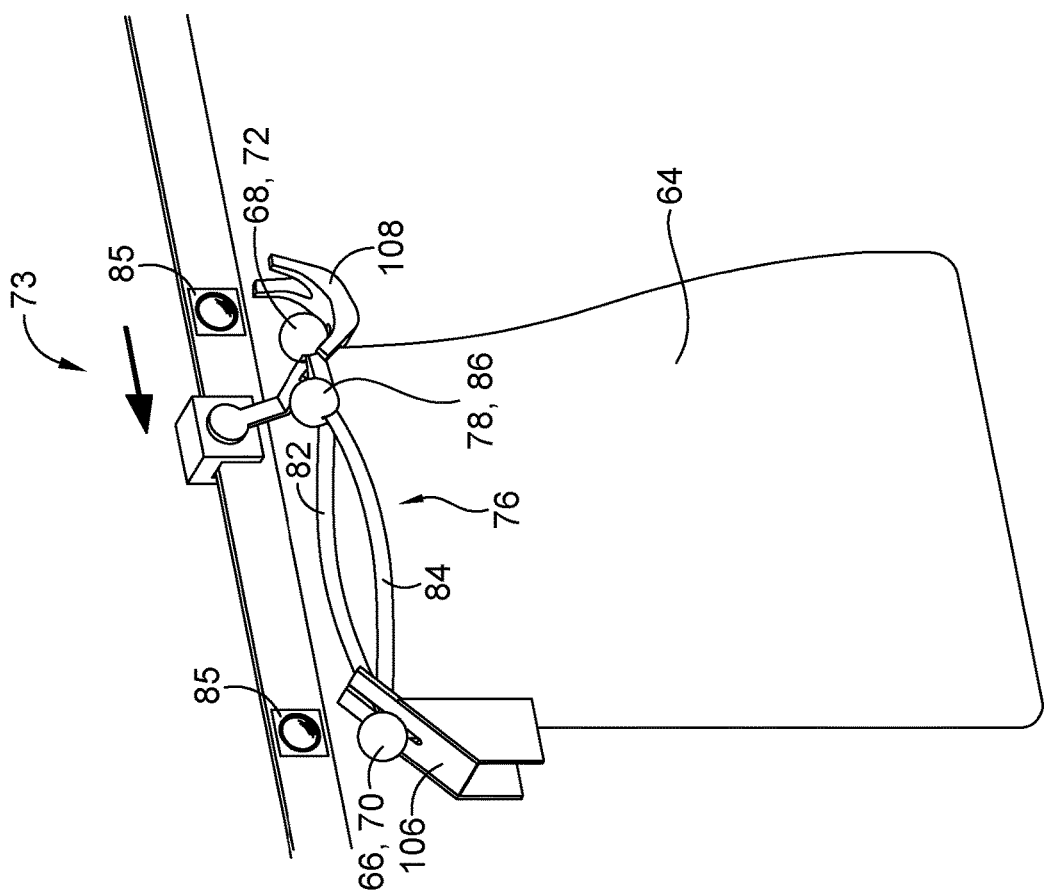
Figure 21:
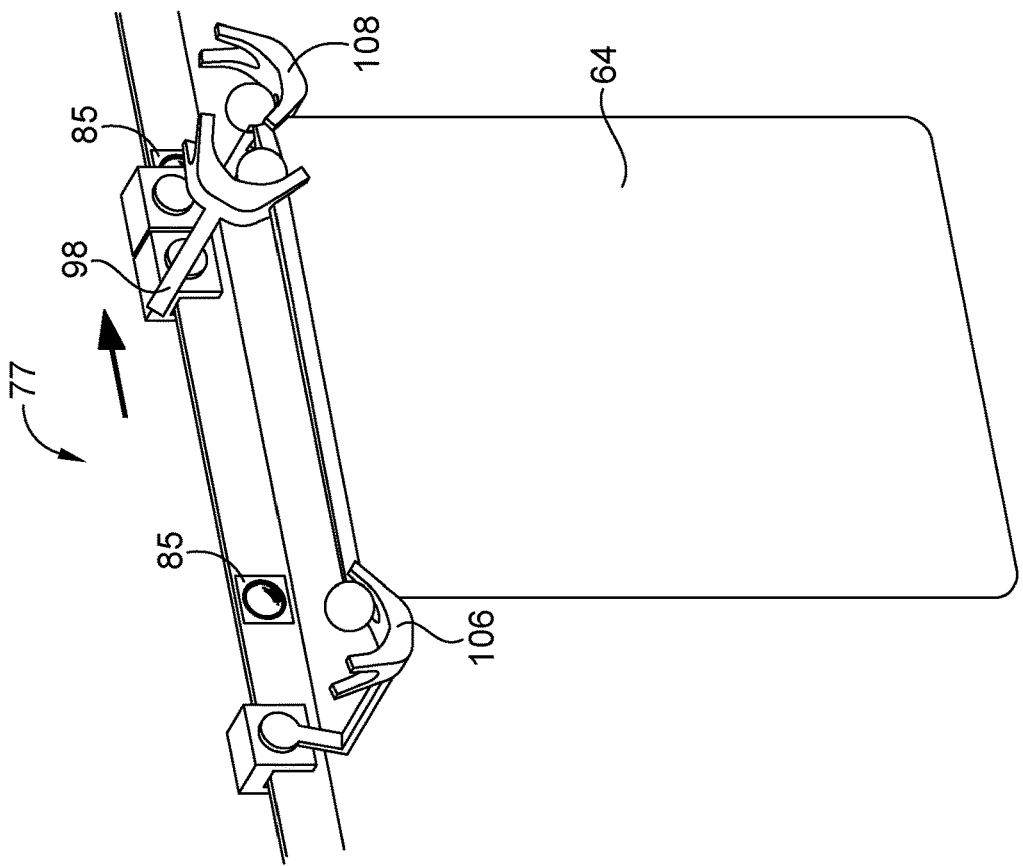
FIGS. 20-22 depict one example operation of a package-handling system, in accordance with an embodiment hereof.
Figure 20:
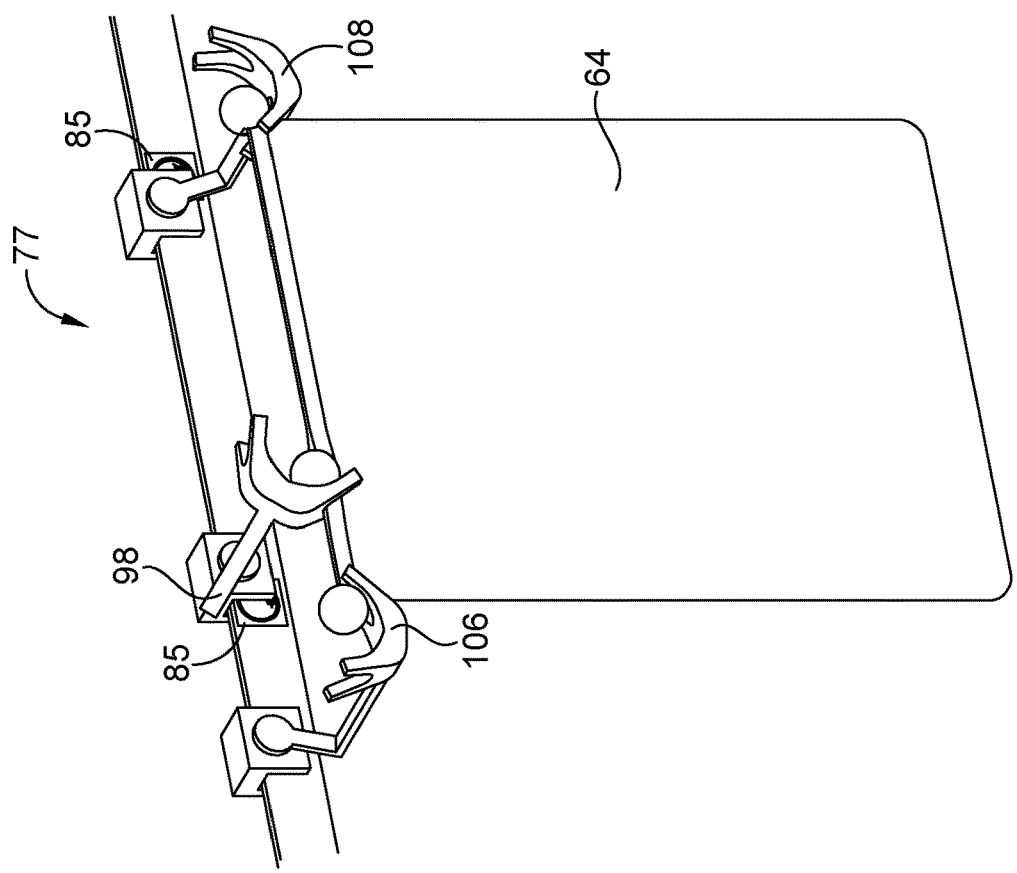
Figure 22:
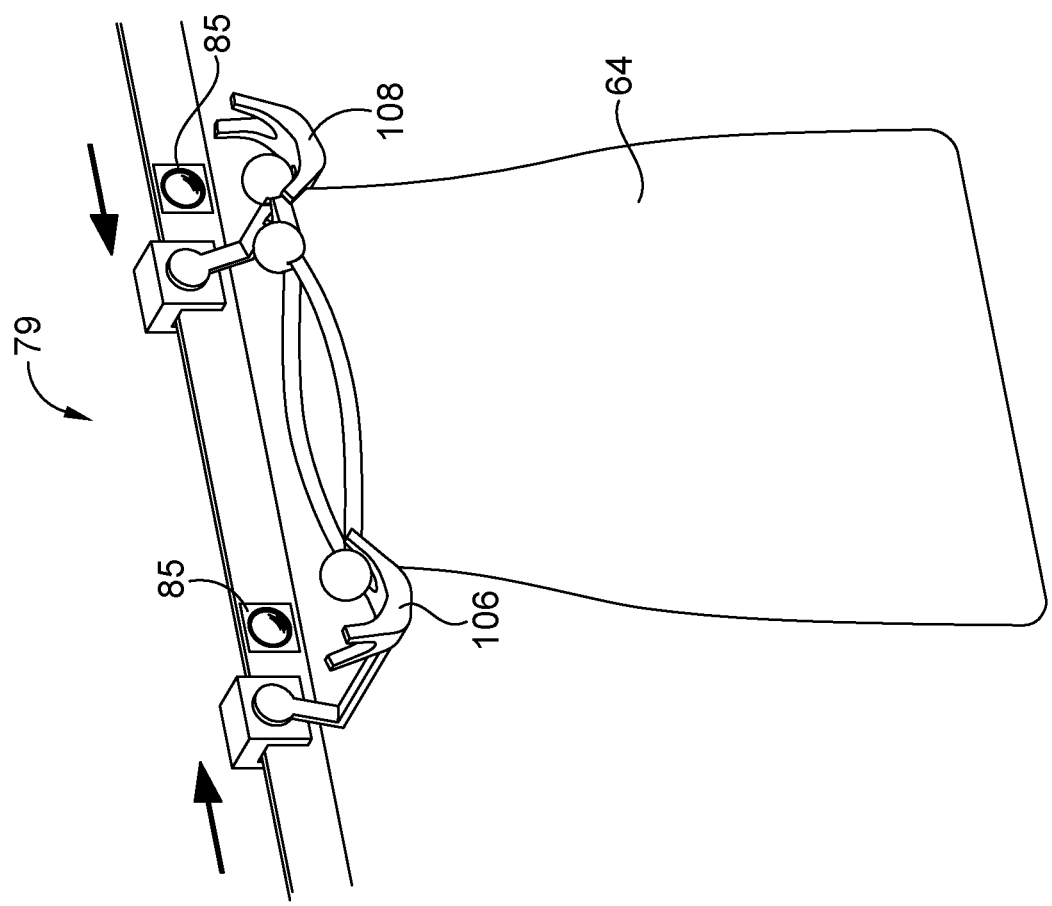

In some embodiments, e.g., as depicted in FIGS. 20-21, the package-engaging structure 106, when engaged with the contact point 66 as shown in FIG. 7, and/or the package-engaging structure 108, when engaged with the contact point 68 as shown in FIG. 7, may be adapted to shift and to impart a tension to the package 64, e.g., through operation of one or more actuators that displace the package-engaging structure 106 and the package-engaging structure 108 apart. For example, at least one of the package-engaging structures 106, 108 may be actuatable to move toward and/or away from the other of the package-engaging structures 106, 108, thereby imparting a tension at the opening edge of the package 64, as depicted in FIGS. 20 and 21, or thereby imparting a slack at the opening edge of the package 64, as depicted in FIGS. 18 and 22. In additional embodiments, one or more other tension-imparting structures may be used to impart and/or maintain a tension with the package. For example, with any of the embodiments described herein, one or more actuatable tension-imparting components may be utilized. These components may be mechanical, electrical, magnetic, hydraulic, and/or pneumatic (e.g., vacuum-powered) in their operation, and may be integrated at different locations on a package-manipulating system and used to impart different outward forces to a package, thereby allowing the package to be tensioned in different directions. This allows a rigid, stable state to be achieved with the package, further supporting the automated or semi-automated manipulation thereof.

In some embodiments, the package-handling system 62 may include one or more detection components, e.g., as depicted and described in connection with FIG. 3, and as shown, for example, by the detection component 85 depicted in FIG. 7. These detection components may be located at one or multiple locations about the package-handling system 62, in different aspects. The detection component 85 may be configured to identify and/or locate the contact point 66 and the contact point 68 on the package 64 (or their corresponding geometric structures 70, 72) in a three-dimensional space in which the package-handling system 62 operates. For example, the detection component 85 and/or components thereof may be configured to identify and/or locate the contact point 66 and the contact point 68 or corresponding geometric structures 70, 72 through image capture and analysis, NFC, and/or through RFID, among other ways. For example, in some embodiments, the geometric structures 70, 72, 86 may each have a unique characteristic and/or a unique identifier that can be detected, located, and/or identified by the detection component 85. This unique characteristic and/or unique identifier may be an identifiable indicia (e.g., a shape, color, indent, protrusion, marker, such as a number or symbol, or other visual indicator), a near-field communication signal, a RFID signal, and/or a machine-readable indicia (e.g., a bar code), or may be a sensor that is detectable by the detection component 85, in different aspects. To provide one example, the geometric structure 70 at the contact point 66 may have thereon a first machine-identifiable and/or machine-locatable feature and the geometric structure 72 at the contact point 68 may comprise a second machine-identifiable and/or machine-locatable feature. The unique characteristics that are identified by the detection component 85 may further include colored handles, visual fiducials, and/or physical fiducials, such as those being of a specific size. However, other detection techniques may be used, and/or other unique characteristics and/or unique identifiers may be used, without departing from the scope hereof.

The package-engaging structure 106 may be configured to be adaptively re-positioned in order to engage the contact point 66 and/or geometric structure 70 based on its location in the three-dimensional space as determined by the detection component 85. In one embodiment, this adaptive repositioning may occur through operation of an actuator coupled to the package-engaging structure 106. Likewise, the package-engaging structure 108 may be configured to be adaptively re-positioned in order to engage the contact point 68 and/or the geometric structure 72 based on its location in a three-dimensional space as determined by the detection component 85. In one embodiment, this adaptive repositioning may occur through operation of an actuator coupled to the package-engaging structure 108. For example, portions of the package-engaging structures 106, 108 may be cooperatively or independently actuatable along the support frame 94 electromechanically, hydraulically, pneumatically, or through use of another automated actuation technology.

The package-manipulator 98 may include or utilize any of the features described in connection with the package-manipulator 48 shown in FIG. 3. In some embodiments, e.g., as depicted in FIGS. 7-17, the package-manipulator 98 may include a package-engaging structure 112 that is movable to a plurality of different positions on the frame 94, such as via operation of an actuator coupled thereto. The actuator may be a motor or the like. The actuation of the package-engaging structure 112 may be performed manually in some instances, or automatically or semi-automatically. The package-engaging structure 112 may be configured to engage the opening/closing mechanism 76 (e.g., by the slider 78) on the package 64 and to open or close the package 64 by shifting the package-engaging structure 112 when engaged with the opening/closing mechanism 76. For example, the package-engaging structure 112 may engage the open/closing mechanism 76 and then push or pull the opening/closing mechanism 76 or the slider 78 thereof to slide along the opening edge of the package 64, thereby forcing the interlocking members 80 apart to open the package 64 or causing the interlocking members 80 to cooperatively interlock with each other to close the package 64.

The package-engaging structure 112 may have any configuration for engaging with the opening/closing mechanism 76 or slider 78 thereof. In some embodiments, e.g., as illustrated in FIGS. 12-15, the package-engaging structure 112 may include a multi-pronged cradle configuration which has a slight curvature sufficient for the opening/closing mechanism's slider 78 or the housing thereof to rest therein. For example, at least two of the prongs of this multi-pronged cradle may be spaced such that at least a portion of the package 64 proximate to the opening edge may slide therebetween when the opening/closing mechanism's slider 78 is being shifted by the package-engaging structure 112.

Figure 11:
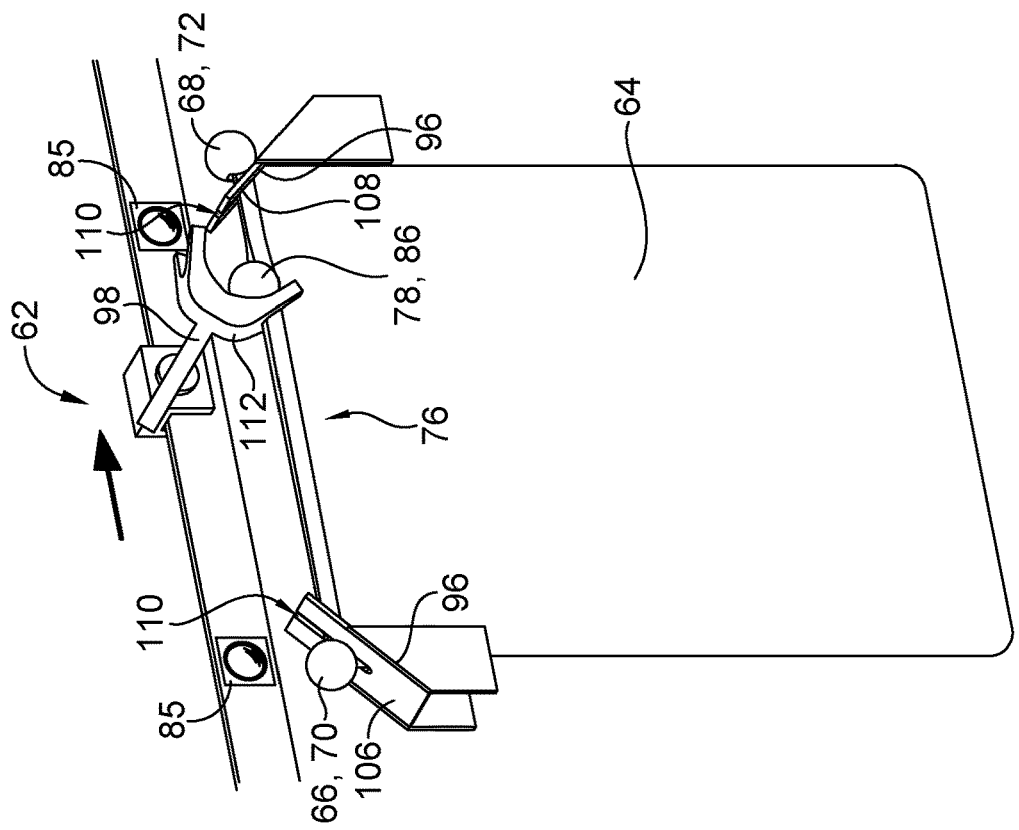
Figure 10:
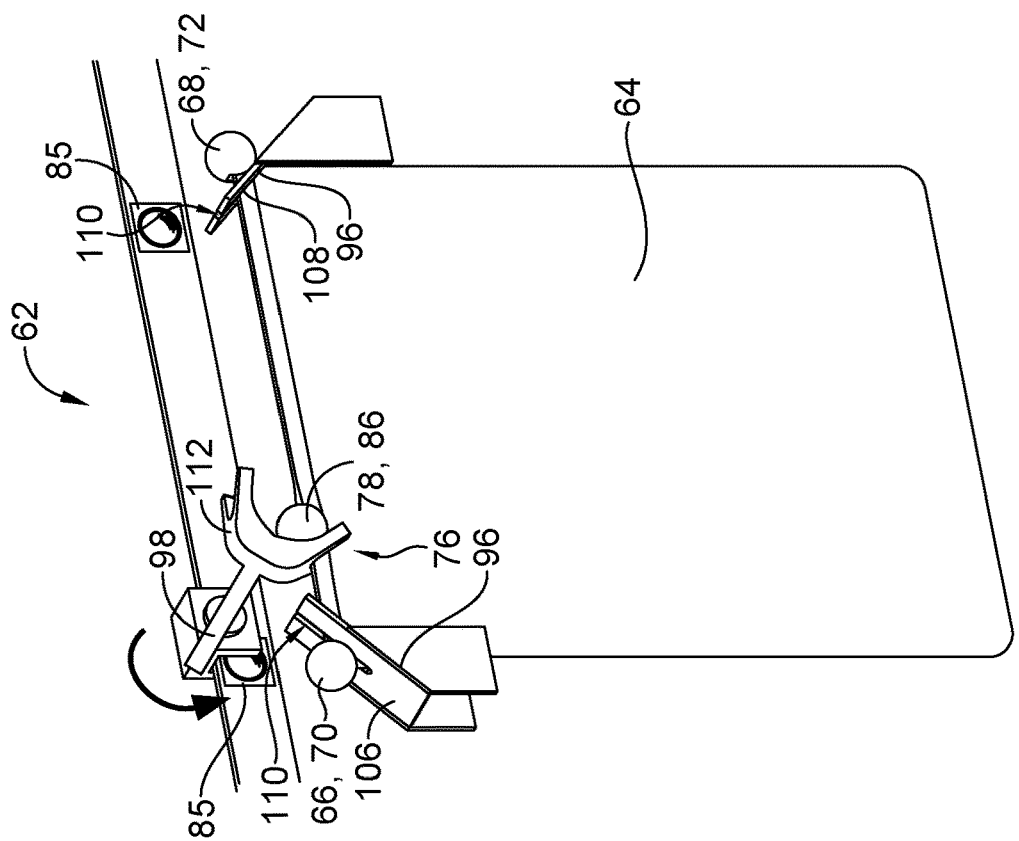
Figure 12:
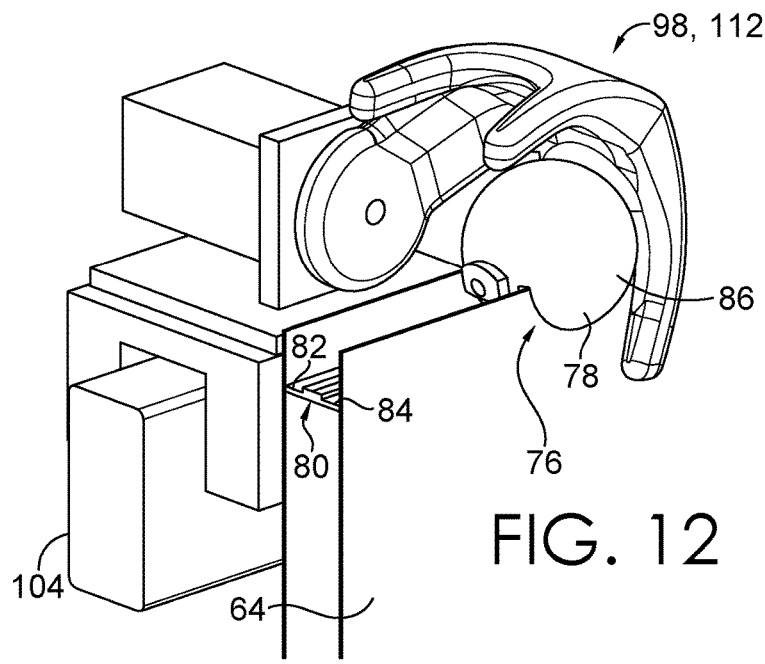
FIGS. 12-13 depict an example package-manipulator, in accordance with an embodiment hereof.
Figure 13:
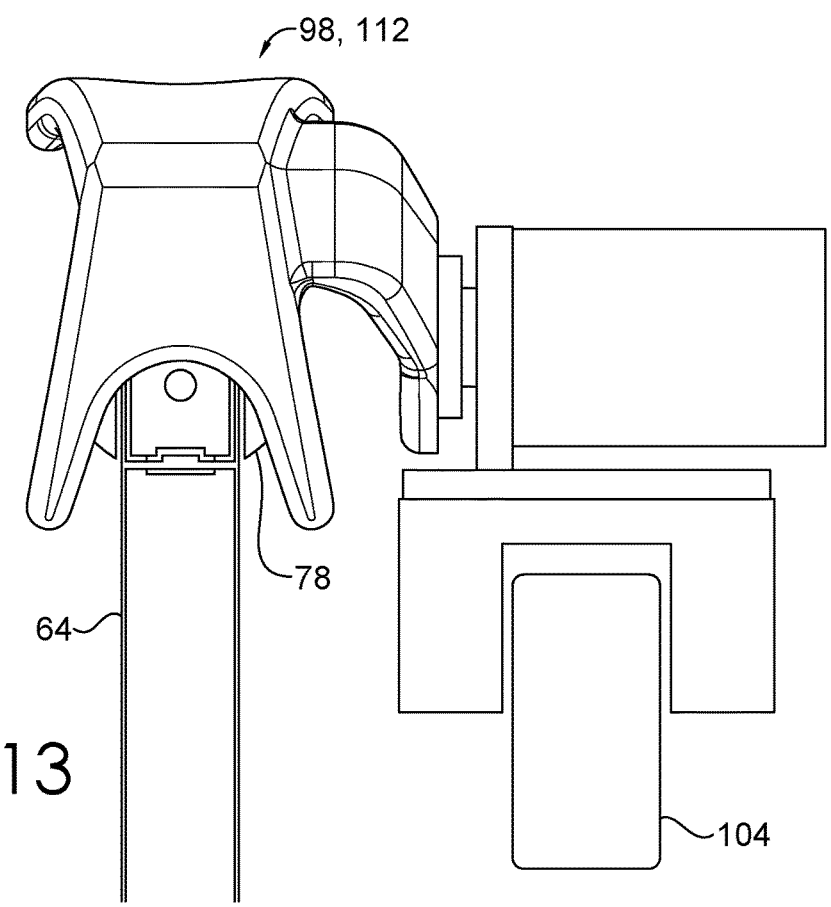
Figure 14:
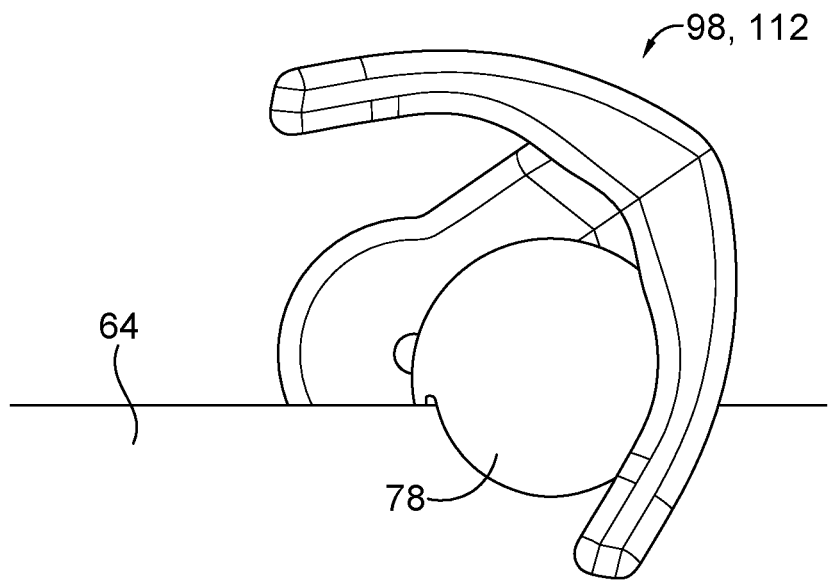
FIGS. 14-15 depict a package-engaging structure also shown in FIGS. 12-13, in accordance with an embodiment hereof.
Figure 15:
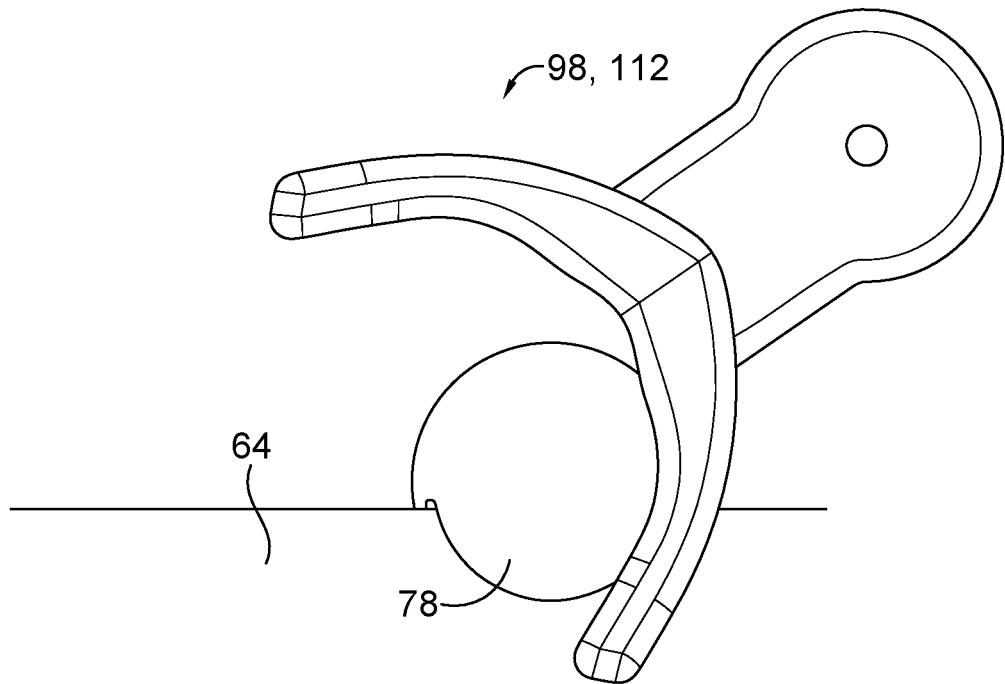
Figure 17:
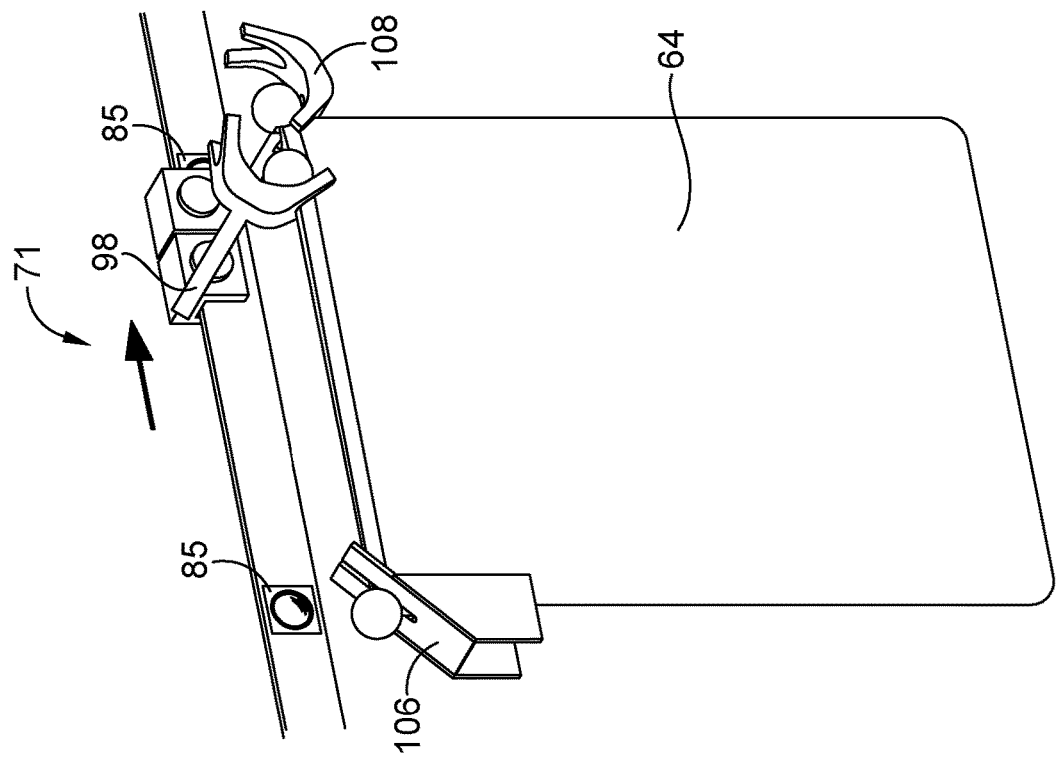
FIGS. 16-18 depict another configuration of a package-handling system, in accordance with an embodiment hereof.
Figure 16:
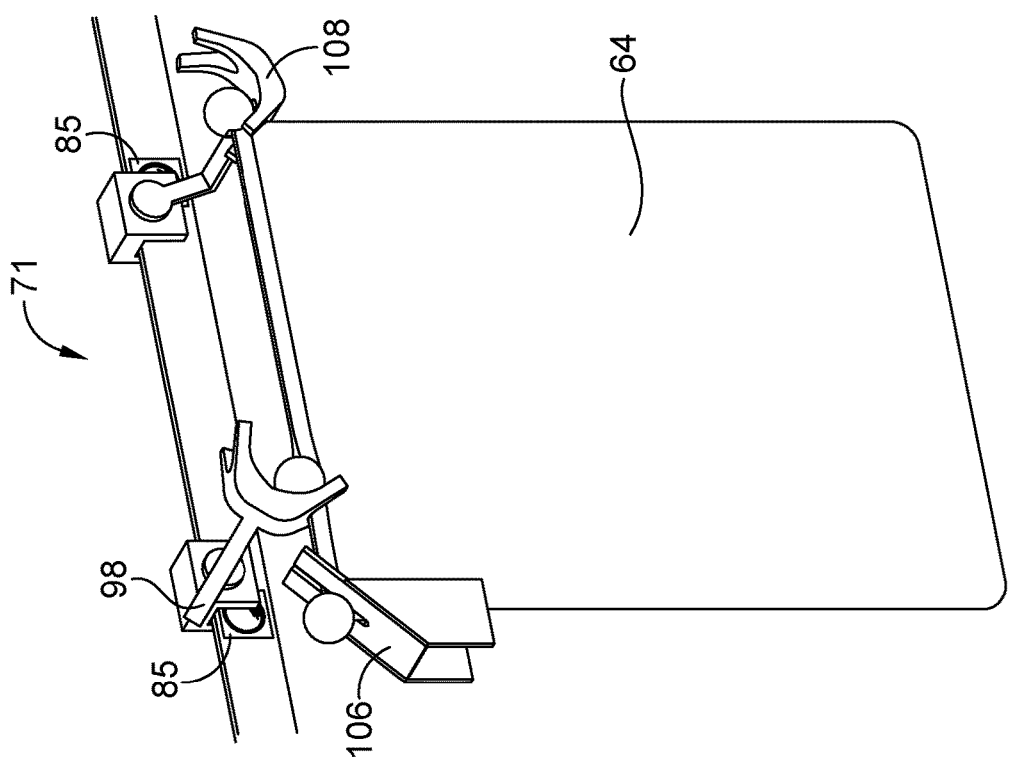

Furthermore, the package-engaging structure 112 may be slidably attached to a portion of the support frame 94, such as on one of the horizontal supports 104 thereof, and pivotable between a first orientation, e.g., as shown in FIGS. 8 and 9, and a second orientation, e.g., as shown in FIGS. 10 and 11. Specifically, the first orientation may allow the package-engaging structure 112 to engage with and push the opening/closing mechanism's slider 78 from the contact point 66 toward the contact point 68 and the second orientation may allow the package-engaging structure 112 to engage with and push the opening/closing mechanism's slider 78 from the contact point 68 toward the contact point 66. This pivoting may be provided through operation of a rotational actuator coupled to the package-engaging structure 112 or to a portion thereof. In addition, in a third orientation, the package-engaging structure 112 may be able to shift past the slider 78 without engaging it.

Figure 19:
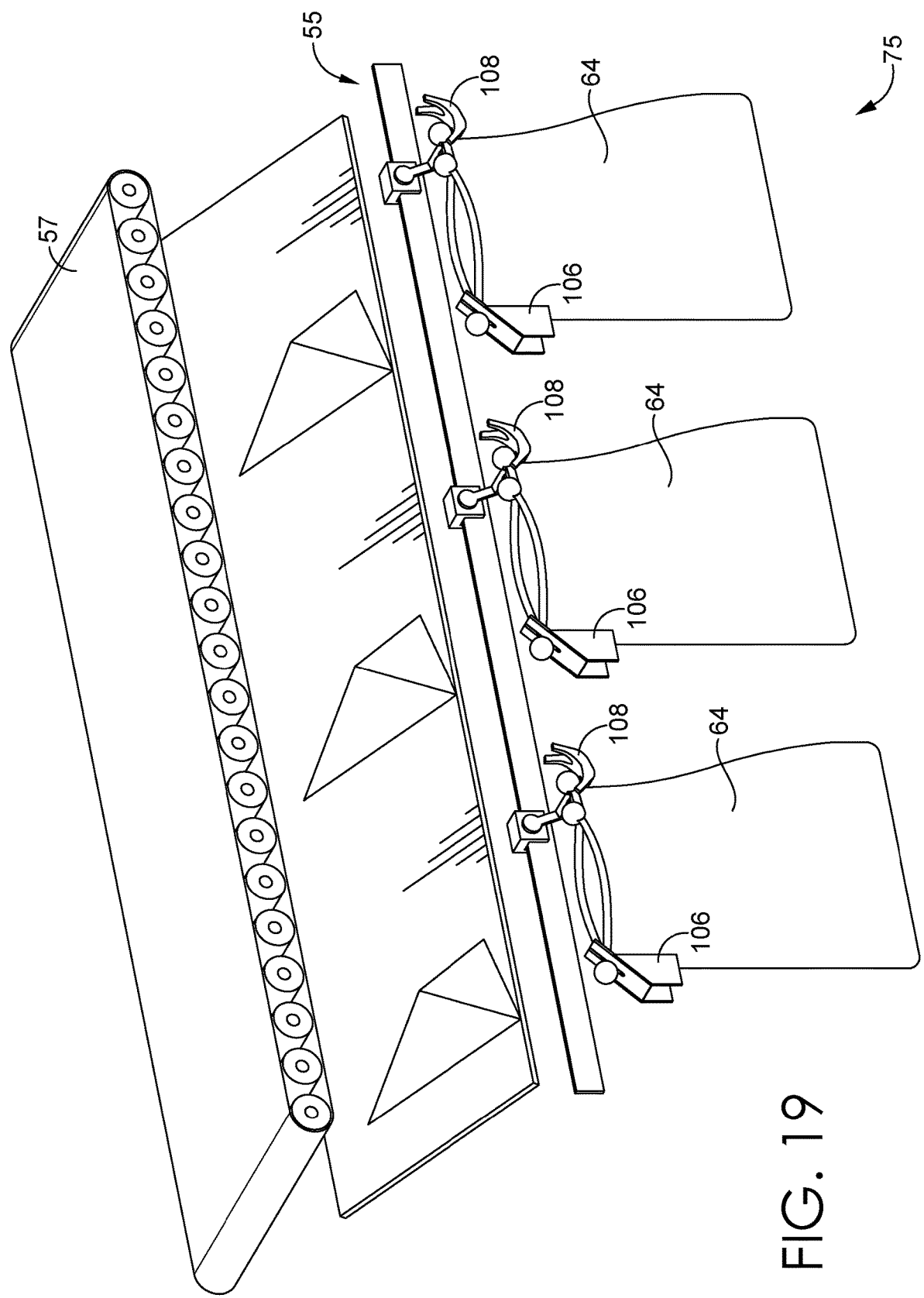
FIG. 19 depicts another configuration of a package-handling system, in accordance with an embodiment hereof.

In some embodiments, e.g., as shown in FIG. 19, a package-handling system, such as the package-handling system 75 shown in FIG. 19, may include a package-supply system, such as the package-supply system 55 shown in FIG. 19, from which packages, such as the packages 64, may be loaded with contents supplied by a contents-supply system, such as the contents-supply system 57 shown in FIG. 19. This transfer may be facilitated through operation of additional components that shift the contents, or the packages 64, as needed during the transfer process. The package-supply system 55 is configured to advance the packages 64 into a three-dimensional space where package handling and manipulation, e.g., opening, closing, loading, unloading, etc., occurs. Furthermore, elements such as the package-holder 96 and the package-manipulator 98 shown in FIG. 7, and the package-supply system 55 shown in FIG. 19, may be configured to operate in coordination, e.g., in automated or semi-automated fashion, to allow for automated handling of the packages 64. The package-supply system 55 and any associated actuatable components described herein (which are not shown in FIG. 19 for clarity) may communicate with and/or be directed by a control system, e.g., the control system 50 described in connection with FIG. 3.

Figure 23:
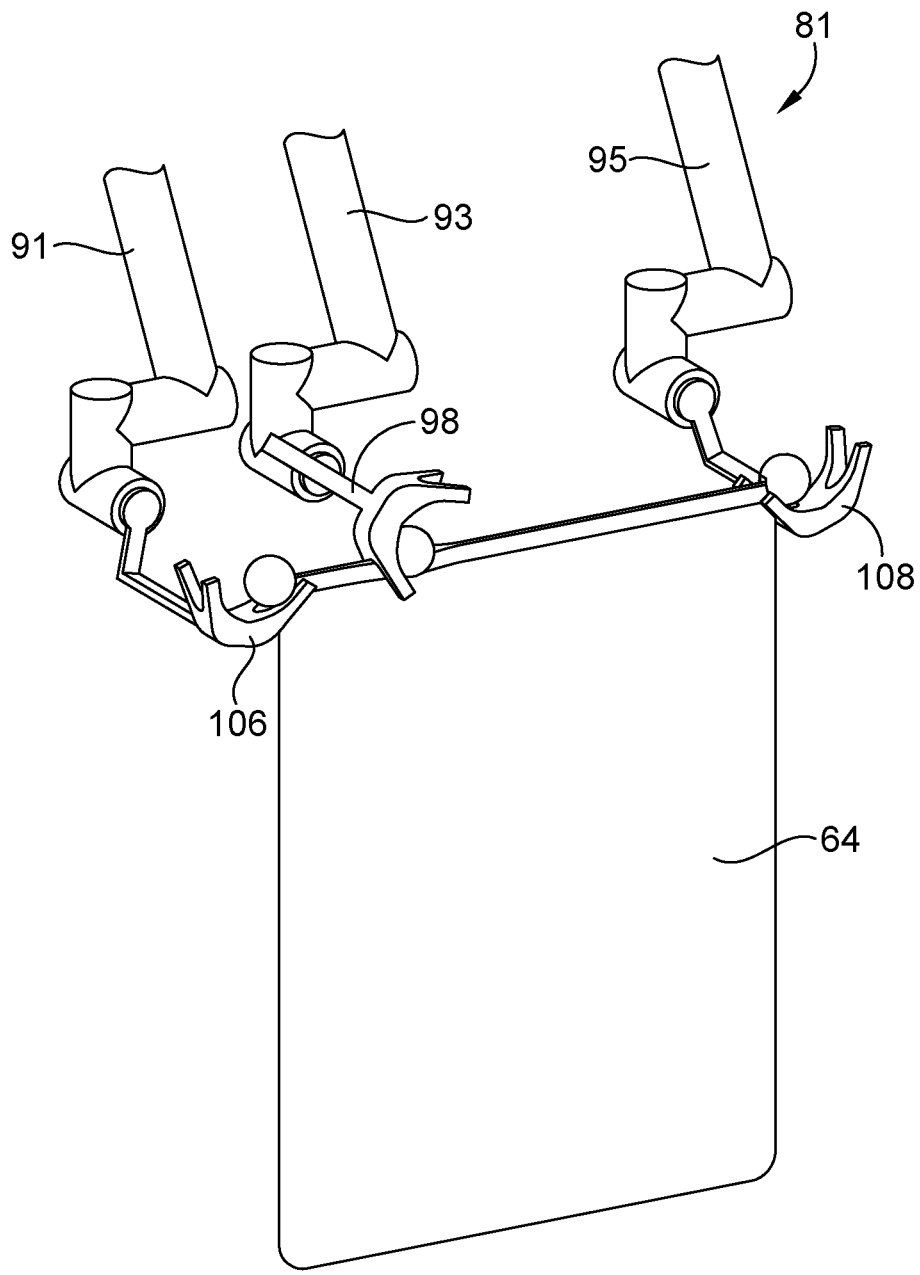
FIG. 23 depicts another configuration of a package-handling system, in accordance with an embodiment hereof.

Referring now to FIG. 23, a package-handling system 81 is shown, in accordance with an embodiment hereof. The package-handling system 81 is configured such that the package-engaging structure 106, the package-engaging structure 108, and the package-engaging structure 112 are each coupled to a corresponding multi-axis robot 91, 93, 95 that allows the package-engaging structures 106, 108, 112 to be adaptively re-positioned, thereby allowing each to dynamically engage with a desired contact point on the package 64. For example, during a process of automated or semi-automated handling of the package 64, the package 64 may be shifted into a three-dimensional space in which the package-handling system 81 operates. The desired points of contact on the package 64 may then be located, e.g., using the detection components described herein, and then the package-engaging structures 106, 108, 112 may be repositioned using their respective multi-axis robots, allowing the desired contact points to be engaged, even if those contact points are not always at the same location.

Figure 24:
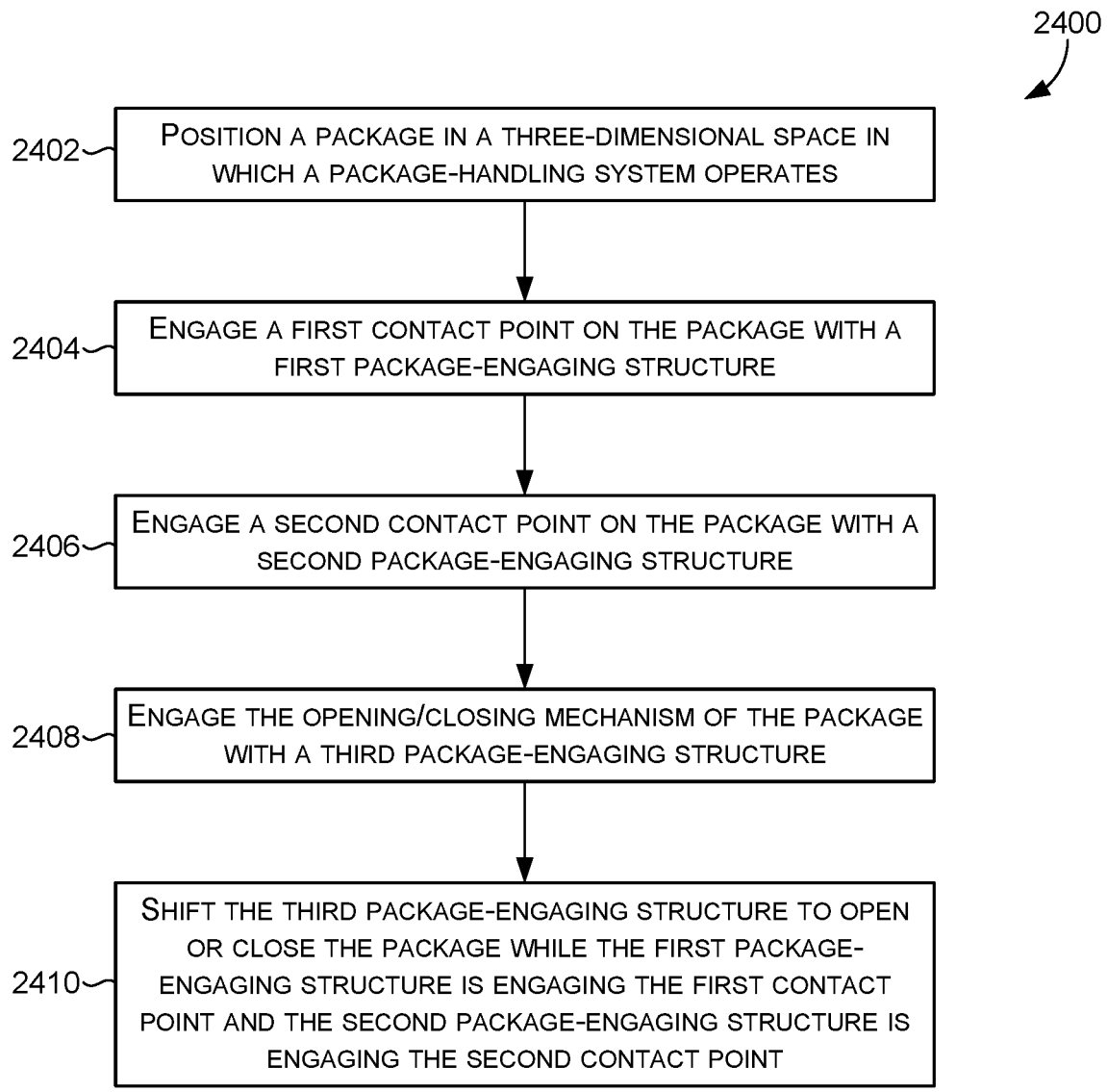
FIG. 24 depicts a block diagram of a method for opening/closing a package in automated or semi-automated fashion, in accordance with an embodiment hereof.

Referring now to FIG. 24, a block diagram of a method 2400 for opening and closing packages in automated or semi-automated fashion is provided, in accordance with an embodiment hereof. The method 2400 is represented by blocks 2402-2410. At block 2402, the method includes positioning a package, such as the package 64 shown in FIG. 7, in a three-dimensional space in which a package-handling system, such as the package-handling system 62, operates. At block 2404, the method includes engaging a first contact point, such as the contact point 66 shown in FIG. 7, on the package with a first package-engaging structure, such as the package-engaging structure 106 shown in FIG. 7. At block 2406, the method includes engaging a second contact point, such as the contact point 68 shown in FIG. 7, on the package with a second package-engaging structure, such as the package-engaging structure 108 shown in FIG. 7. At block 2408, the method includes engaging an opening/closing mechanism of the package, such as the opening/closing mechanism 76 shown in FIG. 7, with a third package-engaging structure, such as the package-engaging structure 112. At block 2410, the method includes shifting the third package-engaging structure to open or close the package while the first package-engaging structure is engaging the first contact point and the second package-engaging structure is engaging the second contact point. It should be noted that the elements of method 2400 may be performed in the order as shown in FIG. 24, or they may be performed in a different order. Further, some blocks may be performed concurrently as opposed to sequentially. In addition, some elements may be omitted. The elements may also be performed using systems other than those shown herein.

In some embodiments, the method 2400 for opening and closing packages in automated or semi-automated fashion may include identifying and/or locating the first contact point and the second contact point in a three-dimensional space using a detection component as described herein. However, this identifying and/or locating step may be omitted in some aspects. In addition, to engage the contact points on the package, the package-engaging structures may be adaptively repositioned to facilitate such engagement, or the package may be adaptively repositioned to facilitate such engagement, or both, in different aspects.

For example, in embodiments in which the package-engaging structures 106, 108 include the multi-pronged cradle configuration or slots 110, the package-engaging structures 106, 108 may be actuated (e.g., raised, lowered, and/or actuated toward each other or away from each other). This actuation may be relative to the support frame 94 or provided through actuation and shifting of portions of the support frame 94. In some embodiments, the package 64 may be dropped or otherwise actuated into the slots 110 or between prongs of the package-engaging structures 106, 108 by various actuators transporting the packages 64 to the package-engaging structures 106, 108. Following any of these actuation techniques, a portion of the package 64 may rest between the prongs or in the slot 110 and the geometric structures 70, 72 of the contact points 66, 68 may be engaged with the package-engaging structures 106, 108.

To provide another example, the package-engaging structure 112 may pivot such that one or more prongs thereof contact a side of the geometric structure 86 or slider 78 of the opening/closing mechanism 76. In some embodiments, engaging the opening/closing mechanism may include identifying the location of the opening/closing mechanism in the three-dimensional space using the detection component and then shifting or otherwise actuating the package-engaging structure to the identified location of the opening/closing mechanism. This may be accomplished using the detection components described herein.

To provide another example, the package-engaging structure 112 may be actuated to push, pull, or otherwise slide the geometric structure 86 or the slider 78 of the opening/closing mechanism 76 from the contact point 66 toward the contact point 68 or from the contact point 68 toward the contact point 66. Additionally, or alternatively, the package-engaging structure 112 may be pushed, pulled, or otherwise slid by any amount or for any distance that is equal to or less than a distance between the contact points 66, 68, thereby moving the opening/closing mechanism slider 78 by this distance.

To provide another example, following the shifting of the package-engaging structure 112 to open the package 64, at least one of the package-engaging structures 106, 108 may be actuated toward or away from each other. In one instance, at least one of the package-engaging structures 106, 108 may be actuated to move them closer together, creating slack and an opening at the opening edge of the package 64, as depicted in FIG. 22. Likewise, imparting tension to the opening edge of the package 64, as depicted in FIGS. 20 and 21, may be provided through actuating at least one of the package-engaging structures 106, 108 apart, e.g., using an actuator coupled thereto.

Package-Handling System for Magnetic-Closing Packages

Figure 29:
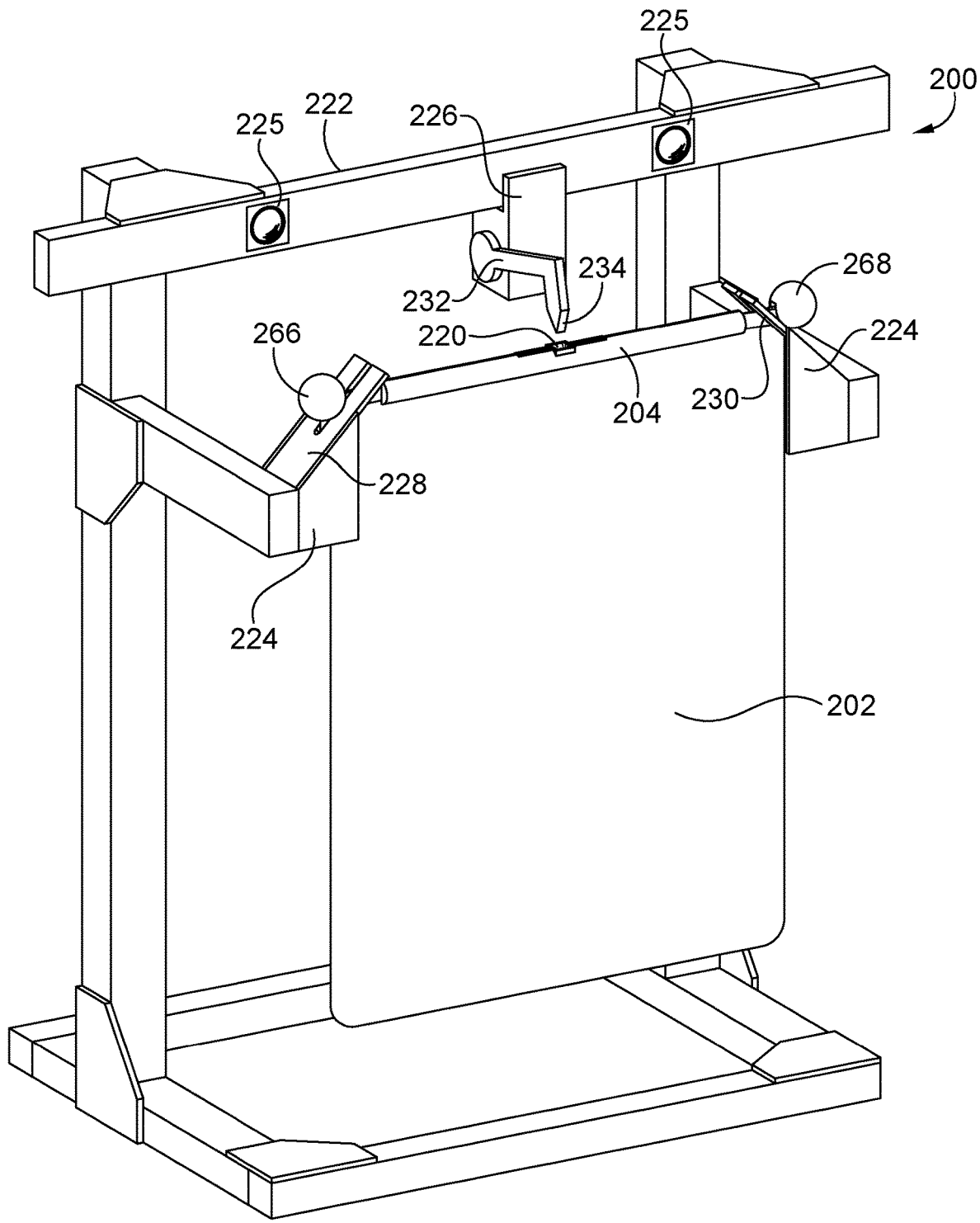
FIG. 29 depicts another package-handling system shown manipulating a package with the opening/closing mechanism shown in FIG. 25, in accordance with an embodiment hereof.

Referring now to FIG. 29, another package-handling system 200 shown manipulating a package 202 is provided, in accordance with an embodiment hereof. In addition, FIGS. 25-28 show different aspects of an opening/closing mechanism 204 located on the package 202 shown in FIG. 29. The opening/closing mechanism 204 depicted in FIGS. 25-28 includes magnetic securing elements that support automated or semi-automated opening and closing of the package 202. The package-handling system 200 depicted in FIG. 29 may include some or all of the features and/or components described in relation to FIGS. 1-23, in different aspects.

The opening/closing mechanism 204 shown in FIGS. 25-28 includes a side 206 and a side 208 that can be transitioned from a closed configuration, e.g., in which the sides 206, 208 are adjoined, to an open configuration, e.g., in which the sides 206, 208 are at least partially separated. The side 206 has a magnet 210 coupled thereto and/or at least partially incorporated therein and the side 208 has a magnet 212 coupled thereto and/or at least partially incorporated therein. The magnet 210 and the magnet 212 are positioned, and oriented, so that the magnets 210, 212 can bias the side 206 and the side 208 towards each other when the magnets are in magnetic proximity, thereby helping to close the opening/closing mechanism 204. The magnets 210, 212 may be considered to be in "magnetic proximity" when the magnets are within a distance that produces a magnetic force between the magnets 210, 212, thereby shifting them towards each other. In additional embodiments, more than one magnet may be used in each side 206, 208, to provide a stronger, or more distributed, magnetic attraction between the sides 206, 208. The multiple magnets on each side 206, 208 in such instances may have corresponding spacing to facilitate attraction. The strength of the magnetic attraction may be configured based on the desired level of force required to open the package 202. The magnets 210, 212 may have any shape, size, or configuration, and may be positioned at any location on the respective sides 206, 208, or if multiple magnets are used, at any number of locations along the sides 206, 208.

The side 206 and the side 208 shown in FIGS. 25-28 are each elongated and form a housing that at least partially surrounds, and/or encloses, the respective magnets 210, 212. In the example aspect depicted in FIGS. 25-28, the side 206 is half of a cylindrical tube or rod and the side 208 is also half of a cylindrical tube or rod. The sides 206, 208 may be formed of any material such as silicone, plastic, rubber, elastomer, and/or any other material that lacks a magnetic attraction, and that can limit the magnets 210, 212 from being magnetically attracted to other magnets or ferromagnetic materials located around the opening/closing mechanism 204. In other words, the strength of the magnets 210, 212, and the depth of the magnets 210, 212 within the material forming the sides 206, 208, may be such that attraction between the magnets 210, 212 is facilitated, but attraction to other objects around the opening/closing mechanism 204 is limited or reduced. The housing of each side 206, 208 may be at least partially rigid and/or may be at least partially malleable. Furthermore, contact points or geometric structures (e.g., 66, 70 and 68, 72, shown in FIG. 7) may be coupled to, or otherwise integrated with, the sides 206, 208, in certain embodiments.

The opening/closing mechanism 204 shown in FIGS. 25-28 depicts the magnet 210 being enclosed, at least partially, in an encasing 203 located on the side 206 and the magnet 212 being enclosed, at least partially, in an encasing 205 located on the side 208. For example, the magnets 210, 212 may be molded, inserted, attached to, or otherwise integrated into the materials used to form sides 206, 208, e.g., during manufacturing of the sides 206, 208. This integration may occur proximate to adjoinable surfaces 214 of the sides 206, 208, in order to allow for magnetic attraction between the sides 206, 208, when the magnets 210, 212 are in magnetic proximity.

In one embodiment, when the opening/closing mechanism 204 is in the closed configuration, a distance between the magnet 210 and the magnet 212 may be less than a distance between the magnet 210 and an outer wall 216 of the encasing 203 and a distance between the magnet 212 and an outer wall 218 of the encasing 205. This may help reduce or limit the magnets 210, 212 from being attracted to other magnets or ferromagnetic materials located inside or outside of the package 202.

In some embodiments, e.g., as depicted in FIGS. 25 and 28, the sides 206, 208 of the opening/closing mechanism 204 may each include an indent, recess, divot, or the like, that in the closed configuration become adjoined to form a single recess 220. For example, the recess 220 may be formed from a rigid portion of the opening/closing mechanism 204, as depicted in FIG. 28, fixed to or integrally formed within the sides 206, 208. The rigid portion forming the recess 220 may even include openings for housing the magnets 210, 212 described above.

The package-handling system 200 shown in FIG. 29 includes a support frame 222, a package-holder 224 coupled to the support frame 222, and a package-manipulator 226 coupled to the support frame 222. The support frame 222 may have any configuration, and may, e.g., be similar to the support frame 94 shown in FIG. 7. The package-handling system 200, in different aspects, may be positioned and configured to receive packages from a package-supply apparatus, including in automated or semi-automated fashion, as described herein.

The package-holder 224 and the package-supply apparatus (not shown) may be configured to operate in coordination to transfer and process packages. For example, the package-supply apparatus may be configured to advance a plurality of packages, e.g., like the package 202, into a three-dimensional space in which the package-handling system 200 and the components thereof operate. The package-holder 224 shown in FIG. 29 is configured to engage the contact point 266 located on the package 202 using the package-engaging structure 228 and to engage the contact point 268 located on the package 202 using the package-engaging structure 230, e.g., in automated or semi-automated fashion. The package-engaging structures 228, 230, in different embodiments, may take on any configuration that is suitable for engaging, supporting, holding, bracing, and/or at least partially locking-in with contact points and/or associated structures of a particular package or series of packages that is/are being manipulated in automated or semi-automated fashion. To facilitate tracking of such packages, the package-handling system may include a detection component, e.g., such as the detection component 225 shown in FIG. 29, which facilitates detecting, identifying, and/or locating packages in a three-dimensional space. In one embodiment, the detection component 225 may be a computer-vision system that has one or more cameras connected to a computing device which processes images captures by the cameras in order to detect, identify, and/or locate objects, such as the package 202.

Looking still at the package-handling system 200 of FIG. 29, the package-manipulator 226 includes a package-engaging structure 232 which is configured to engage the opening/closing mechanism 204 located on the package 202, and subsequently, actuate or shift to displace the side 206 and the side 208 apart against the bias of the magnet 210 and the magnet 212, thereby transitioning the opening/closing mechanism 204 from the closed configuration to the open configuration. The package-engaging structure 232 may comprise, for example, a movable mechanism with a distal end 234 that is used to displace the side 206 and the side 208 apart. The distal end 234 may be configured to adaptively re-position to a location in the three-dimensional space that is between the side 206 and the side 208, e.g., a location of the recess 220, which may be determined based on known position of the contact points 266, 268, or using input from the detection component 225. The distal end 234 may be shaped (e.g., with an angled contour) such that it's insertion into the recess 220 displaces the sides 206, 208 apart, or the distal end 234 may include a mechanism and/or actuator that are operable to shift parts of the distal end 234 apart when the distal end 234 is positioned in the recess 220, thereby also separating the sides 206, 208, in another embodiment. The recess 220, as shown in FIG. 29, is shaped to receive the distal end 234, and in different embodiments, may be shaped to receive or engage with other package-engaging structures. In different embodiments, the distal end 234 may be configured to pivot, expand, or otherwise actuate to shift the sides 206, 208 until the magnets 210, 212 are sufficiently separated such that the opening/closing mechanism 204 can remain in the open configuration. The package-engaging structures 228, 230, in one embodiment, may be shiftable or actuatable towards one another. This may help the sides 206, 208 to bend, bow, and/or flex away from each other and into the open configuration. The package-engaging structures 228, 230 may also be configured such that one or both are shiftable or actuatable away from each other, thereby releasing the bending, bowing, and/or flexing of the sides 206, 208 and transitioning them towards the closed configuration.

The package-handling system 200 may utilize the detection component 225 to determine a location of the contact point 266 and a location of the contact point 268 in a three-dimensional space in which the package-handling system 200 and/or the components thereof operate. Likewise, in additional embodiments, the package-engaging structure 228 may be configured to adaptively re-position in the three-dimensional space, e.g., using one or more actuators coupled thereto, to engage the contact point 266 based on its location in the three-dimensional space as determined by the detection component 225, and the package-engaging structure 230 may be configured to adaptively re-position in the three-dimensional space, e.g., using one or more actuators coupled thereto, to engage the contact point 268 based on its location in the three-dimensional space as determined by the detection component 225. In some embodiments, the package-engaging structure 228, the package-engaging structure 230, and/or the package-engaging structure 232 may each coupled to a separate multi-axis robot, e.g. as shown in FIG. 23, that is operable to re-position the respective package-engaging structure 228, 230, 232 as needed.

Figure 30:
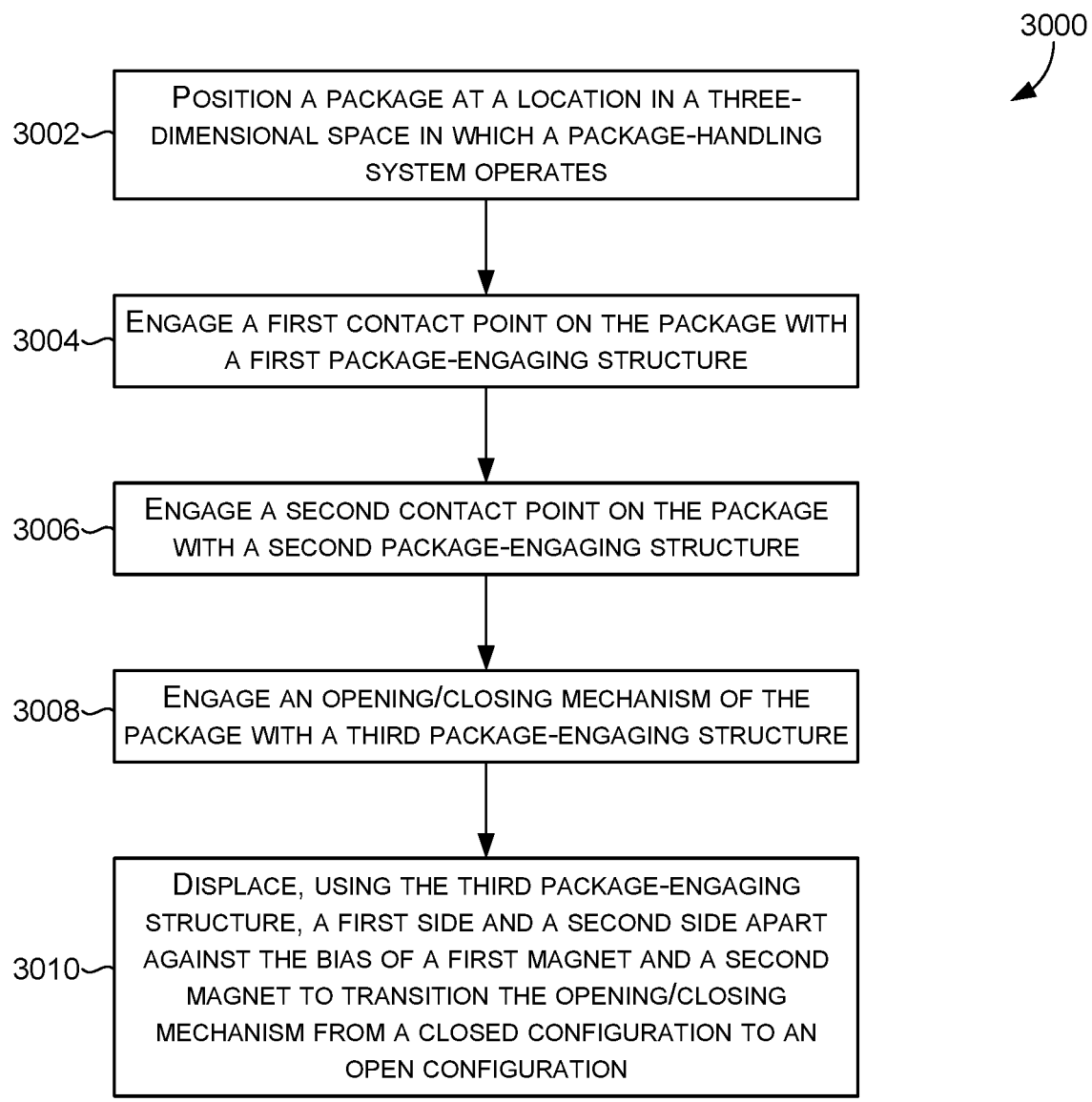
FIG. 30 depicts a block diagram of a method for opening/closing a package in automated or semi-automated fashion, in accordance with an embodiment hereof.

Referring now to FIG. 30, a block diagram of a method 3000 for opening and closing a package in automated or semi-automated fashion is provided, in accordance with an embodiment hereof. The method 3000 is represented by blocks 3202-3210. At block 3002, the method includes positioning a package, e.g., such as the package 202 shown in FIG. 29, at a location in a three-dimensional space in which a package-handling system, e.g., such as the package-handling system 200 shown in FIG. 29, operates. The package may be initially positioned by a package-handling apparatus, and may be shifted so that components of a package-holder may engage and support the package. At block 3004, the method includes engaging a first contact point, e.g., such as the contact point 266 shown in FIG. 29, on the package with a first package-engaging structure, e.g., such as the package-engaging structure 228 shown in FIG. 29. The first package-engaging structure may operate at the direction of a computing device based on feedback from a detection component, such as the detection component 225 shown in FIG. 29. This allows the first package-engaging structure to adaptively reposition, e.g., extend, retract, shift, pivot, etc., to move into position to engage the first contact point based on its particular location in the three-dimensional space. At block 3006, the method includes engaging a second contact point, such as the contact point 268 shown in FIG. 29, on the package with a second package-engaging structure, e.g., such as the package-engaging structure 230 shown in FIG. 29. The second package-engaging structure may operate at the direction of a computing device based on feedback from a detection component, such as the detection component 225 shown in FIG. 29. The allows the second package-engaging structure to adaptively reposition, e.g., extend, retract, shift, pivot, etc., to move into position to engage the second contact point based on its particular location in the three-dimensional space. At block 3008, the method includes engaging an opening/closing mechanism, e.g., such as the opening/closing mechanism 204 shown in FIG. 29, of the package with a third package-engaging structure, such as the package-engaging structure 232 shown in FIG. 29. The third package-engaging structure may operate at the direction of a computing device based on feedback from a detection component, such as the detection component 225 shown in FIG. 29. This allows the third package-engaging structure to adaptively reposition, e.g., extend, retract, shift, pivot, etc., to move into position to engage the second contact point based on its particular location in the three-dimensional space. At block 3010, the method includes displacing, using the third package-engaging structure, a first side, e.g., such as the side 206 shown in FIG. 25, and a second side, such as the side 208 shown in FIG. 25, of the package apart against the bias of a first magnet, e.g., such as the magnet 210 shown in FIG. 25, and a second magnet, e.g., such as the magnet 212 shown in FIGS. 26-27, to transition the opening/closing mechanism from a closed configuration to an open configuration. This manipulating of the opening/closing mechanism may occur through shifting of a distal end of the third package-engaging structure. For example, an angled distal end may be utilized to shift, or pry art, the first and second sides of the opening/closing mechanism, or a distal end with a mechanism may be actuated, shifting components of the distal end apart. These blocks may be performed concurrently as opposed to sequentially. In addition, some blocks may be omitted, or others may be added. The blocks described in connection with the elements of FIG. 32 may be used with any of the embodiments described herein or others not specifically depicted.

Package-Handling System for Manipulating Packages with Other Securing Elements

Figure 31:
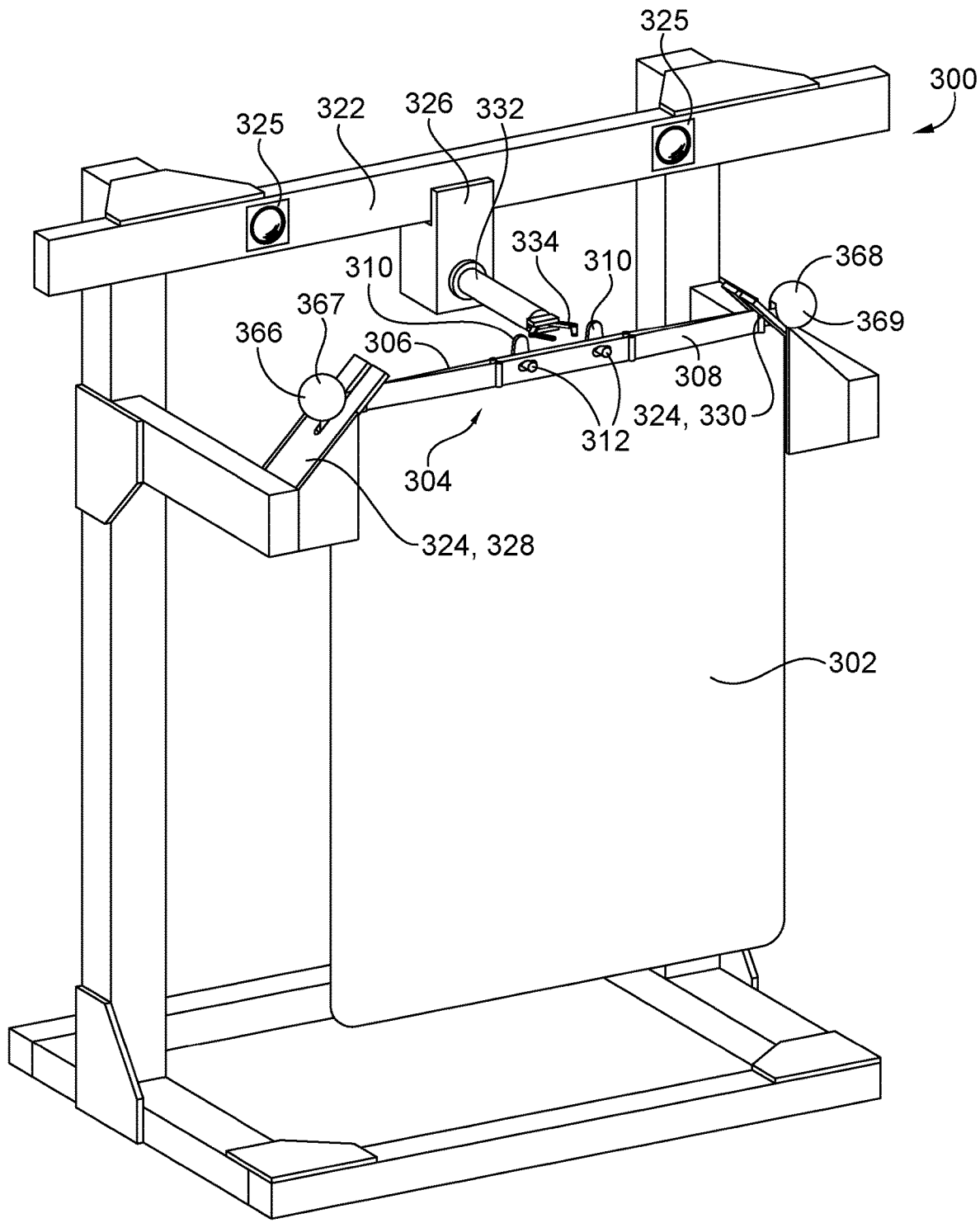
FIG. 31 depicts another package-handling system, in accordance with an embodiment hereof.

Referring now to FIG. 31, another package-handling system 300 useable for manipulating a package in automated or semi-automated fashion is provided, in accordance with an embodiment hereof. The package-handling system 300 is shown handling a package 302 that includes an opening/closing mechanism 304 with securing elements 310, 312 that are releasably attachable thereby allowing the opening/closing mechanism 304 of the package 302 to be secured in a closed configuration. The opening/closing mechanism 304, and the securing elements 310, 312, are configured for automated or semi-automated manipulation as described herein.

The package-handling system 300 and the package 302 shown in FIG. 31 may include any of the features and components described herein. The package 302 shown in FIG. 31 includes an enclosure, e.g., a bag-like storage compartment, formed of a pliable material. The package 302 further includes a contact point 366 and a contact point 368 located at separate locations on the package 302 (e.g., at opposite corners of one side, as shown in FIG. 31, among any other possible locations about the package 302). In addition, a geometric structure 367 is coupled to the package 302 at the contact point 366 and a geometric structure 369 is coupled to the package 302 at the contact point 368. The geometric structures 367, 369 are selected to have a higher degree of rigidity than the pliable material forming the enclosure of the package 302. This allows a package-holder to engage and hold the package 302 when a portion of the package, e.g., the portion formed of the pliable materials, do not have a fixed geometry, to facilitate automated or semi-automated handling and manipulation.

The package 302 includes the opening/closing mechanism 304 which has a side 306 and a side 308, the side 306 having a securing element 310 coupled thereto, formed therethrough or therein, and/or protruding therefrom and the side 308 having a securing element 312 attached thereto, formed therethrough or therein, and/or protruding therefrom. The securing element 310 and the securing element 312 may be configured and/or oriented to be detachably coupled or connected to each other, thereby allowing the side 306 and the side 308 of the opening/closing mechanism 304 to be detachably coupled together, securing the opening/closing mechanism 304 in a closed configuration. In some embodiments, multiple securing elements, such as the securing elements 310, 312, may be coupling along the sides 306, 308, to allow for a stronger and more distributed securement of the sides 306, 308 in the closed configuration.

The securing elements 310, 312 may have any shape or size, and/or may utilize any attachment mechanism that allows adjoining securing elements to mate with each other and then be mechanically released from engagement with each other. In some embodiments, the securing elements 310, 312 may be male/female couplings and/or latching structures. For example, the securing elements 310, 312 may include male and female snap-style connectors, hook-and-loop closures, quarter-turn fasteners, bayonet-style sliding connectors, an electrostatic closure, or the like. For example, a set of quarter-turn or Dzus fasteners, as depicted in the example aspect shown in FIG. 31, may be attached in rotational mounts to a plate, which may be mounted on the side 306 or the side 308, and a similar plate with mating features may be mounted to an opposite one of the side 306 or the side 308 of the opening/closing mechanism 304. Furthermore, guidance features may be provided to ensure that the quarter-turn fasteners, or other alignable securing elements, mate correctly with corresponding features. The quarter-turn fasteners, or other similar adjustable securing elements, may be coupled to an actuating arm mechanically linked thereto such that when the actuating arm is moved, a number of the quarter-turn fasteners rotate from one position to another position (e.g., from a locked position to an unlocked position or the opposite). In some embodiments, an actuating mechanism may slide thin vertical bars into slots in the plate that carries the quarter-turn fasteners and cause the fasteners to rotate therewith. However, other unlocking mechanisms may be used without departing from the scope hereof.

In one embodiment, the securing elements may be bayonet-style sliding connectors. In this aspect, the securing elements 310, 312 may be similar to the quarter-turn fasteners, except with a linear bayonet connector provided in the plate on one side of the opening/closing mechanism 304. In another embodiment, the securing elements 310, 312 may be an electrostatic closure element that includes an electrostatic gripper panel on the one side of the opening/closing mechanism 304, which applies an electrostatic force to a mating panel on the other side of the opening/closing mechanism 304. Different techniques may be used to drive the gripper panel. For example, a large capacitor may be used to provide a voltage difference required to operate the electrostatic gripper. The capacitor may be discharged to open the package or charged to close the package using an automated or semi-automated system.

In another embodiment, the securing elements 310, 312 may be spring pins that are provided on a plate located on one side of the opening/closing mechanism 304 with corresponding receivers or mating features provided on or through a plate on the opposite side of the opening/closing mechanism 304. In addition, guiding features may be provided on one side of the opening/closing mechanism 304 to help the spring pins mate with the corresponding receivers or mating features on the other side. The spring pins may be designed to incorporate complex open-close force profiles to ensure the opening/closing mechanism 304 remains closed until operated on in a specific manner by various ones of the systems described herein.

Looking still at FIG. 31, the package-handling system 300 may be positioned and configured to receive packages from a package-supply apparatus, e.g., the package-supply apparatus 29 described in connection with FIG. 2. The package-handling system 300 shown in FIG. 31 includes a support frame 322, a package-holder 324 coupled to the support frame 322, and a package-manipulator 326 coupled to the support frame 322. The support frame 322 may have any configuration, and may be similar to the support frames 94, 222 described herein, or different.

The package-holder 324 and the package-supply apparatus (not shown) may be configured to operate in coordination as described herein. The package-supply apparatus may be configured to advance a plurality of packages, e.g., such as the package 302, into a three-dimensional space in which the package-handling system 300 and the components thereof operate. Furthermore, the package-holder 324 may include a package-engaging structure 328 and a package-engaging structure 330. These package-engaging structures 328, 330 may be similar or identical to those described in previous sections. The package-holder 324 may be configured to engage a contact point 366 on the package 302 using the package-engaging structure 328 and engage a contact point 368 on the package 302 using the package-engaging structure 330.

The package-manipulator 326 includes a package-engaging structure 332 that is configured to engage the opening/closing mechanism 304 of the package 302, and displace the side 306 and the side 308 apart, thereby transitioning the opening/closing mechanism 304 from a closed configuration to an open configuration. This process may also include decoupling the securing element 310 and the securing element 312. To facilitate this, the package-engaging structure 332 may include, for example, a mechanism coupled to a distal end 334. The mechanism may be configured to shift the distal end 334 to engage, and decouple, the securing elements 310, 312, and in some aspects, subsequently, displace the side 306 and the side 308 apart from each other to thereby shift the opening/closing mechanism 304 from a closed configuration to an open configuration. The distal end 334 of the package-engaging structure 332 may be configured to adaptively re-position to a location in the three-dimensional space that is between the side 306 and the side 308 and/or proximate to the securing elements 310, 312, thereby allowing the mechanism to decouple the securing element 310 and the securing element 312, and/or actuate to displace the side 306 and the side 308 apart. In one embodiment, the sides 306, 308 may be configured to naturally bias or shift away from each other when the securing elements 310, 312 are decoupled. In another embodiment, the distal end 334 may include separate elements that can be actuated to shift the sides 306, 308 apart. In other embodiments, the distal end 334 may comprise a grip, claw, hook, engagement slot, expandable mechanism or pincer, or another structure that can engage and decouple the securing elements 310, 312, and/or separate the sides 306, 308.

The package-engaging structures 328, 330 may be configured so that one or both are actuatable toward each other upon the decoupling of the securing elements 310, 312, thereby flexing the sides 306, 308 away from each other into the open configuration. Likewise, the package-engaging structures 328, 330 may be configured such that one or both are actuatable away from each other, to impart tension, e.g., to release the flexing of the sides 306, 308 and transition them toward the closed configuration, or to brace the package for further manipulation.

The package-handling system 300 may include a detection component 325 configured to detect a location of the contact point 366 and a location of the contact point 368 in a three-dimensional space within which the package-handling system 300 operates. Likewise, the package-engaging structure 328 may be configured to adaptively re-position to engage the contact point 366 based on its location in the three-dimensional space as determined by the detection component 325. The package-engaging structure 330 may be configured to adaptively re-position to engage the contact point 368 based on its location in the three-dimensional space as determined by the detection component 325. In one embodiment, the package-engaging structure 328, the package-engaging structure 330, and/or the package-engaging structure 332 may each be coupled to a separate multi-axis robot. The detection component 325, as described herein, may utilize computer-vision, NFC, RFID, or another process to detect, identify, and/or locate any particular points on a package in relation to different structures of the package-handling system 300. In addition, the contact point 366 and/or its associated geometric structure, the contact point 368 and/or its associated geometric structure, and/or the opening/closing mechanism 304 may be machine identifiable and/or machine-locatable by the detection component, e.g., based on a unique identifier associated therewith, as described herein.

Figure 32:
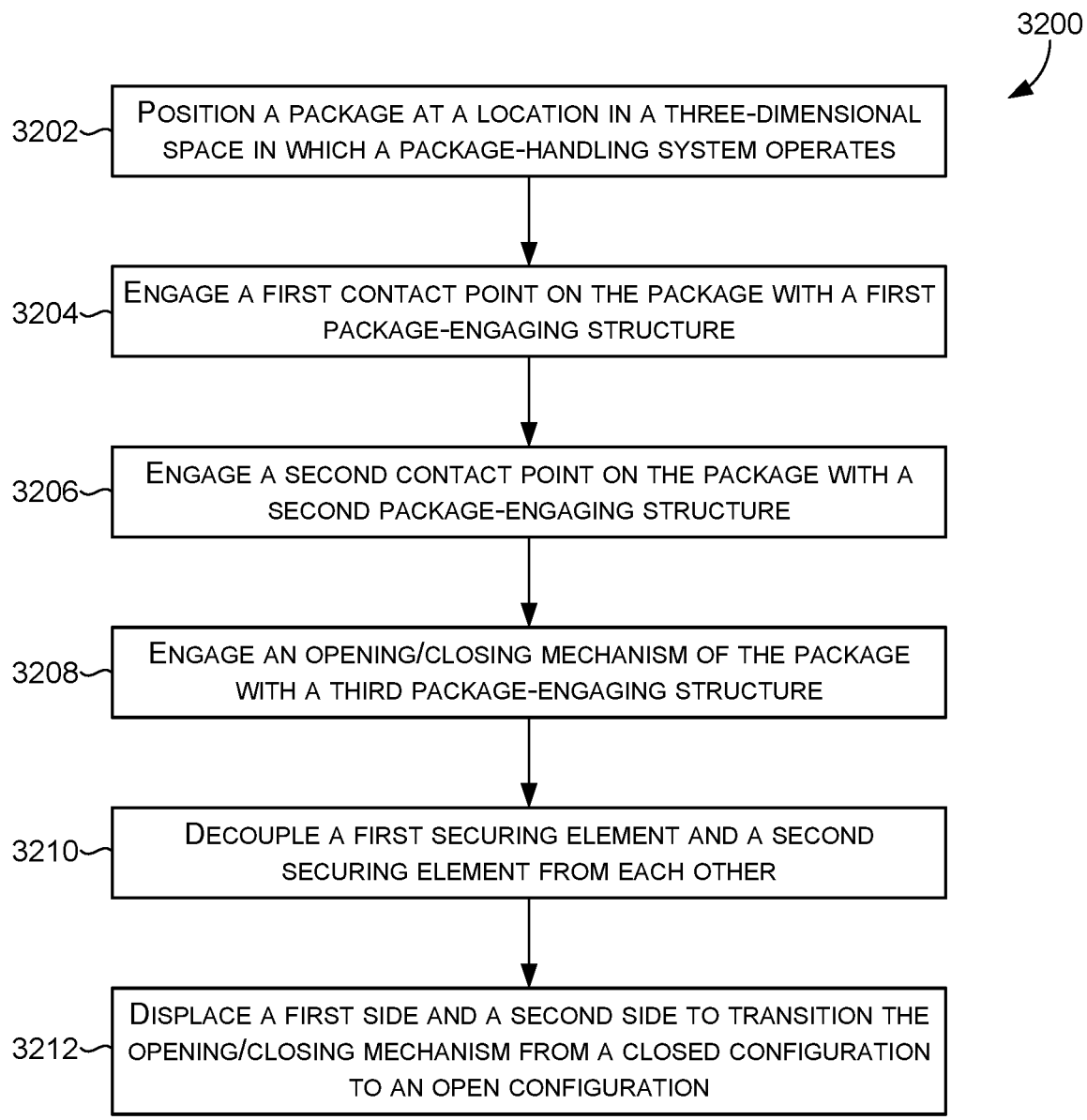
FIG. 32 depicts a block diagram of an example method for opening/closing a package in automated or semi-automated fashion, in accordance with an embodiment hereof.

Referring now to FIG. 32, a block diagram of an example method 3200 for opening or closing a package in automated or semi-automated fashion is provided, in accordance with an embodiment hereof. The method 3200 is represented by blocks 3202-3212. At block 3202, the method includes positioning a package, e.g., such as the package 302, at a location in a three-dimensional space in which a package-handling system, e.g., such as the package-handling system 300 shown in FIG. 31, operates. At block 3204, the method includes engaging a first contact point, e.g., such as the contact point 366 shown in FIG. 31, on the package with a first package-engaging structure, e.g., such as the package-engaging structure 328 shown in FIG. 31. At a block 3206, the method includes engaging a second contact point, e.g., such as the second contact point 368, on the package with a second package-engaging structure, such as the package-engaging structure 330 shown in FIG. 31. At block 3208, the method includes engaging an opening/closing mechanism, such as the opening/closing mechanism 304 shown in FIG. 31, of the package with a third package-engaging structure, such as the package-engaging structure 332 shown in FIG. 31. At a block 3210, the method includes decoupling a first securing element, e.g., such as the securing element 310 shown in FIG. 31, of the opening/closing mechanism and a second securing element, e.g., such as the securing element 312, of the opening/closing mechanism from each other. At a block 3212, the method includes displacing a first side, e.g., such as the side 306 shown in FIG. 31, and a second side, e.g., such as the side 308 shown in FIG. 31, to transition the opening/closing mechanism from a closed configuration to an open configuration. These blocks may be performed in the order as shown in FIG. 3200, or they may be performed in a different order. Further, some blocks may be performed concurrently as opposed to sequentially. In addition, some blocks may be omitted, or others may be added. The blocks described in connection with the elements of FIG. 32 may be used with any of the embodiments described herein or others not specifically depicted.

Alternative Package Configurations for Use with the Package-Handling Systems Described Herein Referring now to FIGS. 33-41, different packages and different opening/closing mechanisms suitable for automated or semi-automated handling and manipulation are provided, in accordance with embodiments hereof.

Figure 34:
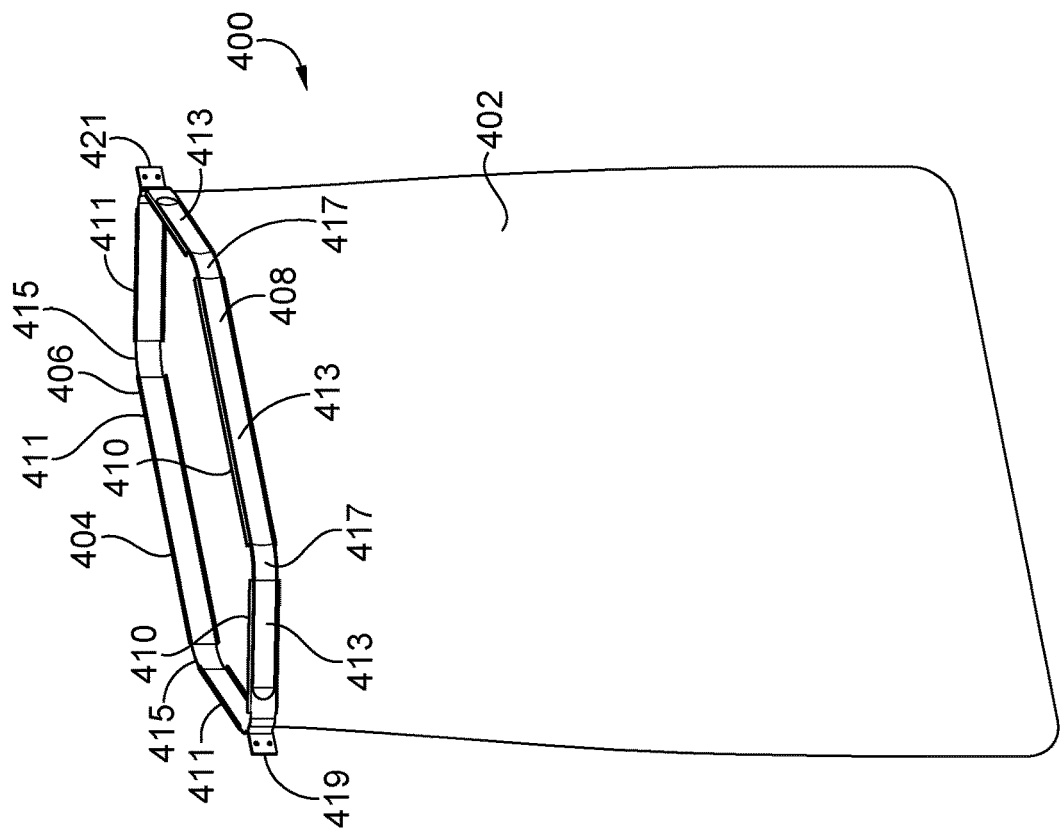
FIGS. 33-34 depict another package adapted for automated or semi-automated handling and manipulation, in accordance with an embodiment hereof.
Figure 33:
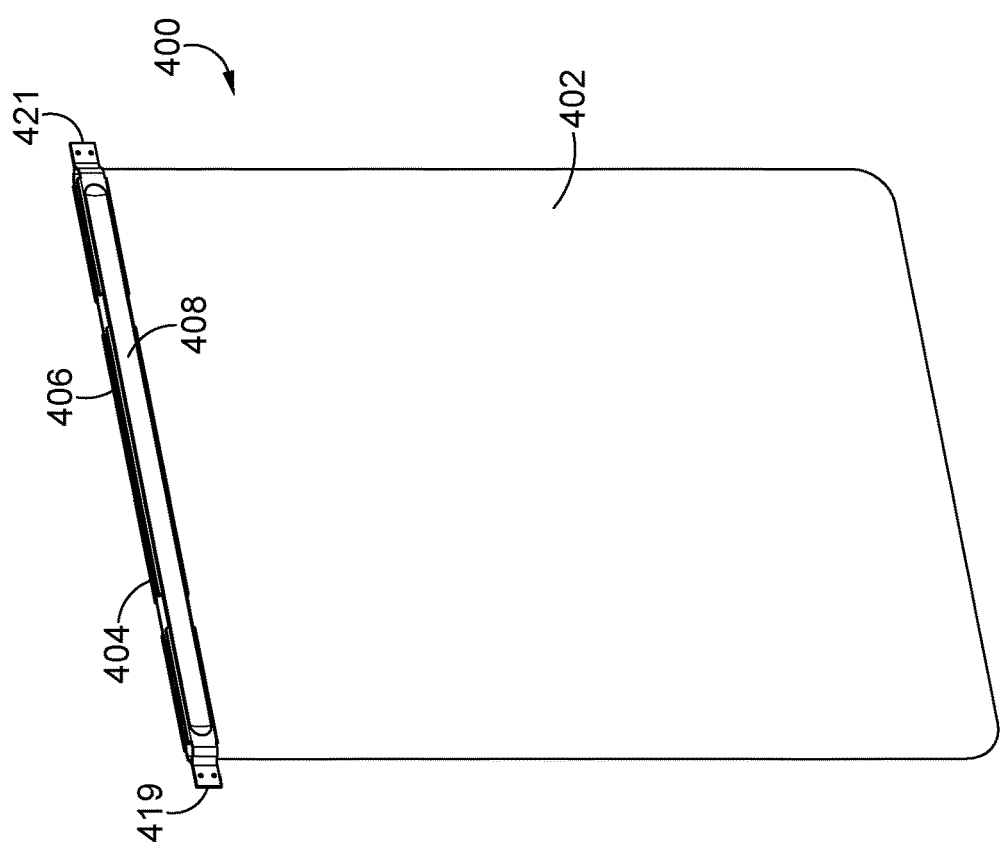

Looking at FIGS. 33-34, a package 400 configured for automated or semi-automated handling and manipulation, e.g., opening and closing, is depicted, in accordance with an embodiment hereof. The package 400 includes an enclosure 402, e.g., a bag-like storage portion formed of one or more pliable materials that can change geometry, and an opening/closing mechanism 404, which is formed, at least in part, of more rigid or less pliable materials or structures compared to the enclosure 402. The opening/closing mechanism 404 includes a side 406 and a side 408 that are designed to fold or bend in a preconfigured manner when manipulated. For example, when transitioning from a closed configuration to an open configuration, the opening/closing mechanism 404 bends to form a particular shape, e.g., a polygonal shape, or oval shape, generally speaking. In one aspect, the elements forming the opening/closing mechanism 404 may be biased to resist bending outward, i.e., towards the open configuration, thereby helping to maintain a closed configuration.

Looking still at FIGS. 33-34, the sides 406, 408 of the opening/closing mechanism 404 each include at least two portions, or sections, of different pliability. This allows the sides 406, 408 to bend in a pre-configured manner during displacement. For example, the side 406 and the side 408 of the opening/closing mechanism 404 may each include multiple, e.g., two, three, or four, etc., rigid sections. The opening/closing mechanism 404 shown in FIGS. 33-34 includes rigid sections 411, 413 extending respectively along opposite sides that are interconnected by comparatively less rigid, or less stiff, sections 415, 417 that bend more easily than the rigid sections 411, 413. For example, the sections 415, 417 may be crimped sections, hinges, relatively-thinner portions of material, or different, more pliable portions of material, or other types of joints or junctions that allow the rigid sections 411, 413 to pivot relative to each other when the sides 406, 408 are displaced and shifted toward an open configuration. It should be noted that any number of rigid and less rigid interposed sections may be used in different embodiments, to provide a desired preconfigured pattern in a particular opening/closing mechanism. The opening/closing mechanism 404 shown in FIGS. 33-34 also includes end structures 419, 421, which may be more rigid than other portions of the package 400, e.g., such as the enclosure 402, and which may have integrated geometric structures (e.g., tabs with holes as shown in FIGS. 33-34) that may be used for securing or holding the package 402 during a process of automated or semi-automated handling and manipulation, as described herein.

Figure 35:
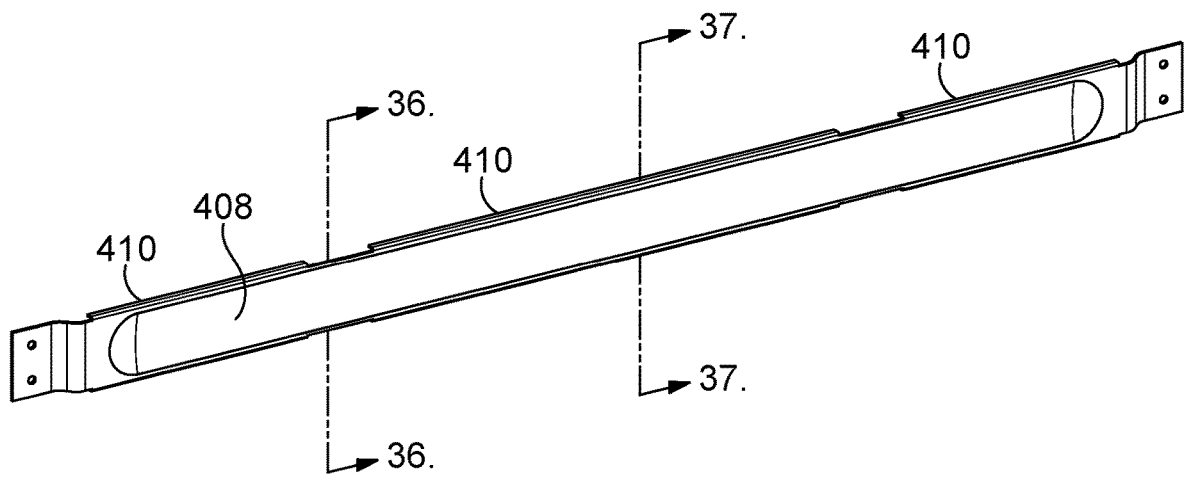
FIGS. 35-37 depict another example of an opening/closing mechanism configured for automated or semi-automated handling and manipulation, in accordance with an embodiment hereof.
Figure 36:
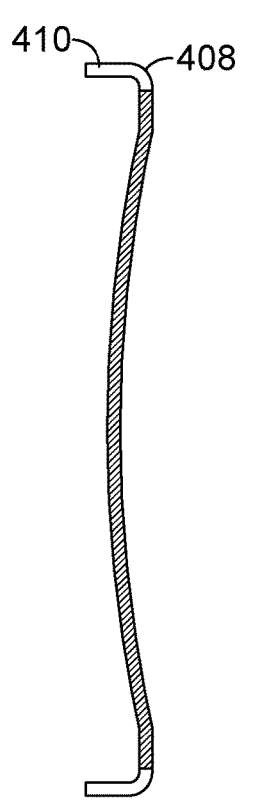
Figure 37:
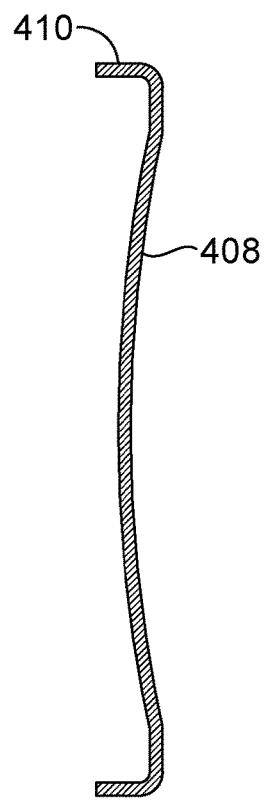
Figure 38:
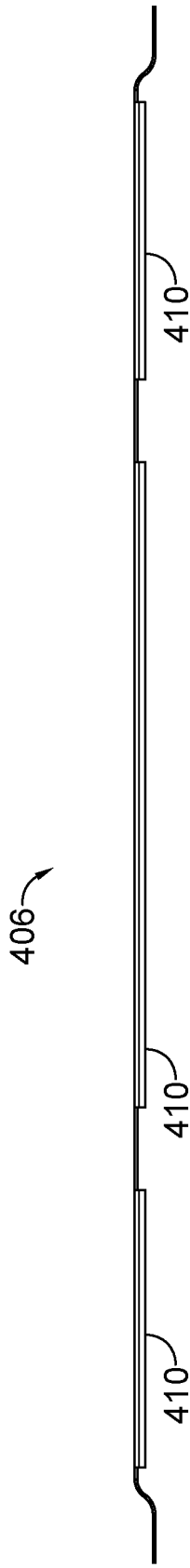
FIGS. 38-39 depict another example of an opening/closing mechanism configured for automated or semi-automated handling and manipulation, in accordance with an embodiment hereof.
Figure 39:
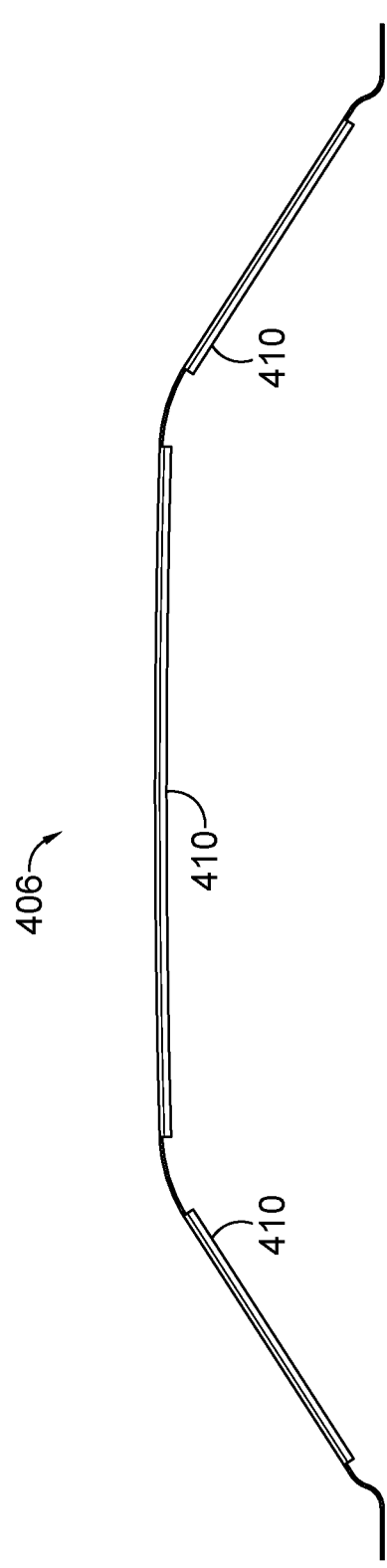

The sides 406, 408 of the opening/closing mechanism 404 may also include rolled or bent edges 410 at select locations along a length of each of the side 406 and the side 408, as shown in FIGS. 35 and 38-39. These rolled or bent edges 410 may create local stiffness at select locations along a length of the side 406 and the side 408, thus making these select locations more resistant to bending. This configuration may provide control over the shape of the package's opening, e.g., by allowing for bending in a pre-configured shape, generally speaking, during displacement of the sides 406, 408. For example, as depicted in FIG. 34, continuous strips forming the first side 406 and the second side 408 may be selectively stiffened in this manner to form a polygonal (e.g., hexagonal or rectangular) shape when the sides 406, 408 are bent towards the open configuration.

To provide one example process of manipulating the package 400, when any package-engaging structures, e.g., such as the package-engaging structures 106, 108 shown in FIG. 7, are coupled to the sides 406, 408, and are shifted, e.g., actuated, towards each other, a pivoting of the rigid sections 411, 413 relative to the sections 415, 417 can occur, as shown in FIGS. 34 and 39. Likewise, when the coupled package-engaging structures are shifted, e.g., actuated, away from each other, the rigid sections 411, 412 bend about the sections 415, 417 back together into the closed configuration, as shown in FIG. 33.

In some embodiments, the sides of the opening/closing mechanisms of the packages describes herein may include components that impart a bistable characteristic. For example, the side 406 and the side 408 may include or incorporate a leaf spring, and/or a similarly-functioning biasing element. For example, in one embodiment, a spring bar may be used, and/or a curvature of the sides 406, 408 may be configured so as to bias the opening/closing mechanism 404 toward the closed configuration. Looking at FIG. 40, a leaf spring 425 is shown threaded through openings 427 formed in, or coupled to, one side 408 of the opening/closing mechanism 404. The leaf spring 425, when utilized, may impart a variable spring rate to the sides 406, 408 of the opening/closing mechanism 404, allowing the sides 406, 408 to have a higher degree of stiffness in the closed configuration than in the open configuration. It should be noted that a leaf spring may be used with differently configured opening/closing mechanisms, including those without portions of different rigidity or pliability, in different aspects.

Figure 40:
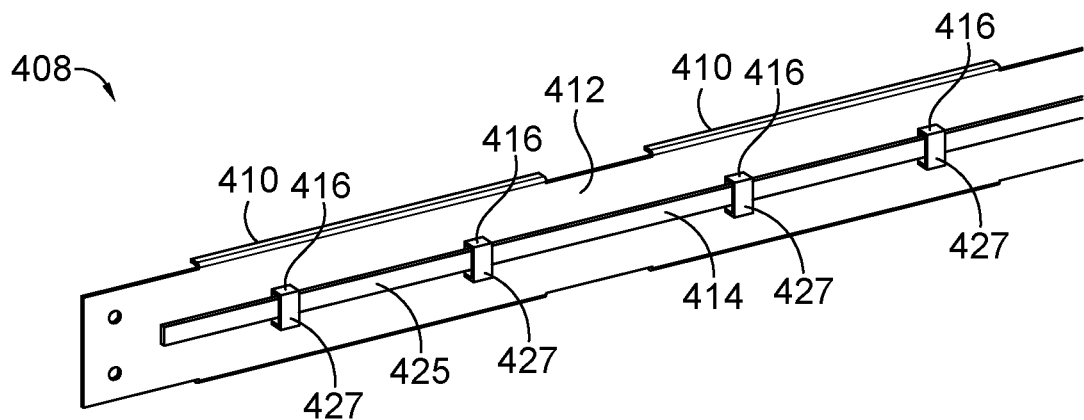
FIGS. 40-41 depict another example of an opening/closing mechanism configured for automated or semi-automated handling and manipulation, in accordance with an embodiment hereof.
Figure 41:
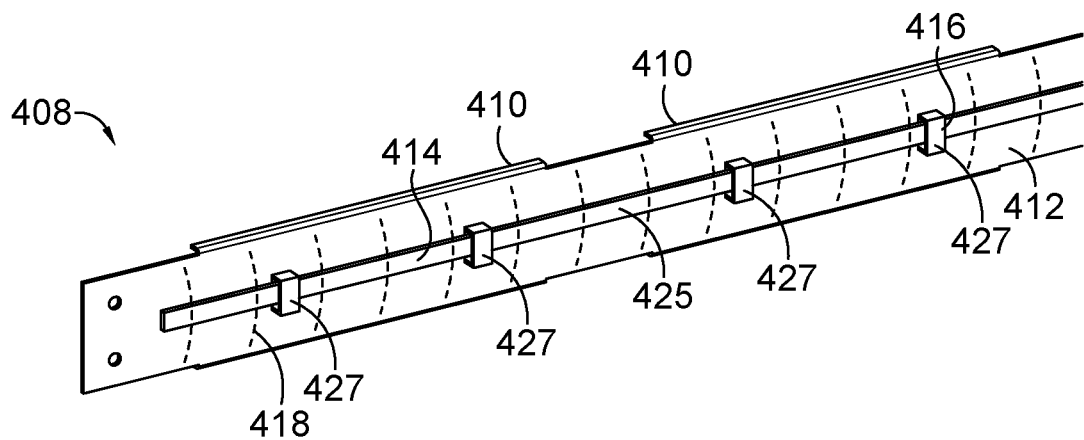
Figure 43:
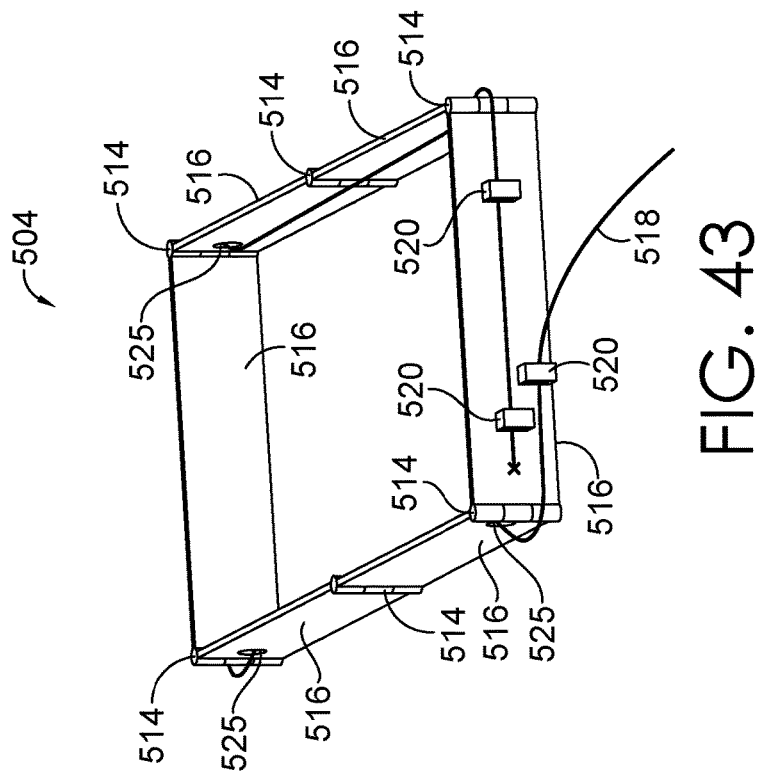
Figure 42:
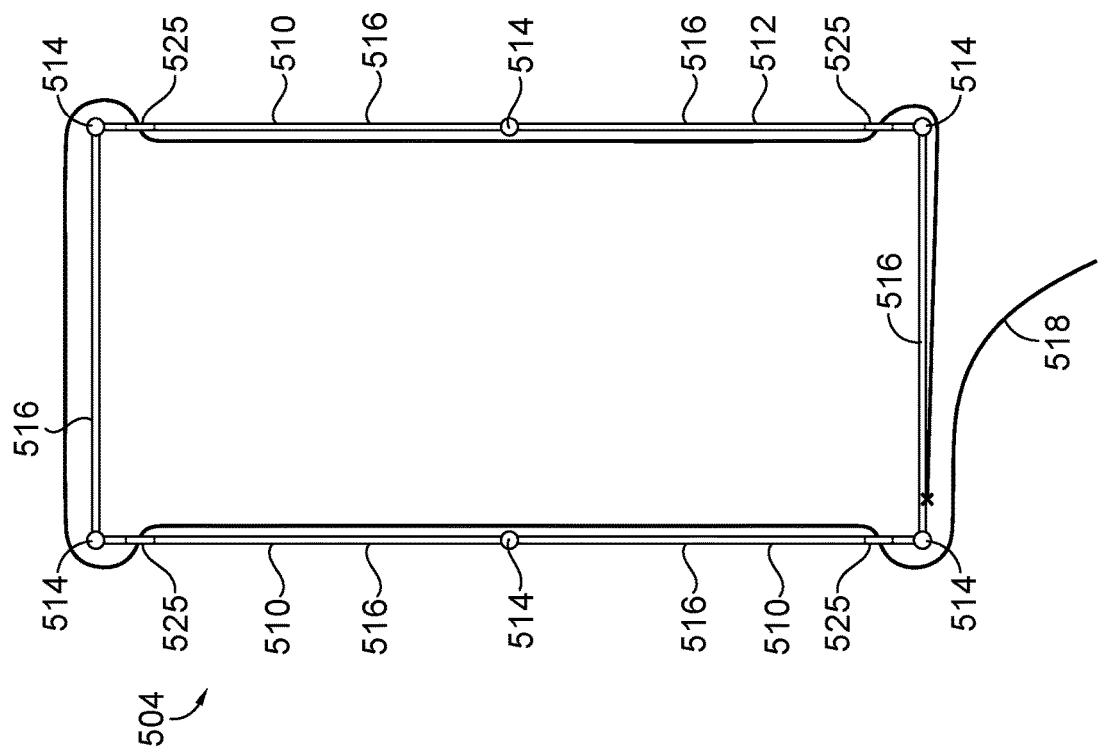

Looking still at FIGS. 40-41, the side 406 and the side 408 of the opening/closing mechanism 404 may, in one aspect, each include a component 412 and a component 414 that are discussed generically to highlight additional embodiments contemplated herein. The component 412 may include different geometric structures. The component 412 may also include rolled or bent edges that impart a stiffness, as described herein. The component 412 may also have a curvature that produces a bistable effect, or may have fastening features, or may have mounting features for other hardware or closure or securing elements. The component 412 may be formed, at least in part, of a metal (e.g., steel or aluminum), or of a polymer (e.g., a plastic or rubber). The component 414 may provide a biasing force that facilitates the transition toward a straightened, or closed, configuration, and may be formed of spring steel, or another material that provides a desired biasing quality. The component 414 may be attached to the component 412 using a variety of techniques, such as through use of retaining enclosures 416 that constrain the component 414 to roughly the plane of the component 412 while still allowing the two to slide relative to one another, e.g., through the retaining enclosures 416.

Looking at FIG. 41, in one aspect, the side 406 and/or the side 408 may include a slight curvature 418 (illustrated by the broken lines shown in FIG. 41). This slight curvature 418 may be provided to impart a variable spring rate, making the sides 406, 408 comparatively stiffer in the straightened, or closed configuration, compared to the bent, or open configuration. In some embodiments, the sides 406, 408 may include bistable biasing elements that resist transition from a linear, extended configuration (e.g., corresponding to a closed configuration) to a non-linear, bent configuration (e.g., corresponding to an open configuration). In the aspect shown in FIG. 41, the sides 406, 408 include convex surfaces that face each other. Due to this, the sides 406, 408 may be resistant to bending outwards, or away from each other, until a force applied to the sides 406, 408 exceeds a particular threshold.

In some embodiments, the opening/closing mechanisms described herein may include reinforcing ribs that provide selective stiffness to portions of the opening/closing mechanisms and that support bending into a desired shape, e.g., in the open configuration. The leaf spring and/or curvature configurations of FIG. 40 or 41 may be provided only for portions of the side 406 and/or the side 408 or for the entirety of the side 406 and/or the side 408. Furthermore, in some embodiments, the side 406 and/or the side 408 may be designed to provide a variable but continuous effective spring rate. For example, the side 406 and/or the side 408 of the opening/closing mechanism 404 shown in FIGS. 40-41, or another opening/closing mechanism described herein, may be designed to have a relatively higher stiffness when initially being opened, or rather being transitioned from a closed configuration to an open configuration, but then may become progressively less stiff as the opening/closing mechanism 404 transitions more toward the open configuration. This may facilitate the securement of objects in the enclosure 402 (e.g., stored in the bag portion) while allowing for a progressively easier opening of the package 400, once opening of the package 400 has been initiated.

Referring now to FIGS. 42-51, additional opening/closing mechanisms and configurations thereof that are used with packages adapted for automated or semi-automated handling and manipulation are provided, in accordance with embodiments hereof. Looking at FIGS. 42-47, an example opening/closing mechanism 504 is shown. The opening/closing mechanism 504 includes a series of sides 516 that are movably coupled to each other through hinges 514. The hinges 514 allow the sides 516 to pivot between an open configuration, with the sides 516 spaced apart, and a closed configuration, with sides abutting or substantially abutting each other. The hinges 514 may be rotational hinges, flexural hinges, lines of weakness, or any other structural feature that allows for relative movement. The range of rotation of the hinges 514 may be limited or restrained through the use of hard-stops, springs, or other restricting elements coupled to the hinges 514, in some aspects. The sides 516, in one aspect, may be rigid sides 516 that resist bending, e.g., exhibiting a higher resistance to bending than the hinges 514. For example, the sides 516 may be formed from one or more rigid metals or polymers, and these materials may be formed into plates, as shown in FIGS. 42-47. The sides 516 and/or hinges 514 may also be coupled to an enclosure, e.g., the enclosure 402 shown in FIG. 34, which may be formed of a pliable material that does not have fixed geometry, thereby forming a bag-like package suited for automated or semi-automated handling and manipulation as described herein.

The opening/closing mechanism 504 further includes a tensile element 518, e.g., such as a wire, cable, cord, string, or filament, that is threaded through the opening/closing mechanism 504. In particular, the tensile element 518 is threaded through passageways 520 formed on some sides 516 of the opening/closing mechanism 504 and also through apertures 525 formed in some sides 516 of the opening/closing mechanism 504. In additional aspects, the tensile element 518 may also be threaded through one or more spindles or mandrels 522 that balance or otherwise help evenly distribute the force applied to the sides 516 by the tensile element 518. One example of this is shown, for example, in FIGS. 48-51. The tensile element 518 can be used to shift the opening/closing mechanism 504 from an open configuration to a closed configuration, in automated or semi-automated fashion, e.g., using a package-handling system. In particular, the tensile element 518 is threaded such that when it is tensioned, e.g., by a mechanism, such as a package-manipulator, a tensioning force is applied to the sides 516, thereby pivoting the sides 516 together into a closed configuration, with the sides 516 abutting or substantially abutting. Likewise, when this force is released, sides 516 are free to transition back into the open configuration, or may be actuated into the open configuration using a mechanism that imparts a force inward on the sides 516, e.g., such as package-engaging structures of a package manipulator, as described herein.

Figure 48:
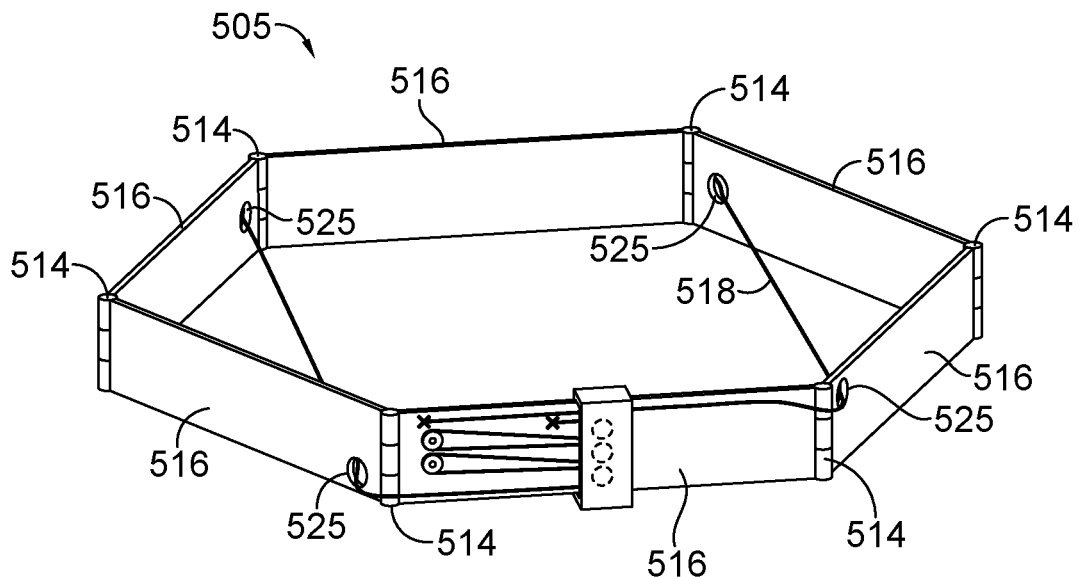
FIGS. 48-51 depict another example of an opening/closing mechanism configured for automated or semi-automated handling and manipulation, in accordance with an embodiment hereof.
Figure 49:
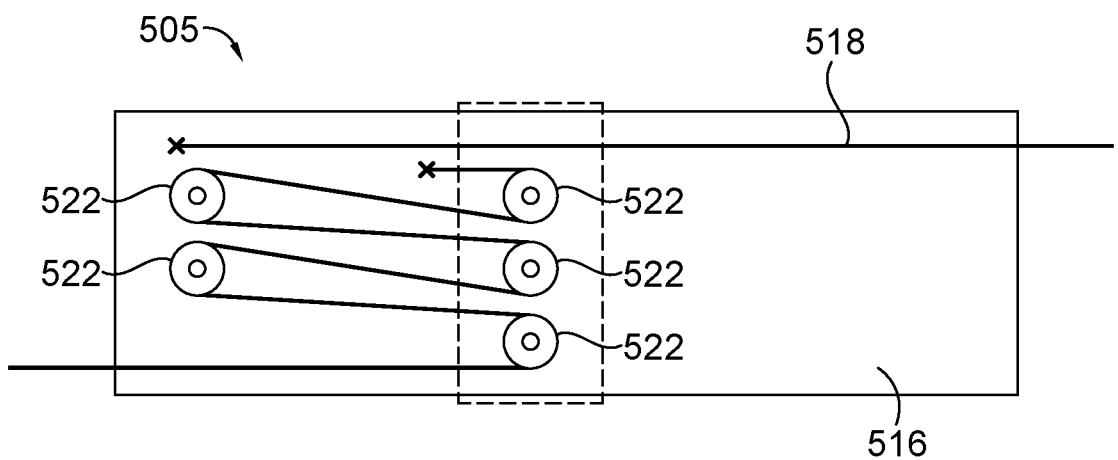
Figure 50:
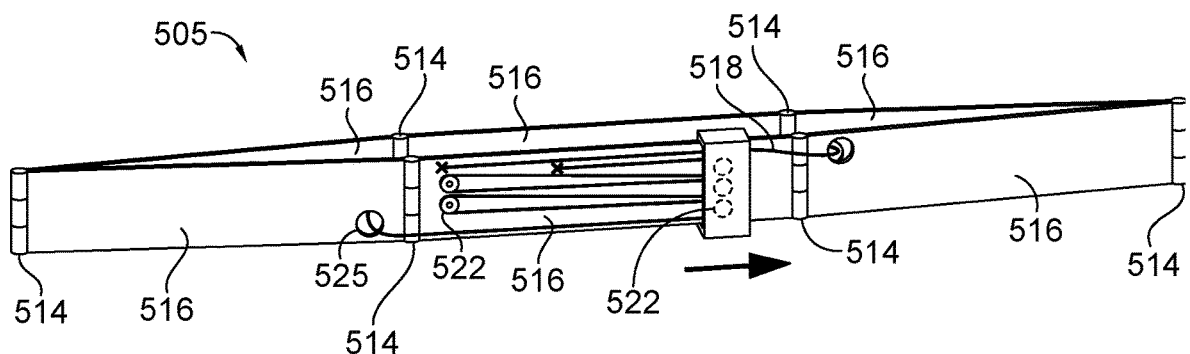
Figure 51:
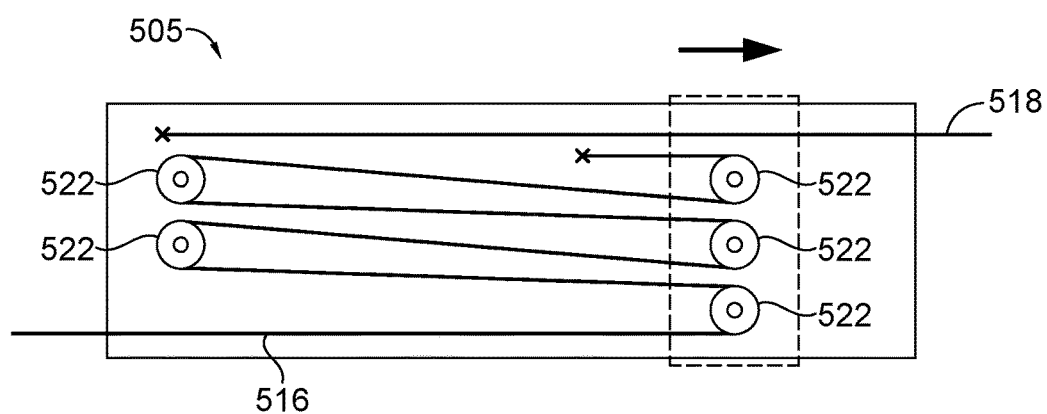

Referring now to FIGS. 48-51, another opening/closing mechanism 505 is shown, in accordance with an embodiment hereof. The opening/closing mechanism 505 shown in FIGS. 48-51 includes a similar configuration, and functionality, as the opening/closing mechanism 504 shown in FIGS. 42-47, but includes a plurality of spindles or mandrels 522 that balance or otherwise help evenly distribute the force applied to the sides 516 by the tensile element 518. FIG. 48 shows the opening/closing mechanism 505 in an open configuration, when the tensile element 518 is loose, or rather, relatively non-tensioned. FIG. 49 shows part of a side 516 of the opening/closing mechanism 505 showing the spindles or mandrels 522 that help distribute the tensioning force applied by the tensioning element 518 under tensioning circumstances. FIG. 50 shows the opening/closing mechanism 505 with the tensile element 518 being tensioned to transition the opening/closing mechanism 505 from an open configuration to a closed configuration. FIG. 51 shows the tensile element 518 being tensioned, with the spindles or mandrels 522 distributing the tensioning force.

Figure 52:
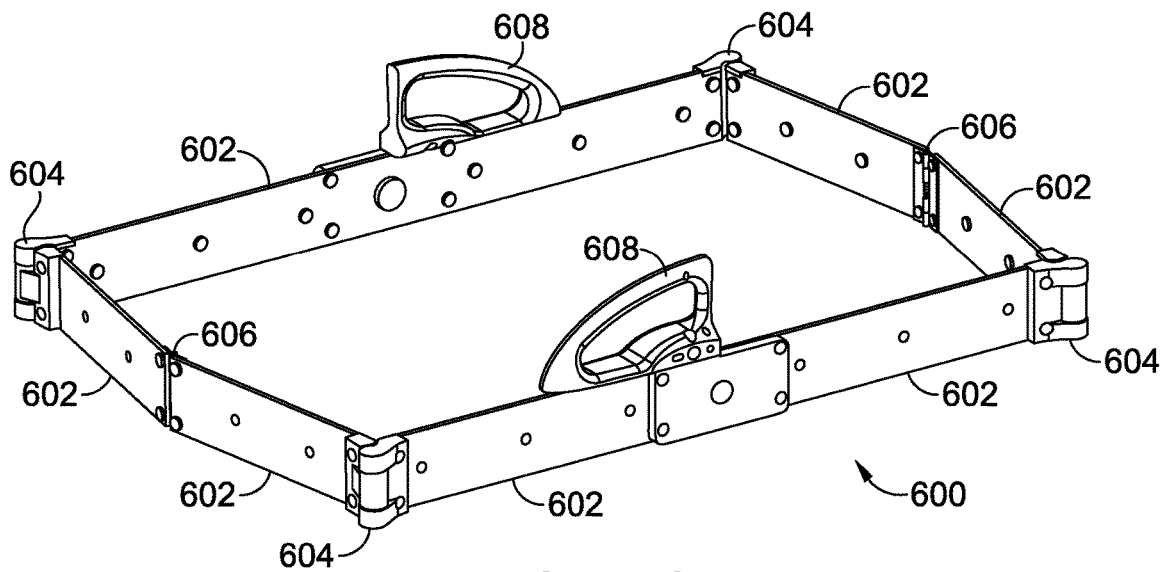
FIG. 52 depicts another example of an opening/closing mechanism configured for automated or semi-automated handling and manipulation, in accordance with an embodiment hereof.

Referring now to FIG. 52, another example of an opening/closing mechanism 600 configured for automated or semi-automated handling and manipulation is provided, in accordance with an embodiment hereof. The opening/closing mechanism 600 may be utilized with any of the packages described herein. The opening/closing mechanism 600 shown in FIG. 52 includes a series of rigid elements 602 that are pivotally connected with hinges 604, 606. The hinges 604, 606 may be rotary hinges, flexural hinges, or another type of pivoting connection. In some embodiments, the pivoting of the hinges 604, 606 may be limited or restricted using hard stops, variable springs, or other resistance-imparting elements that limit or restrict the movement of the hinges 604, 606.

The hinges 604, 606, in different embodiments, may be selected to provide desired mechanical characteristics. For example, in one instance, any of the hinges 604, 606 may be detent hinges that have internal detents that allow the opening/closing mechanism 600 to assume one or more distinct positions, e.g., a defined geometric shape, such as an open shape, suitable for manipulation, or a closed shape, suitable for transport. In another instance, any of the hinges 604, 606 may be spring hinges with self-opening or self-closing springs that bias the opening/closing mechanism 600 toward an open or closed position. These specific hinges may be utilized in any hinge location of the opening/closing mechanisms described herein. The opening/closing mechanism 600 shown in FIG. 52 includes six rigid elements 602, with the hinges 606 being spring hinges and the hinges 604 being detent hinges. However, numerous other configurations are possible. FIG. 52 further depicts the opening/closing mechanism 600 including handles 608 that facilitate manual and/or automated handling. The handles 608 may be integrated into the structure of the opening/closing mechanism 600, or may be separate structures coupled to the opening/closing mechanism 600.

Figure 53:
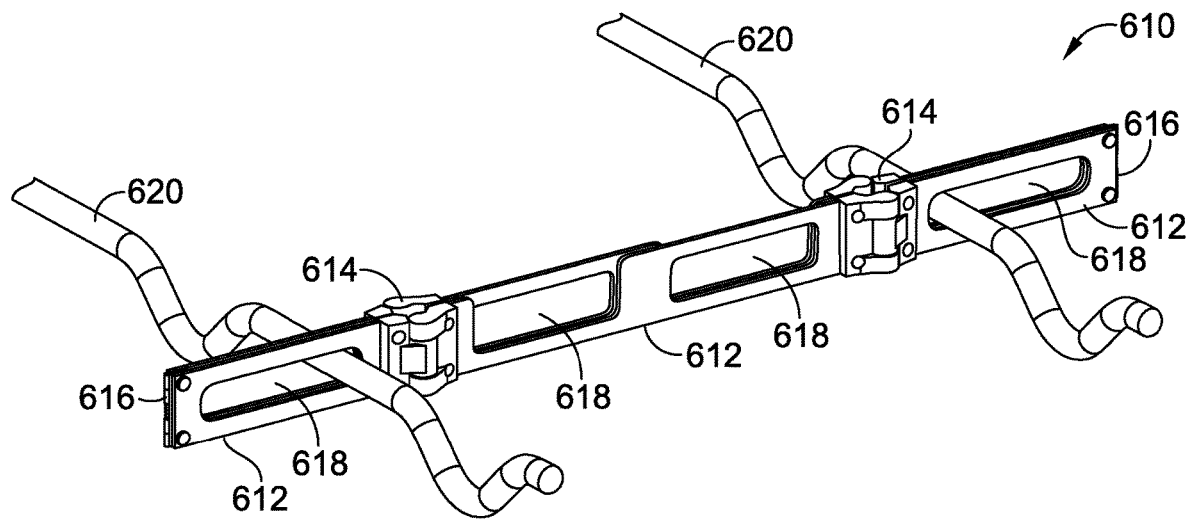
FIG. 53 depicts an example frame of an opening/closing mechanism configured for automated or semi-automated handling and manipulation, in accordance with an embodiment hereof.

Referring to FIG. 53, a frame 610 of an opening/closing mechanism is provided, in accordance with an embodiment hereof. The frame 610 may be utilized with any of the embodiments described herein. The frame 610 includes rigid elements 612 connected by hinges 614, 616. The rigid elements 612 further include openings 618 (e.g., apertures or slots located along the rigid elements 612). This configuration may provide a number of benefits. For example, the volume, weight, and overall space occupied by the frame 610 may be reduced or limited; the number of protrusions on the frame 610 may be reduced or limited, potentially reducing snagging; and/or elements of a package-holder and/or a package-manipulator may be able to interact with the frame 610. In the latter aspect, for example, package-engaging elements, such as the package-engaging elements 620 shown in FIG. 53, may be extended through the openings 618, and used to support the frame 610, e.g., during transfer and/or manipulation. The package-engaging elements 620 may include angled portions that help retain the frame 610 in a desired position, e.g., during transport, as shown in FIG. 53.

Clause 1. A system for opening and closing packages in automated fashion, the system comprising: a support frame; a package-holder coupled to the support frame, the package-holder comprising: a first package-engaging structure, and a second package-engaging structure, the package-holder configured to engage a first contact point on a package using the first package-engaging structure and engage a second contact point on the package using the second package-engaging structure; and a package-manipulator coupled to the support frame and comprising a third package-engaging structure that is movable to different positions through operation of an actuator coupled thereto, wherein the third package-engaging structure is configured to engage an opening/closing mechanism on the package, and wherein the package-manipulator is configured to open or close the package by shifting the third package-engaging structure while it is engaged with the opening/closing mechanism of the package.

Clause 2. The system of clause 1, wherein the opening/closing mechanism comprises a zipper mechanism, and wherein the package comprises an enclosure formed at least partially of a pliable material.

Clause 3. The system of any of clauses 1-2, wherein the package comprises a bag, and wherein the first contact point and the second contact point each comprise a geometric structure having a higher degree of rigidity than the pliable material.

Clause 4. The system of any of clauses 1-3, further comprising a detection component configured to identify and/or locate the first contact point and the second contact point in a three-dimensional space in which the system operates.

Clause 5. The system of any of clauses 1-4, wherein the detection component is configured to identify and/or locate the first contact point and the second contact point using image capture and analysis.

Clause 6. The system of any of clauses 1-5, wherein the detection component is configured to identify and/or locate the first contact point and the second contact point using near-field communications.

Clause 7. The system of any of clauses 1-6, wherein the detection component is configured to identify and/or locate the first contact point and the second contact point using radio frequency identification (RFID).

Clause 8. The system of any of clauses 1-7, wherein the first package-engaging structure is configured to adaptively re-position to engage the first contact point based on its location in the three-dimensional space as determined by the detection component, and wherein the second package-engaging structure is configured to adaptively re-position to engage the second contact point based on its location in the three-dimensional space as determined by the detection component.

Clause 9. The system of any of clauses 1-8, wherein the first package-engaging structure, when engaged with the first contact point, and the second package-engaging structure, when engaged with the second contact point, are configured to adjustably impart a tension to the package Clause 10. The system of any of clauses 1-9, further comprising a package-supply apparatus that is configured to advance a plurality of packages into a three-dimensional space in which the system operates.

Clause 11. The system of any of clauses 1-10, wherein the first package-engaging structure, the second package-engaging structure, and the third package engaging structure are each coupled to a separate multi-axis robot.

Clause 12. A method for opening and closing packages in automated fashion, the method comprising positioning a package in a three-dimensional space in which a package-handling system operates, the package-handling system comprising a support frame; a package-holder coupled to the support frame, the package-holder comprising a first package-engaging structure, and a second package-engaging structure; and a package-manipulator coupled to the support frame, the package-manipulator comprising a third package-engaging structure that is movable to a plurality of different positions through operation of an actuator coupled thereto, wherein the package includes an opening/closing mechanism; engaging a first contact point on the package with the first package-engaging structure; engaging a second contact point on the package with the second package-engaging structure; engaging the opening/closing mechanism of the package with the third package-engaging structure; and shifting the third package-engaging structure to open or close the package while the first package-engaging structure is engaging the first contact point and the second package-engaging structure is engaging the second contact point.

Clause 13. The method of clause 12, wherein the package comprises an enclosure formed at least partially of a pliable material.

Clause 14. The method of any of clauses 12-13, further comprising identifying and/or locating the first contact point and the second contact point in the three-dimensional space using a detection component.

Clause 15. The method of any of clauses 12-14, wherein the first package-engaging structure is configured to adaptively re-position to engage the first contact point based on its location in the three-dimensional space as determined by the detection component, and wherein the second package-engaging structure is configured to adaptively re-position to engage the second contact point based on its location in the three-dimensional space as determined by the detection component.

Clause 16. The method of any of clauses 12-15, wherein engaging the opening/closing mechanism comprises identifying a location of the opening/closing mechanism in the three-dimensional space using the detection component; and shifting the third package-engaging structure to the identified location of the opening/closing mechanism.

Clause 17. The method of any of clauses 12-16, wherein the first contact point, the second contact point, and the opening/closing mechanism each comprise a geometric structure having a characteristic that is identifiable by the detection component Clause 18. The method of any of clauses 12-17, wherein the characteristic comprises a machine-identifiable indicia, a near-field communication signal, or an RFID tag.

Clause 19. A package adapted for automated opening and closing, the package comprising a storage compartment formed at least partially of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism configured for manipulation by an automated package-handling system, wherein the first geometric structure comprises a first machine-identifiable and/or machine-locatable feature, wherein the second geometric structure comprises a second machine-identifiable and/or machine-locatable feature, and, wherein the opening/closing mechanism comprises a third machine-identifiable and/or machine-locatable feature.

Clause 20. The package of claim 19, wherein the opening/closing mechanism comprises a zipper mechanism.

Clause 21. A system for opening and closing packages in automated fashion, the system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first magnet, and a second side comprising a second magnet, wherein the first magnet and the second magnet are oriented to bias the first side and the second side towards each other when in magnetic proximity; and a package-manipulator coupled to the support frame and comprising a third package-engaging structure configured to engage the opening/closing mechanism, and subsequently, displace the first side and the second side apart against the bias of the first magnet and the second magnet to transition the opening/closing mechanism from a closed configuration to an open configuration.

Clause 22. The system of clause 21, further comprising a detection component configured to detect and locate the first contact point and the second contact point in a three-dimensional space in which the system operates.

Clause 23. The system of any of clauses 21-22, wherein the first package-engaging structure is configured to adaptively re-position to engage the first contact point based on its location in the three-dimensional space as determined by the detection component, and wherein the second package-engaging structure is configured to adaptively re-position to engage the second contact point based on its location in the three-dimensional space as determined by the detection component.

Clause 24. The system of any of clauses 21-23, wherein the third package-engaging structure comprises a mechanism with a distal end, wherein the distal end is configured to adaptively re-position to a location in the three-dimensional space that is between the first side and the second side, thereby allowing the mechanism to actuate to displace the first side and the second side apart against the bias of the first magnet and the second magnet.

Clause 25. The system of any of clauses 21-24, further comprising a package-supply apparatus that is configured to advance a plurality of packages into a three-dimensional space in which the system operates, wherein the package-holder and the package-supply apparatus are configured to operate in coordination.

Clause 26. The system of any of clauses 21-25, wherein the first package-engaging structure, the second package-engaging structure, and the third package engaging structure are each coupled to a separate multi-axis robot.

Clause 27. A method for opening and closing packages in automated fashion, the method comprising positioning a package at a location in a three-dimensional space in which a package-handling system operates, the package handling system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first magnet, and a second side comprising a second magnet, wherein the first magnet and the second magnet are oriented to bias the first side and the second side towards each other when in magnetic proximity; and a package-manipulator coupled to the support frame and comprising a third package-engaging structure; engaging the first contact point on the package with the first package-engaging structure; engaging the second contact point on the package with the second package-engaging structure; engaging the opening/closing mechanism of the package with the third package-engaging structure; and displacing, using the third package-engaging structure, the first side and the second side apart against the bias of the first magnet and the second magnet to transition the opening/closing mechanism from a closed configuration to an open configuration.

Clause 28. The method of clause 27, wherein the first side and the second side each comprise at least two sections of different pliability that allow for bending in a pre-configured manner during displacement.

Clause 29. The method of any of clauses 27-28, wherein the first magnet is enclosed within a first encasing located on the first side, and wherein the second magnet is enclosed within a second encasing located on the second side.

Clause 30. The method of any of clauses 27-29, wherein, in the closed configuration, a distance between the first magnet and the second magnet is less than a distance between the first magnet and an outer wall of the first encasing and a distance between the second magnet and an outer wall of the second encasing.

Clause 31. The method of any of clauses 27-30, further comprising locating and/or identifying the first contact point and the second contact point in the three-dimensional space using a detection component.

Clause 32. The method of any of clauses 27-31, wherein the detection component uses image analysis, near-field communications, or radio frequency identification (RFID) to locate and/or identify the first contact point and the second contact point.

Clause 33. The method of any of clauses 27-32, wherein the first package-engaging structure is adaptively positioned for engagement with the first contact point based on a location of the first contact point in the three-dimensional space as determined by the detection component, wherein the second package-engaging structure is adaptively positioned for engagement with the second contact point based on a location of the second contact point in the three-dimensional space as determined by the detection component, and wherein the third package-engaging structure is adaptively positioned for engagement with the opening/closing mechanism based on a location of the opening/closing mechanism in the three-dimensional space as determined by the detection component.

Clause 34. A package adapted for automated opening and closing, the package comprising a storage compartment formed of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism that is coupled to the storage compartment and that is adapted for manipulation by an automated package-handling system, wherein the first geometric structure comprises a first machine-identifiable and/or machine-locatable feature, wherein the second geometric structure comprises a second machine-identifiable and/or machine-locatable feature, wherein the opening/closing mechanism includes a first side with a first magnet and a second side with a second magnet, and wherein the first magnet and the second magnet are oriented to bias the first side and the second side towards each other when in magnetic proximity.

Clause 35. The package of clause 34, wherein an indent is formed between the first side and the second side when the opening/closing mechanism is in the closed configuration, and wherein the indent is shaped to receive a distal end of a displacing structure.

Clause 36. The package of any of clauses 34-35, wherein the first contact point comprises a first hinge, and wherein the second contact point comprises a second hinge, and wherein the first side and the second side exhibit a higher resistance to bending in the closed configuration than in the open configuration.

Clause 37. The package of any of clauses 34-36, wherein the first side and the second side each comprise at least two sections of different pliability that allow for bending in a pre-configured manner.

Clause 38. The package of any of clauses 34-37, wherein the first magnet is enclosed within a first encasing located on the first side, and wherein the second magnet is located within a second encasing located on the second side.

Clause 39. The package of any of clauses 34-38, wherein, in the closed configuration, a distance between the first magnet and the second magnet is less than a distance between the first magnet and an outer wall of the first encasing and a distance between the second magnet and an outer wall of the second encasing.

Clause 40. The package of any of clauses 34-39, wherein the opening/closing mechanism includes one or more spring hinges and one or more detent hinges.

Clause 41. A system for opening and closing packages in automated fashion, the system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first securing element, and a second side comprising a second securing element, wherein the first securing element and the second securing element can be detachably coupled; and a package-manipulator coupled to the support frame and comprising a third package-engaging structure configured to engage the opening/closing mechanism, and subsequently, decouple the first securing element and the second securing element to displace the first side and the second side to thereby open the package.

Clause 42. The system of clause 41, further comprising a detection component configured to locate and/or identify the first contact point and the second contact point in a three-dimensional space in which the system operates.

Clause 43. The system of any of clauses 41-42, wherein the detection component is configured to locate and/or identify the opening/closing mechanism in the three-dimensional space in which the system operates.

Clause 44. The system of any of clauses 41-43, wherein the first package-engaging structure is configured to adaptively engage the first contact point based on its location in the three-dimensional space as determined by the detection component, wherein the second package-engaging structure is configured to adaptively engage the second contact point based on its location in the three-dimensional space as determined by the detection component, and wherein the third package-engaging structure is configured to adaptively engage the opening/closing mechanism based on its location in the three-dimensional space as determined by the detection component.

Clause 45. The system of any of clauses 41-44, wherein the detection component is configured to identify and/or locate the first contact point, the second contact point, and the opening/closing mechanism using image analysis.

Clause 46. The system of any of clauses 41-45, wherein the detection component is configured to identify and/or locate the first contact point, the second contact point, and the opening/closing mechanism using near-field communications.

Clause 47. The system of any of clauses 41-46, wherein the detection component is configured to identify and/or locate the first contact point, the second contact point, and the opening/closing mechanism using radio frequency identification (RFID).

Clause 48. The system of any of clauses 41-47, further comprising a package-supply apparatus that is configured to advance a plurality of packages into a three-dimensional space in which the system operates, wherein the package-holder and the package-supply apparatus are configured to operate in coordination.

Clause 49. A method for opening and closing packages in automated fashion, the method comprising positioning a package at a location in a three-dimensional space in which a package-handling system operates, the package-handling system comprising a support frame; a package-holder coupled to the support frame, the package-holder comprising a first package-engaging structure, and a second package-engaging structure, the package-holder configured to engage a first contact point on a package using the first package-engaging structure and to engage a second contact point on the package using the second package-engaging structure, the package having an opening/closing mechanism comprising a first side comprising a first securing element, and a second side comprising a second securing element, wherein the first securing element and the second securing element can be detachably coupled; and a package-manipulator coupled to the support frame and comprising a third package-engaging structure; engaging the first contact point on the package with the first package-engaging structure; engaging the second contact point on the package with the second package-engaging structure; engaging the opening/closing mechanism of the package with the third package-engaging structure; decoupling the first securing element and the second securing element from each other; and displacing the first side and the second side to transition the opening/closing mechanism from a closed configuration to an open configuration.

Clause 50. The method of clause 49, further comprising locating and/or identifying the first contact point, the second contact point, and the opening/closing mechanism in the three-dimensional space using a detection component.

Clause 51. The method of any of clauses 49-50, wherein the detection component uses image analysis, near-field communications, or radio frequency identification (RFID) to locate and/or identify the first contact point, the second contact point, and the opening/closing mechanism.

Clause 52. The method of any of clauses 49-51, wherein the first package-engaging structure is adaptively positioned for engagement with the first contact point based on a location of the first contact point in the three-dimensional space as determined by the detection component, wherein the second package-engaging structure is adaptively positioned for engagement with the second contact point based on a location of the second contact point in the three-dimensional space as determined by the detection component, and wherein the second package-engaging structure is adaptively positioned for engagement with the opening/closing mechanism based on a location of the opening/closing mechanism in the three-dimensional space as determined by the detection component.

Clause 53. A package adapted for automated opening and closing, the package comprising a storage compartment formed at least partially of a pliable material; a first geometric structure coupled to the storage compartment at a first location, the first geometric structure having a higher degree of rigidity than the pliable material; a second geometric structure coupled to the storage compartment at a second location, the second geometric structure having a higher degree of rigidity than the pliable material; and an opening/closing mechanism adapted to be opened and closed by an automated package-handling system, wherein the first geometric structure is machine-identifiable and/or machine-locatable, wherein the second geometric structure is machine-identifiable and/or machine-locatable, wherein the opening/closing mechanism is machine-identifiable and/or machine-locatable, and wherein the first securing element and the second securing element are configured to be detachably coupled.

Clause 54. The package of clause 53, wherein the first side and the second side each comprise at least two sections of different pliability that allow for bending in a pre-configured manner.

Clause 55. The package of any of clauses 53-54, wherein the first securing element and the second securing element comprise a male/female coupling.

Clause 56. The package of any of clauses 53-55, wherein the first securing element and the second securing element comprise a latching mechanism.

Clause 57. The package of any of clauses 53-56, wherein the first side and the second side each comprise a leaf spring.

Clause 58. The package of any of clauses 53-57, wherein the first side and the second side each exhibit a higher resistance to bending when the opening/closing mechanism is in a closed configuration compared to an open configuration.

Clause 59. The package of any of clauses 53-58, wherein the first geometric structure, the second geometric structure, and the opening/closing mechanism each comprise a radio frequency identification (RFID) tag or a machine-identifiable indicia.

Clause 60. The package of any of clauses 53-59, wherein the first geometric structure, the second geometric structure, and the opening/closing mechanism each comprises a near-field communications element.

Clause 61. Any of the aforementioned clauses 1-60 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A package comprising:
   a storage compartment formed at least partially of a pliable material;
   a first geometric structure coupled to the storage compartment at a first location;
   a second geometric structure coupled to the storage compartment at a second location, wherein each of the first geometric structure and the second geometric structure (i) has a higher degree of rigidity than the pliable material, (ii) is configured for manipulation by an automated package-handling system, and (iii) comprises a slot formed therein that is sized and shaped to fit over, and be secured to, corners of the storage compartment; and
   an opening/closing mechanism configured for manipulation by the automated package-handling system, wherein the opening/closing mechanism comprises a third geometric structure that operates along a first interlocking member that forms a first side with a first securing element of a zipper mechanism and a second interlocking member that forms a second side with a second securing element of the zipper mechanism, each of the first interlocking member and the second interlocking member is located at or proximate to an opening edge of the package, and the third geometric structure comprises (i) a first channel and a second channel formed therein that allow edges of the first interlocking member and the second interlocking member to slide through as the third geometric structure is moved between the first location and the second location and (ii) a third channel configured to accommodate and allow a zipper slider of the zipper mechanism to slide along the first interlocking member and the second interlocking member as the third geometric structure is moved between the first location and the second location to at least one of join or separate the first interlocking member and the second interlocking member.

2. The package of claim 1, wherein the first geometric structure, the second geometric structure, and the third geometric structure are substantially spherical.

3. The package of claim 1, wherein each of the first interlocking member and the second interlocking member is disposed or integrally formed along an inner surface of the storage compartment, and both the first interlocking member and the second interlocking member are operable to at least one of interlock, interdigitate, or detachably couple to each other.

4. The package of claim 1, wherein the third geometric structure has the higher degree of rigidity than the pliable material.

5. The package of claim 1, wherein the first geometric structure, the second geometric structure, and the third geometric structure comprise a characteristic that is identifiable by a detection component of the automated package-handling system.

6. The package of claim 5, wherein the characteristic comprises at least one of machine-identifiable indicia, a near-field communication signal, or a radio frequency identification tag.

7. The package of claim 1, wherein at least a portion of the third geometric structure is aligned, at least partially, with an axis along which a force is exerted to open or close the package.

8. A package comprising:
a storage compartment;
a first geometric structure coupled to the storage compartment at a first location;
a second geometric structure coupled to the storage compartment at a second location, wherein each of the first geometric structure and the second geometric structure (i) is configured for manipulation by an automated package-handling system and (ii) comprises a slot formed therein that is sized and shaped to fit over, and be secured to, corners of the storage compartment; and
an opening/closing mechanism configured for manipulation by the automated package-handling system, wherein the opening/closing mechanism comprises a third geometric structure that operates along a first interlocking member that forms a first side with a first securing element of a zipper mechanism and a second interlocking member that forms a second side with a second securing element of the zipper mechanism, each of the first interlocking member and the second interlocking member is located at or proximate to an opening edge of the package, and the third geometric structure comprises (i) a first channel and a second channel formed therein that allow edges of the first interlocking member and the second interlocking member to slide through as the third geometric structure is moved between the first location and the second location and (ii) a third channel configured to accommodate and allow a zipper slider of the zipper mechanism to slide along the first interlocking member and the second interlocking member as the third geometric structure is moved between the first location and the second location to at least one of join or separate the first interlocking member and the second interlocking member.

9. The package of claim 8, wherein the first geometric structure, the second geometric structure, and the third geometric structure are substantially spherical.

10. The package of claim 8, wherein each of the first interlocking member and the second interlocking member is disposed or integrally formed along an inner surface of the storage compartment, and both the first interlocking member and the second interlocking member are operable to at least one of interlock, interdigitate, or detachably couple to each other.

11. The package of claim 8, wherein the first geometric structure, the second geometric structure, and the third geometric structure comprise a characteristic that is identifiable by a detection component of the automated package-handling system.

12. The package of claim 11, wherein the characteristic comprises at least one of machine-identifiable indicia, a near-field communication signal, or a radio frequency identification tag.

13. The package of claim 8, wherein at least a portion of the third geometric structure is aligned, at least partially, with an axis along which a force is exerted to open or close the package.

* * * * *